United States Patent
Yang et al.

(10) Patent No.: US 11,496,871 B2
(45) Date of Patent: Nov. 8, 2022

(54) V2X COMMUNICATION DEVICE AND METHOD FOR TRANSMITTING AND RECEIVING V2X MESSAGE BY MEANS OF SAME

(71) Applicant: LG ELECTRONICS INC., Seoul (KR)

(72) Inventors: Seungryul Yang, Seoul (KR); Woosuk Ko, Seoul (KR); Jaeho Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/970,309

(22) PCT Filed: Feb. 14, 2018

(86) PCT No.: PCT/KR2018/001947
§ 371 (c)(1),
(2) Date: Aug. 14, 2020

(87) PCT Pub. No.: WO2019/160177
PCT Pub. Date: Aug. 22, 2019

(65) Prior Publication Data
US 2021/0084460 A1  Mar. 18, 2021

(51) Int. Cl.
*H04W 4/46* (2018.01)
*H04W 4/40* (2018.01)
*H04W 4/08* (2009.01)

(52) U.S. Cl.
CPC .............. *H04W 4/40* (2018.02); *H04W 4/08* (2013.01)

(58) Field of Classification Search
CPC .. H04L 12/185; G08G 1/22; G01S 2013/9325
See application file for complete search history.

(56) References Cited

U.S. PATENT DOCUMENTS 10,353,387 B2 * 7/2019 Stenneth .............. G05D 1/0297
11,089,444 B2 * 8/2021 Cavalcanti .......... H04B 7/0617
(Continued)

FOREIGN PATENT DOCUMENTS

KR        20130073278          7/2013

OTHER PUBLICATIONS

PCT International Application No. PCT/KR2018/001947, International Search Report dated Dec. 12, 2018, 3 pages.

(Continued)

*Primary Examiner* — Cindy Trandai
(74) *Attorney, Agent, or Firm* — Lee, Hong, Degerman, Kang & Waimey PC

(57) ABSTRACT

A method for transmitting a V2X message by means of a V2X communication device is disclosed. A V2X communication method can comprise the steps of: receiving a platooning information message from an external V2X communication device; determining, on the basis of information comprised in the platooning information message, whether or not the concatenation with a platooning group is to be formed; if it is determined that the concatenation is to be formed, transmitting a concatenation request message for requesting the concatenation to the external V2X device; receiving from the external V2X device a concatenation response message which is a response message to the concatenation request message; and forming the concatenation with the platooning group. The platooning information message can comprise information relating to a platooning group to which a vehicle having an external V2X communication device belongs.

16 Claims, 34 Drawing Sheets

(56) References Cited

U.S. PATENT DOCUMENTS

| | | | |
|---|---|---|---|
| 2005/0165639 A1 | 7/2005 | Ross et al. | |
| 2013/0179056 A1 | 7/2013 | Fukuyama | |
| 2017/0158196 A1* | 6/2017 | Park | G08G 1/096741 |
| 2017/0186327 A1 | 6/2017 | Uysal et al. | |
| 2017/0293296 A1* | 10/2017 | Stenneth | G06Q 10/047 |
| 2018/0025634 A1* | 1/2018 | Ujiie | H04W 84/18 |
| | | | 701/119 |
| 2018/0143649 A1* | 5/2018 | Miao | G05D 1/0291 |
| 2018/0146471 A1* | 5/2018 | Xu | H04L 67/12 |
| 2019/0014446 A1* | 1/2019 | Gade | G08G 1/096725 |
| 2020/0008018 A1* | 1/2020 | Moustafa | G08G 1/096783 |
| 2020/0021451 A1* | 1/2020 | Pinheiro | H04W 88/04 |
| 2020/0092685 A1* | 3/2020 | Fehrenbach et al. | |
| | | | H04B 7/2606 |

OTHER PUBLICATIONS

Cao et al. "A 5G V2X Tesbed for Cooperative Automated Driving," 2016 IEEE Vehicular Networking Conference (VNC), Dec. 8, 2016, 4 pages.

European Patent Office Application Serial No. 18906166.6, Search Report dated Aug. 27, 2021, 7 pages.

Amoozadeh et al., "Platoon management with cooperative adaptive cruise control enabled by VANET," Vehicular Communications, XP055479897, Mar. 2015, 14 pages.

Maiti et al., "A conceptualization of vehicle platoons and platoon operations," Transportation Research Part C, XP085052125, Apr. 2017, 19 pages.

* cited by examiner

[FIG. 1]
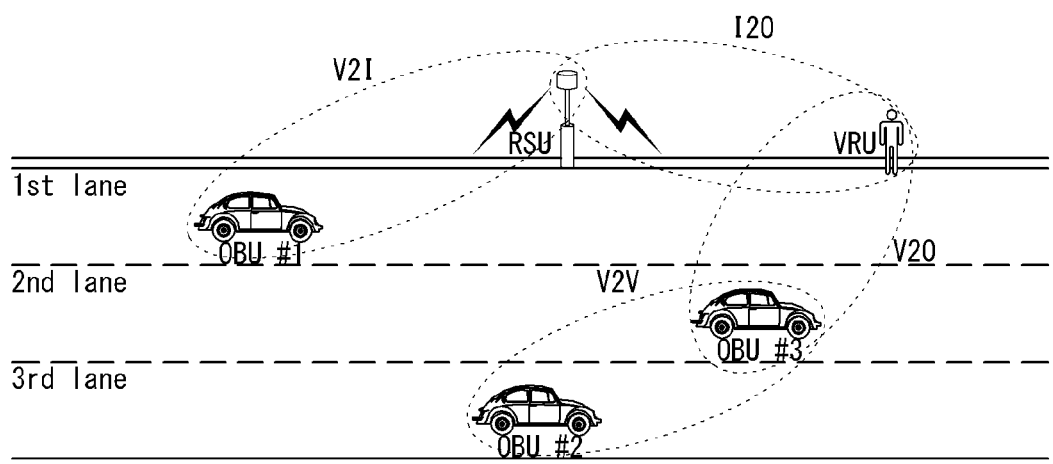

[FIG. 2]
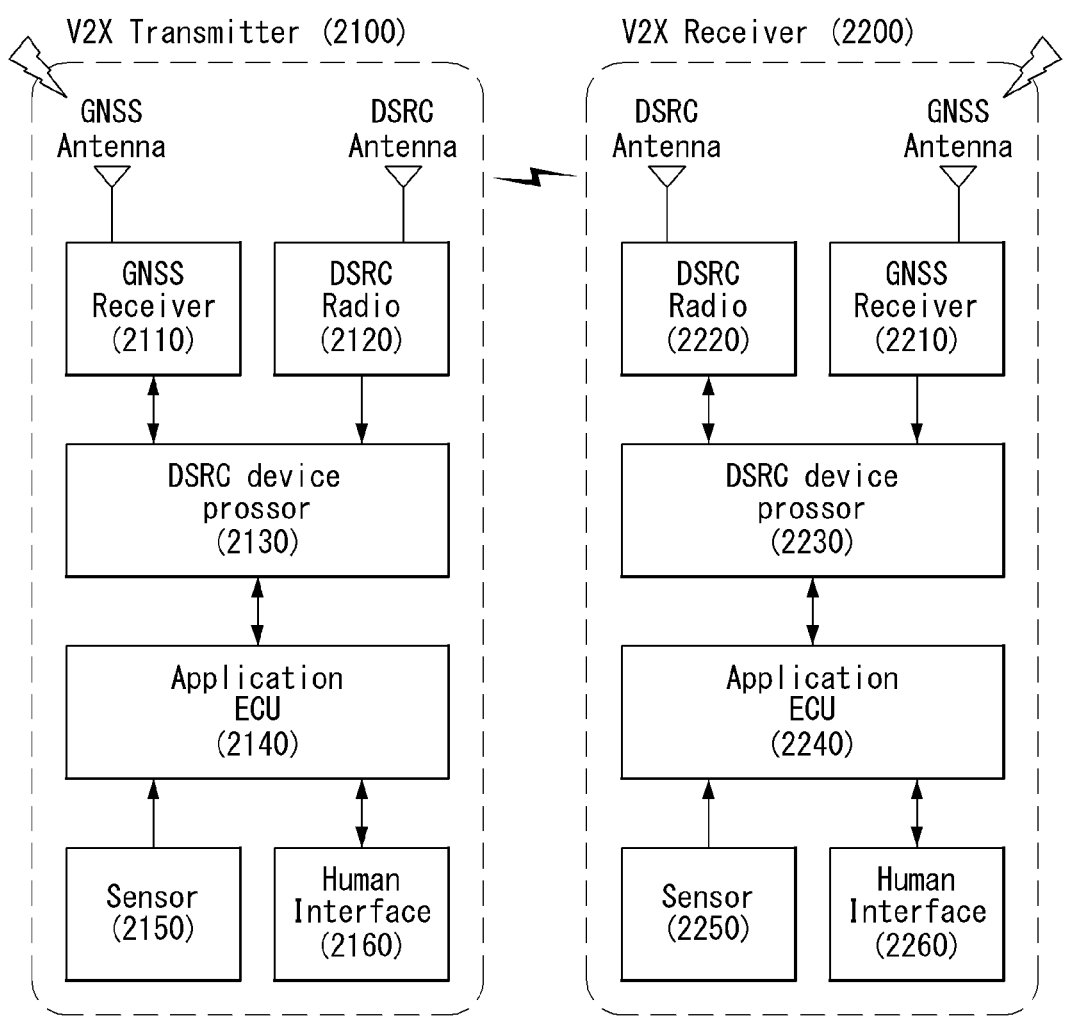

[FIG. 3]
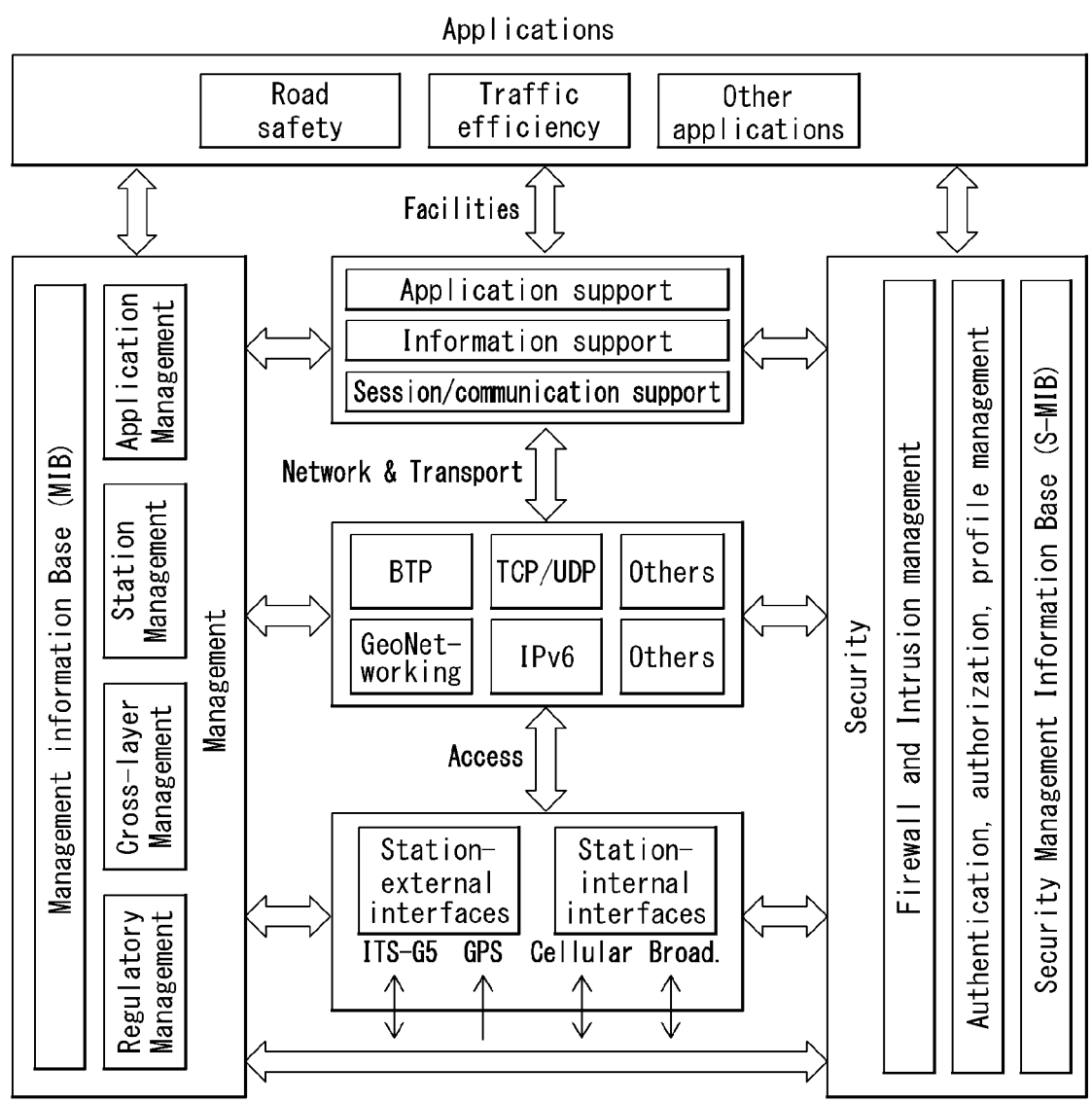

[FIG. 4]
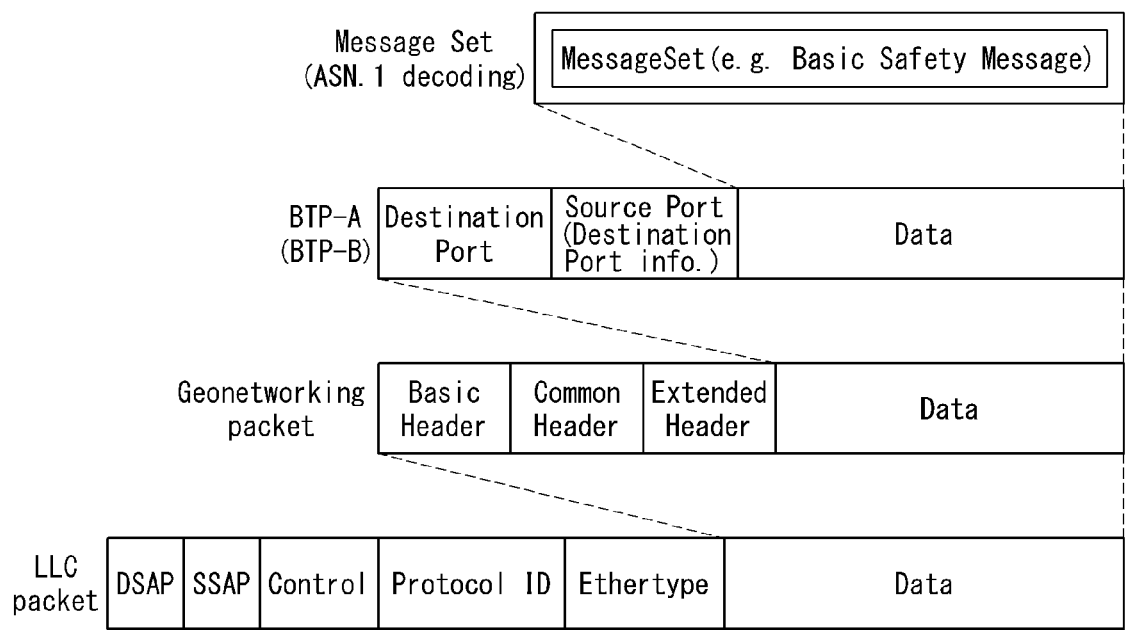

[FIG. 5]
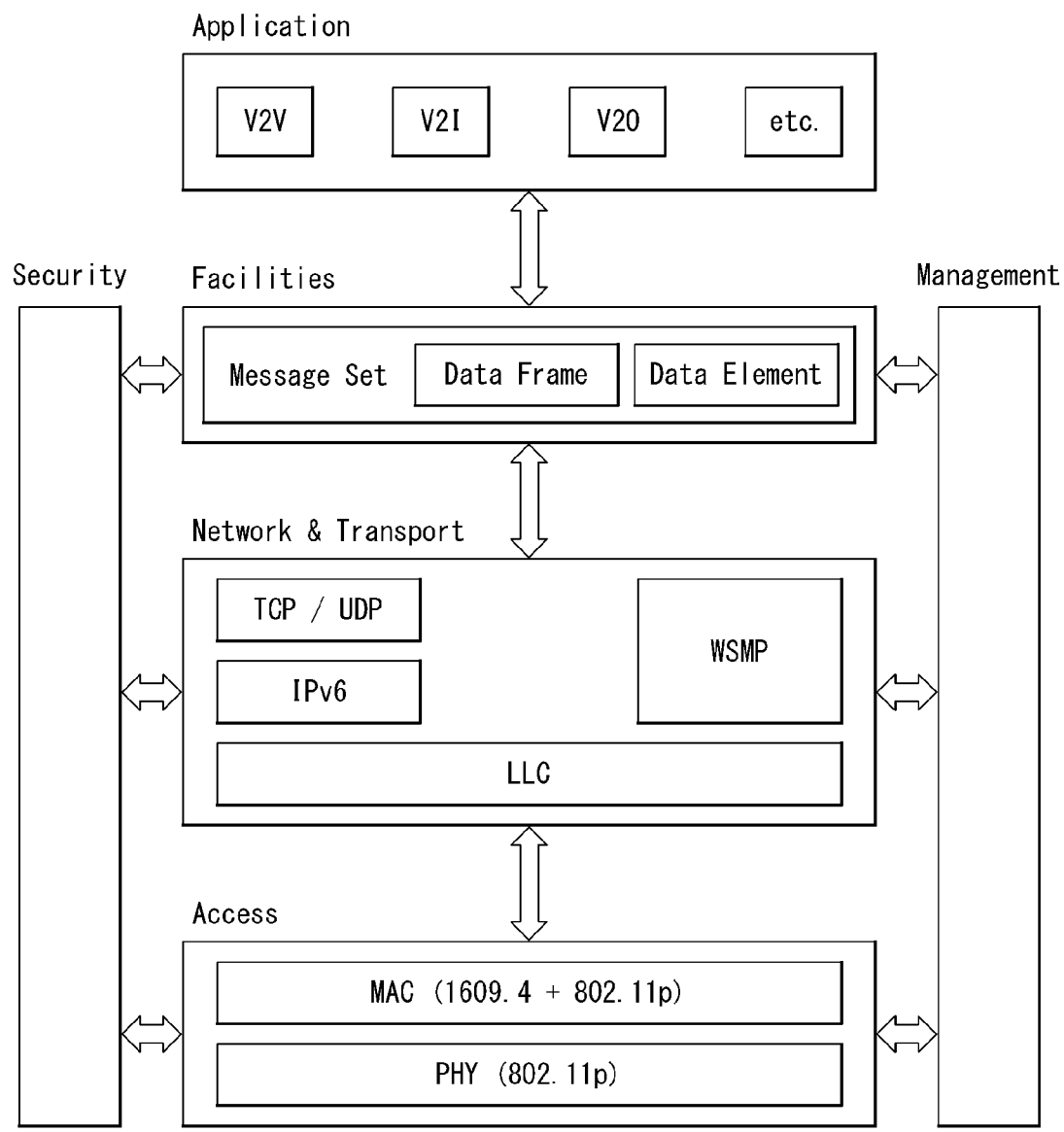

[FIG. 6]
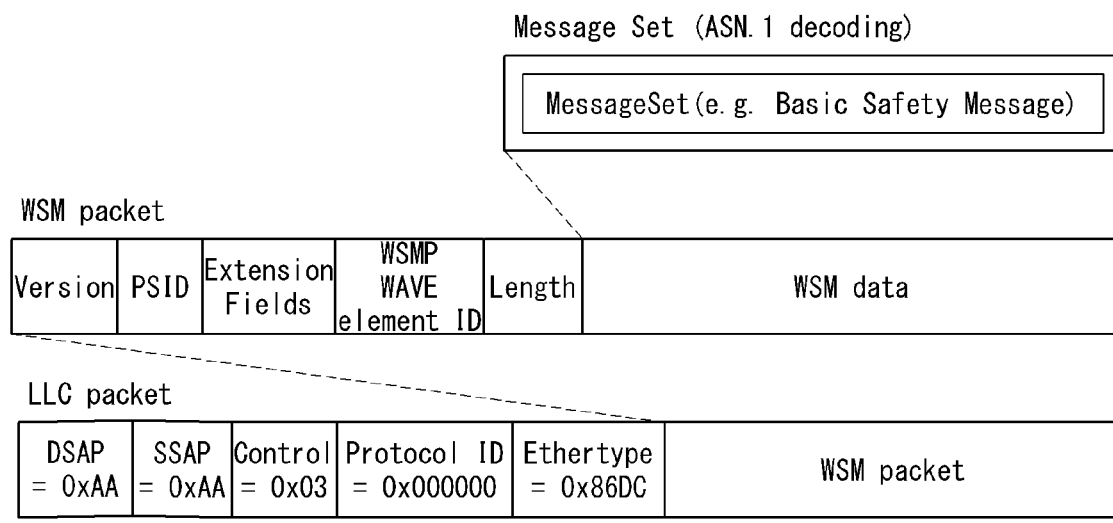

[FIG. 7]
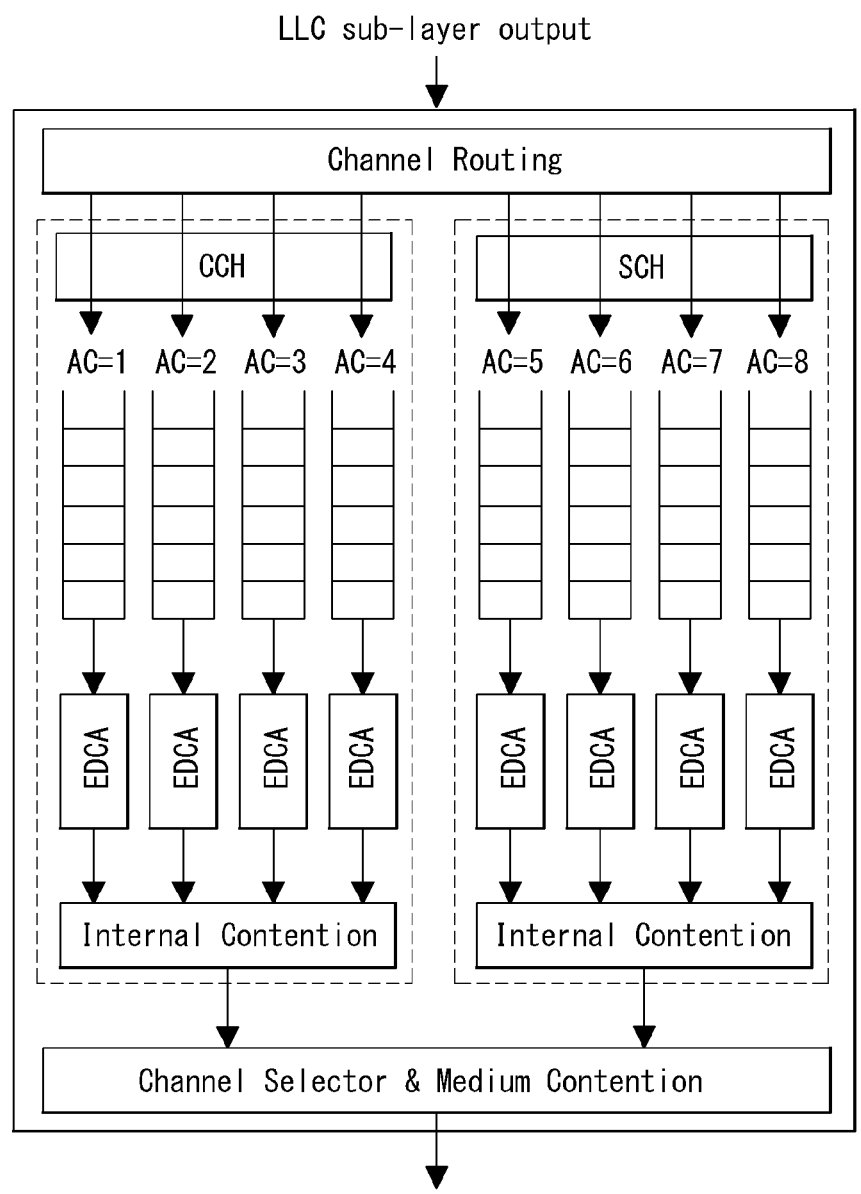

[FIG. 8]
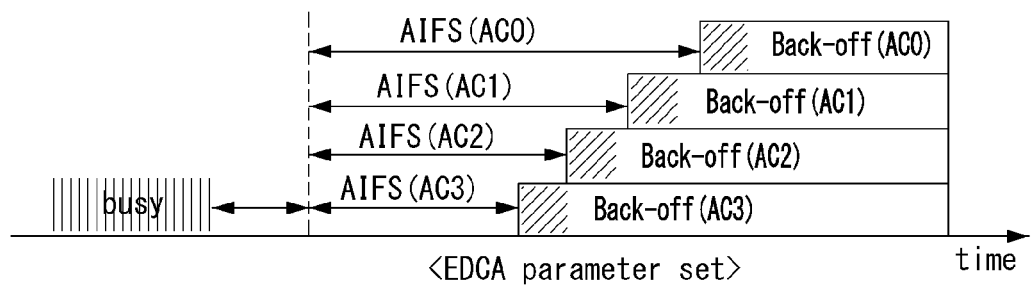

[FIG. 9]
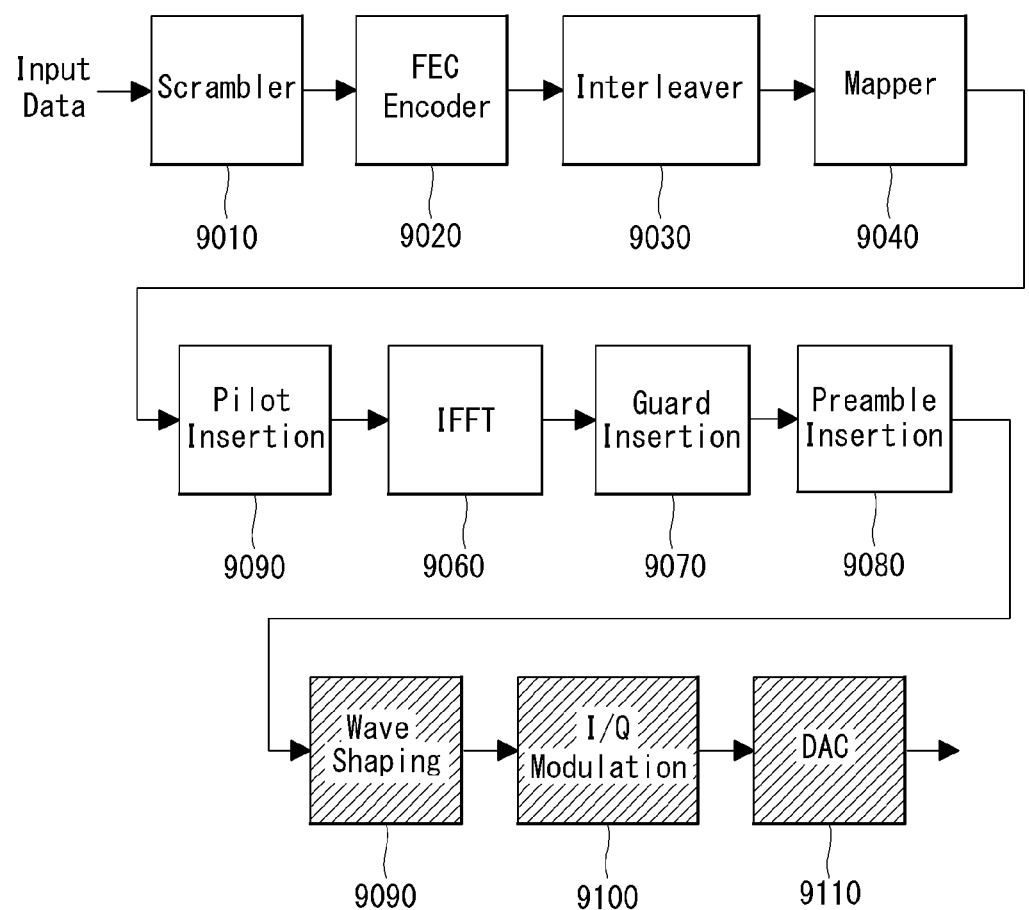

[FIG. 10]
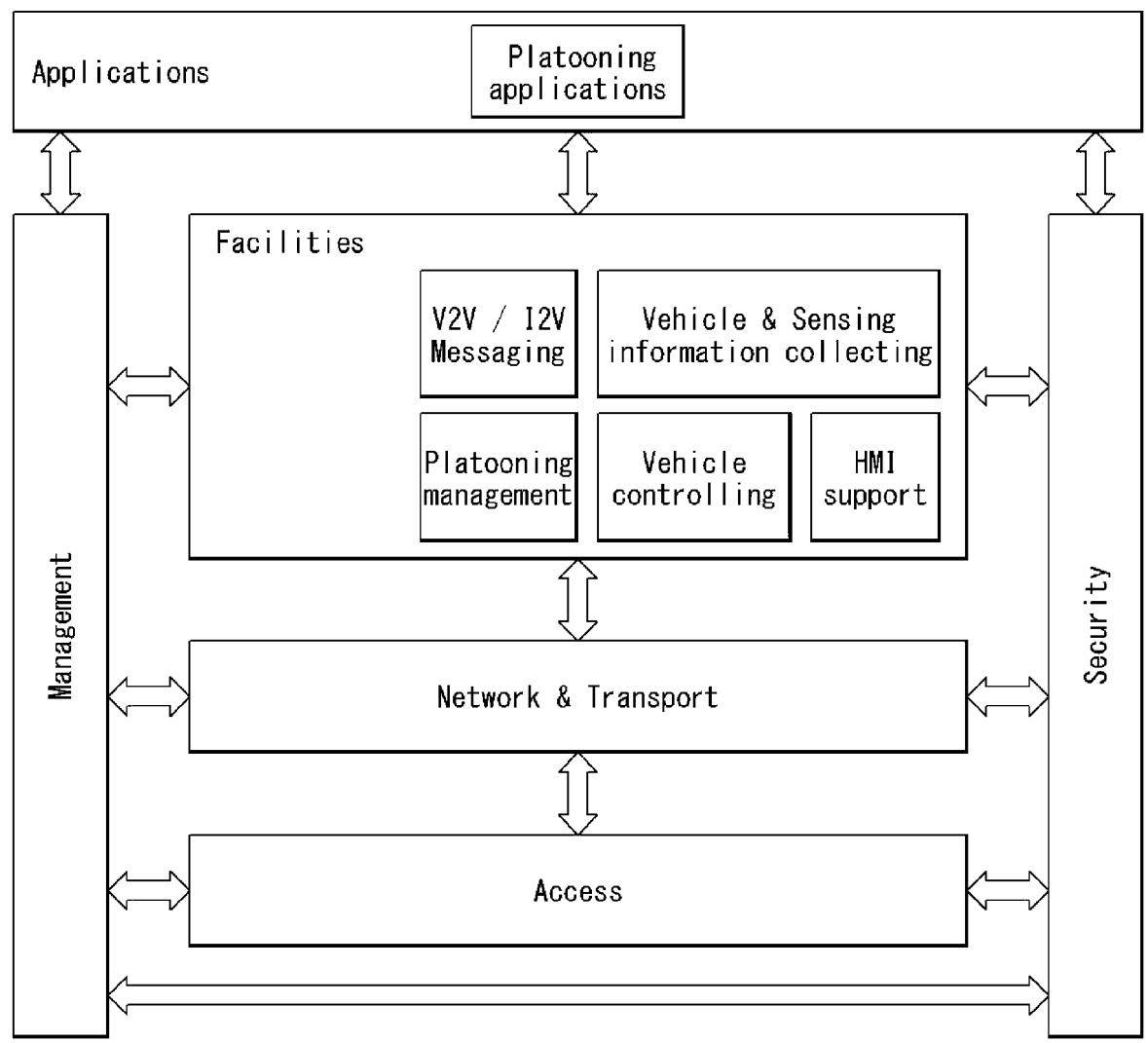

[FIG. 11]
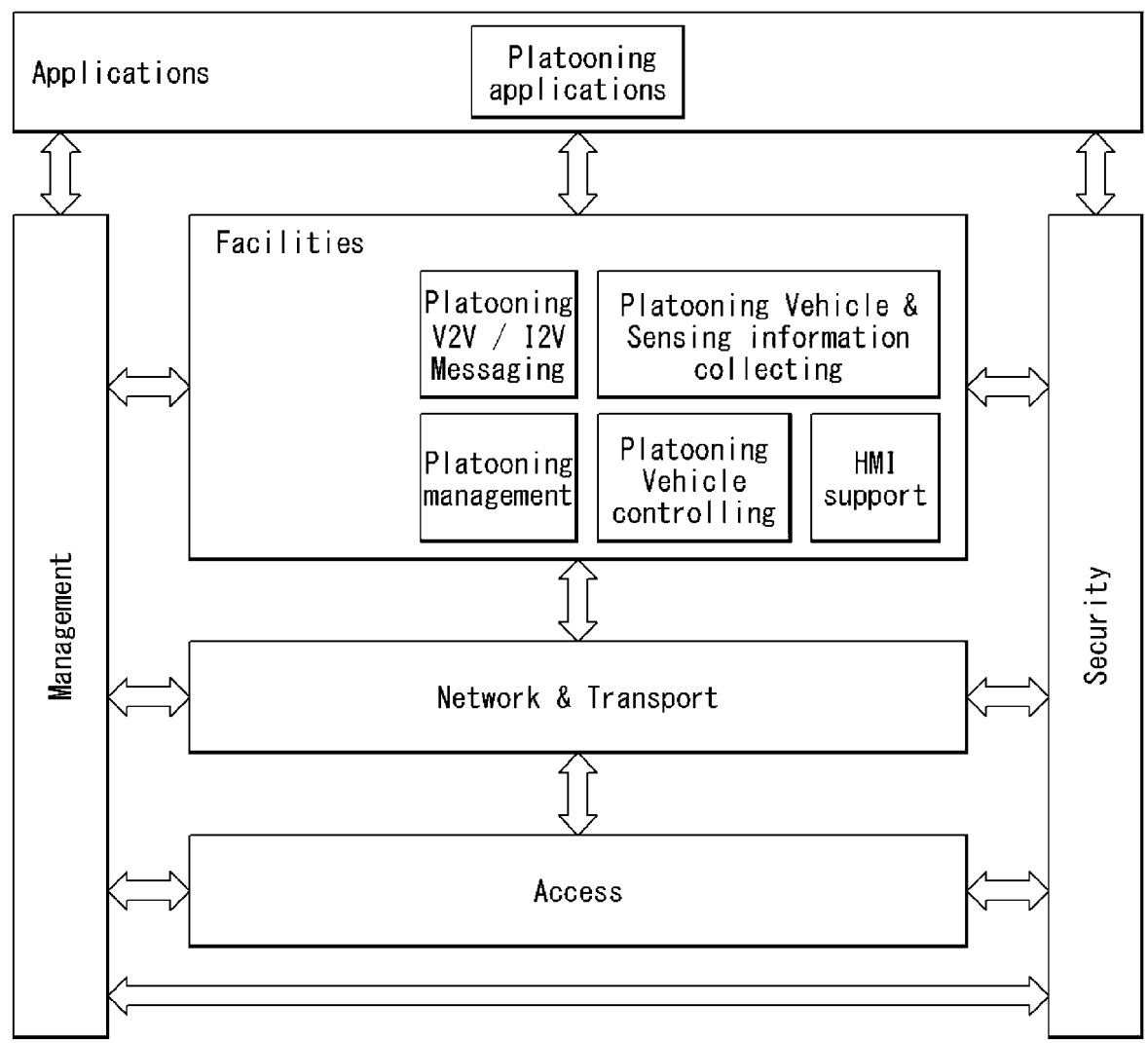

[FIG. 12]
Platooning member vehicle
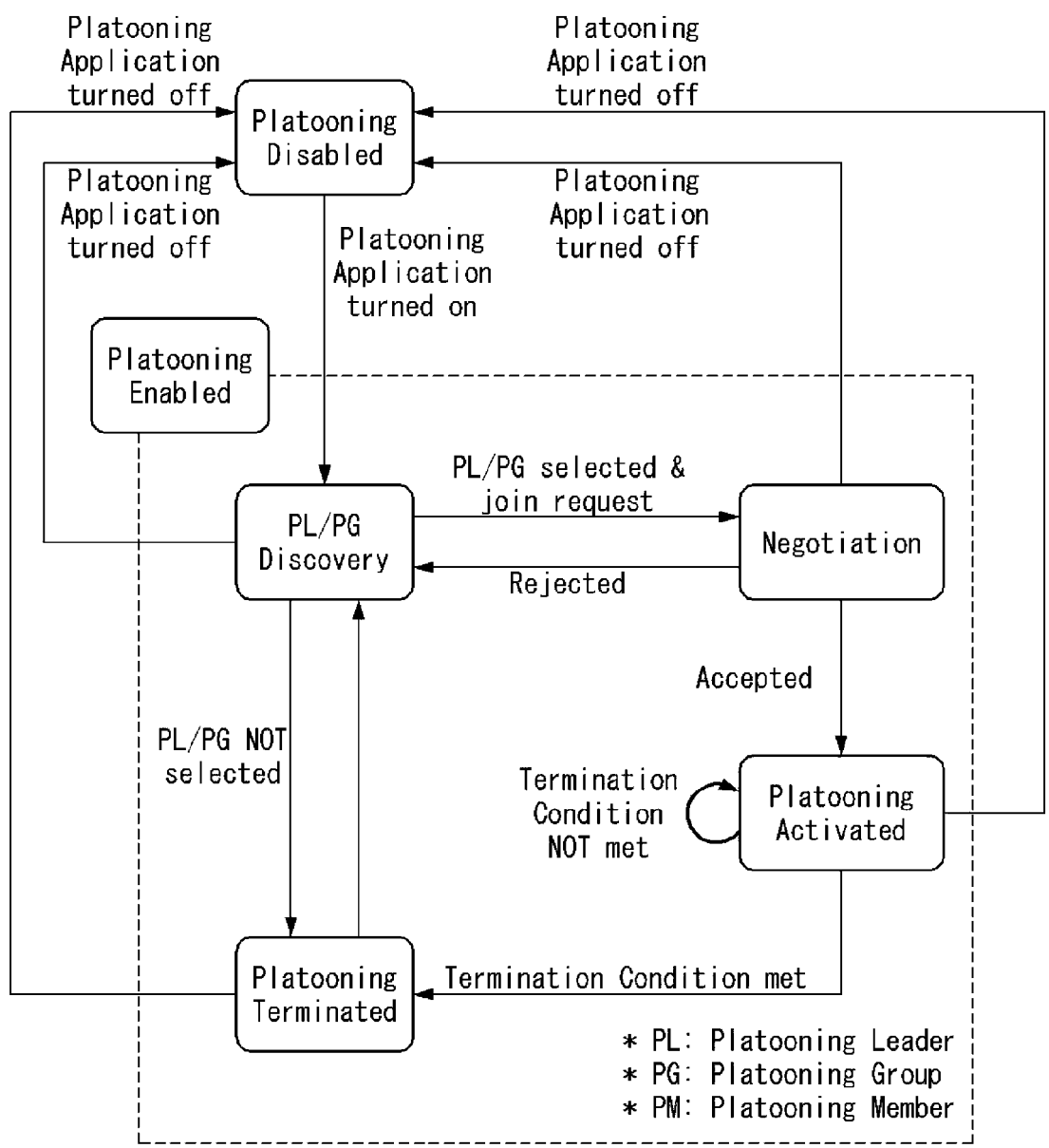

[FIG. 13]
Platooning lead vehicle
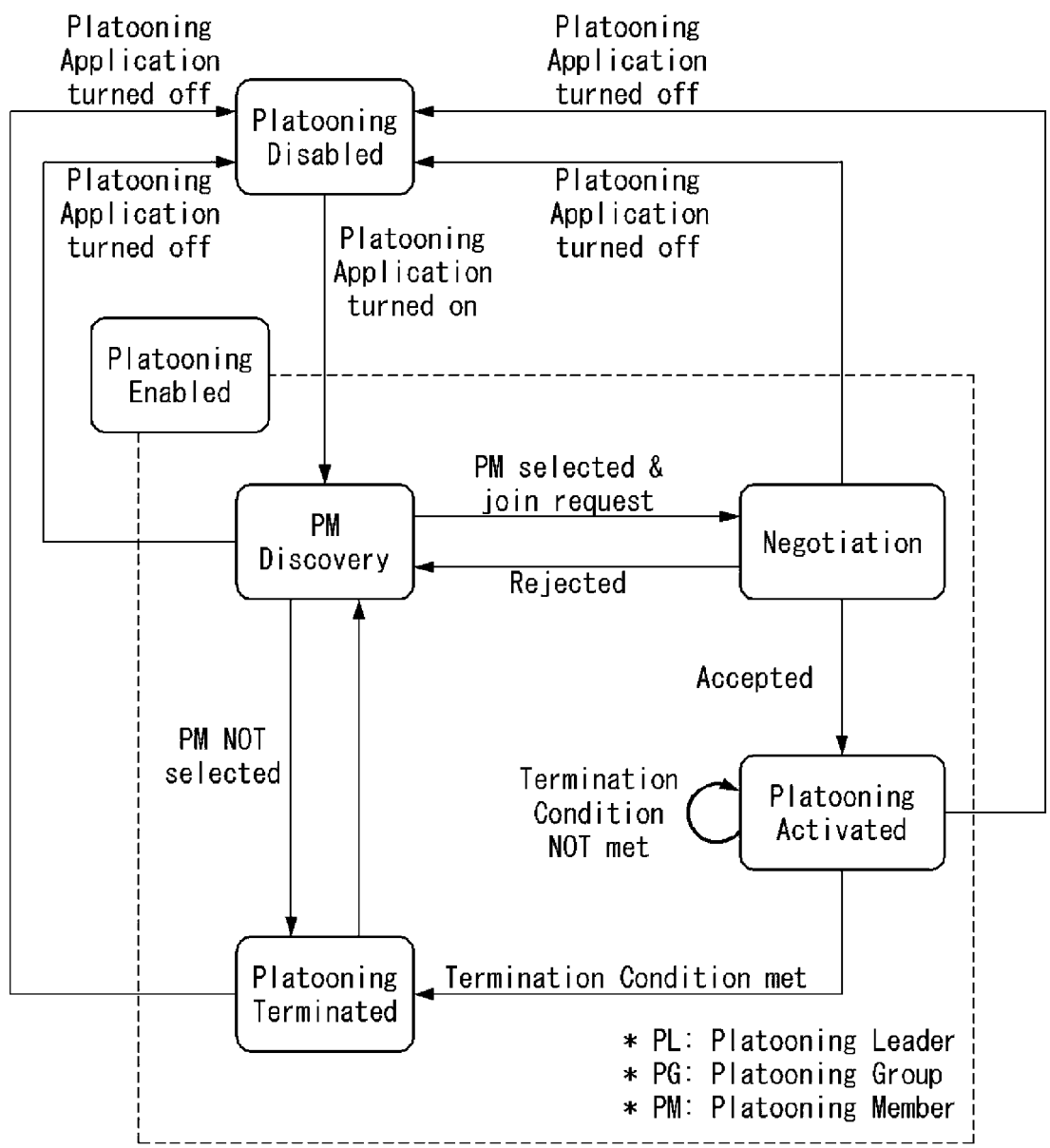

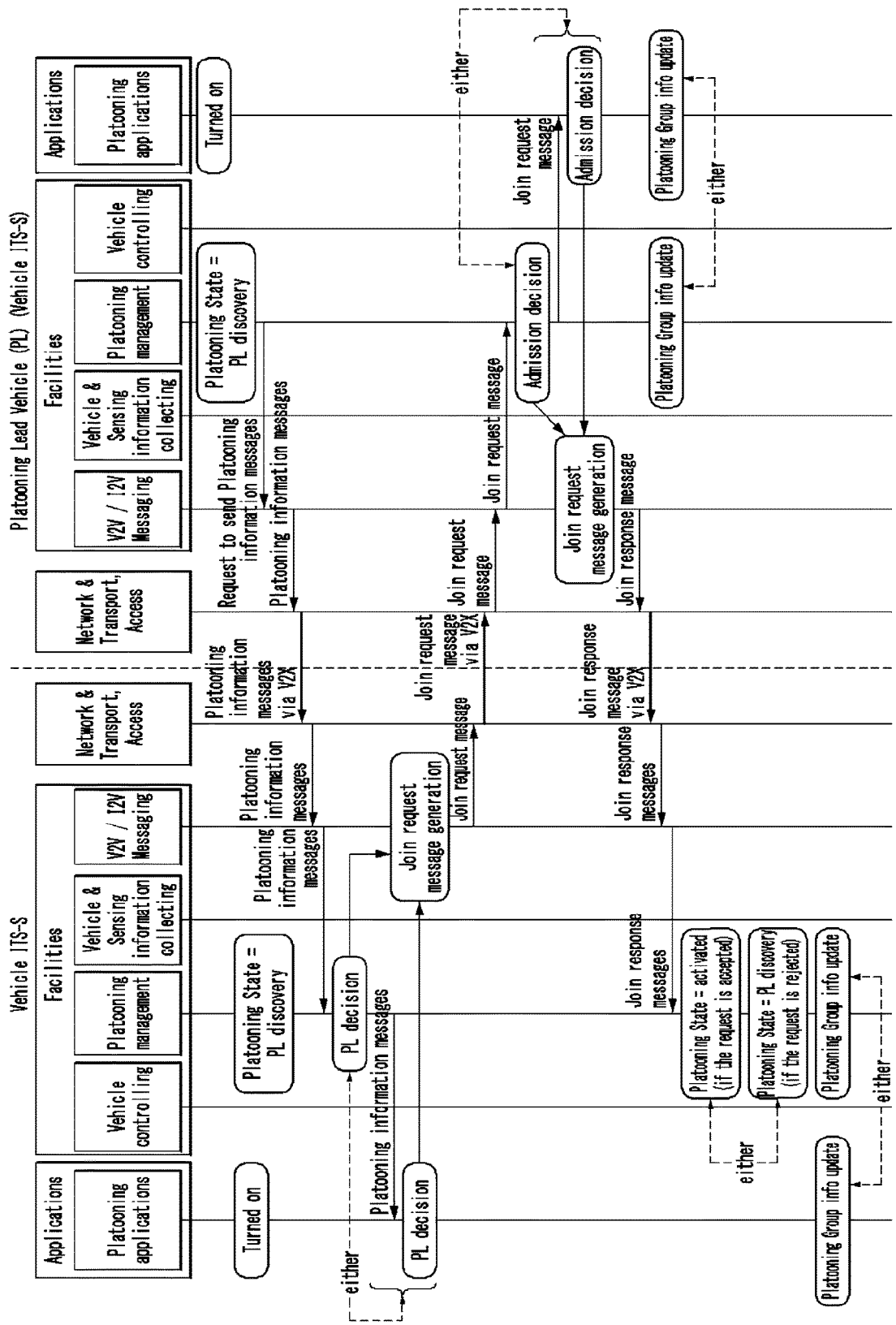
[FIG. 14]

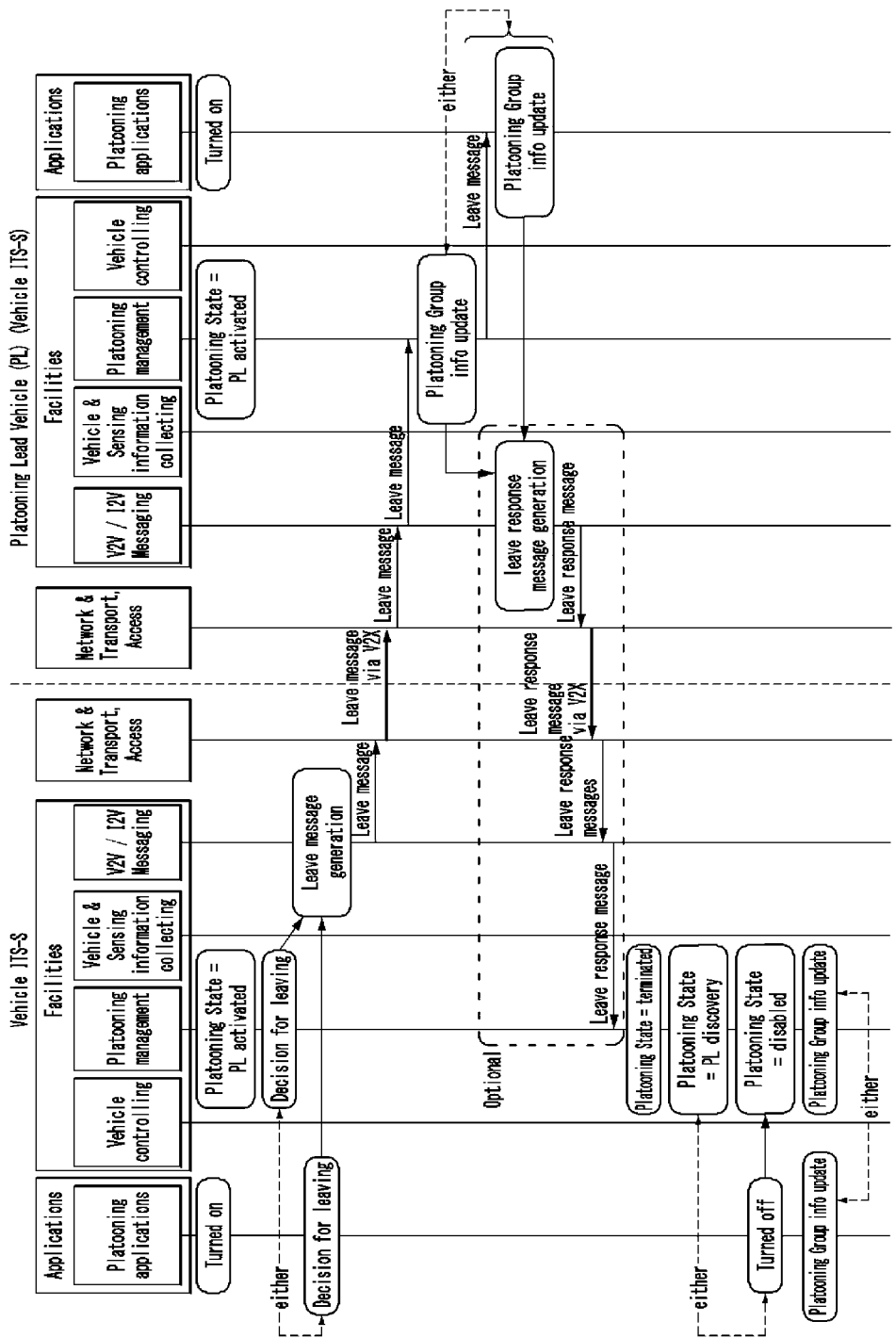
[FIG. 15]

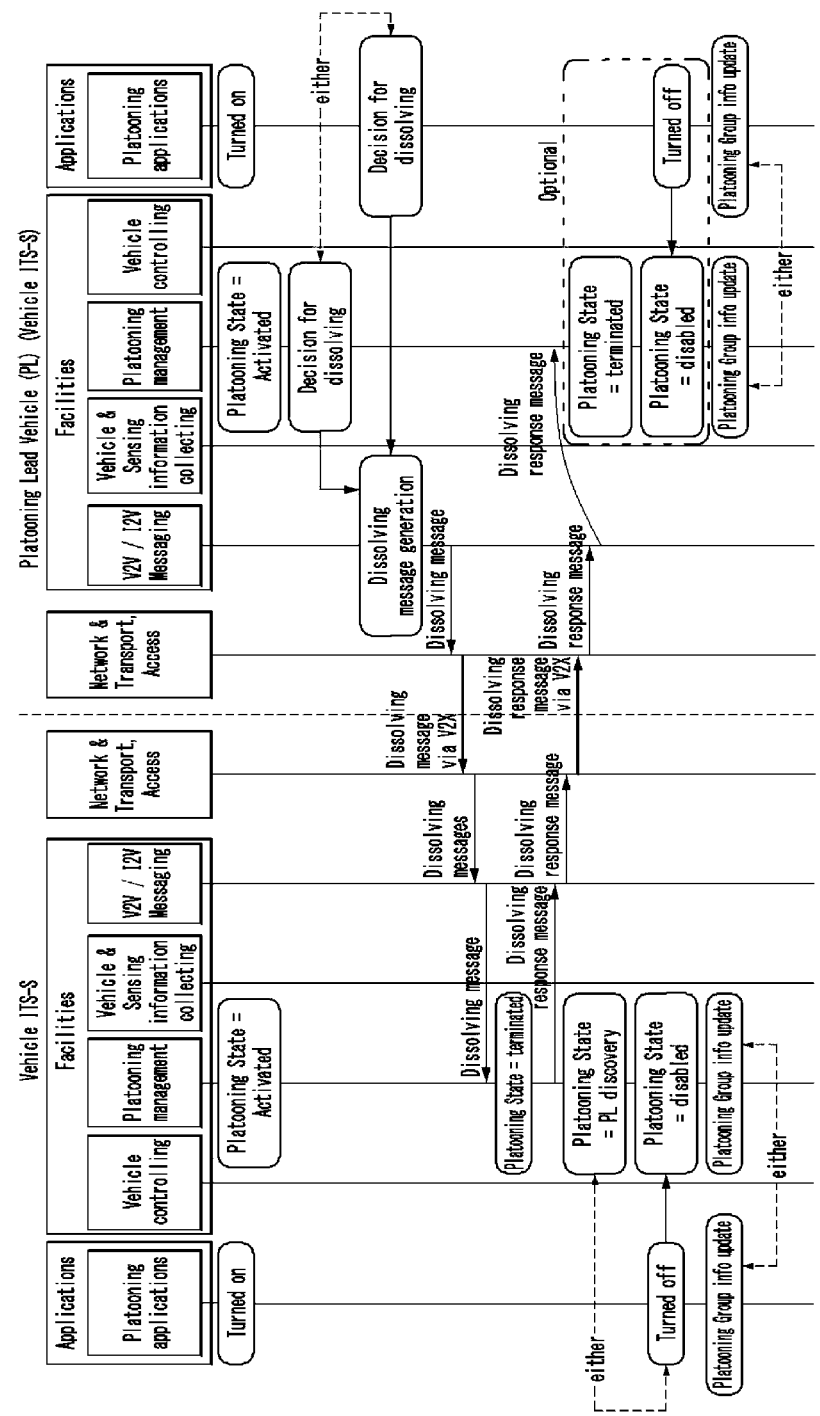
[FIG. 16]

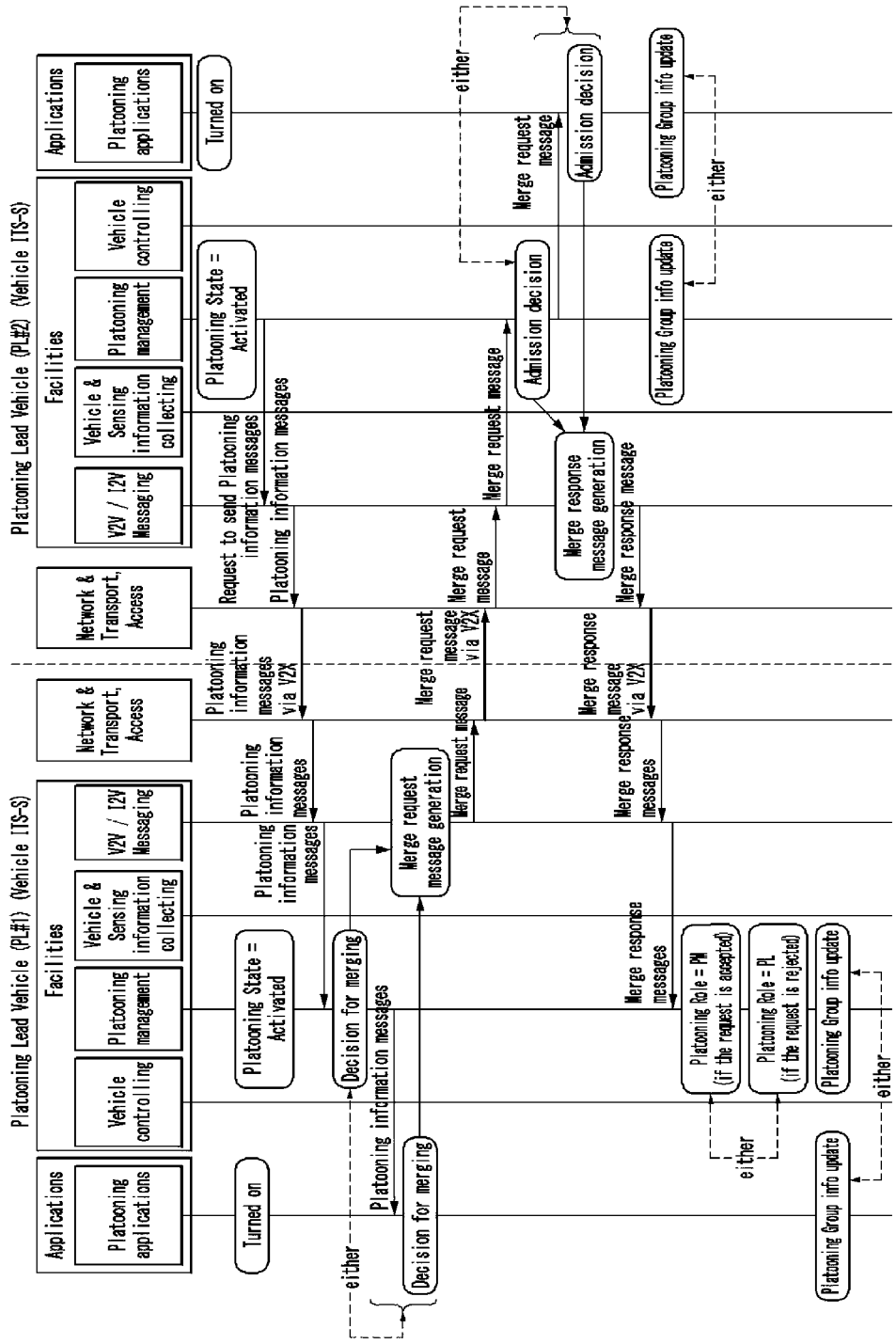
[FIG. 17]

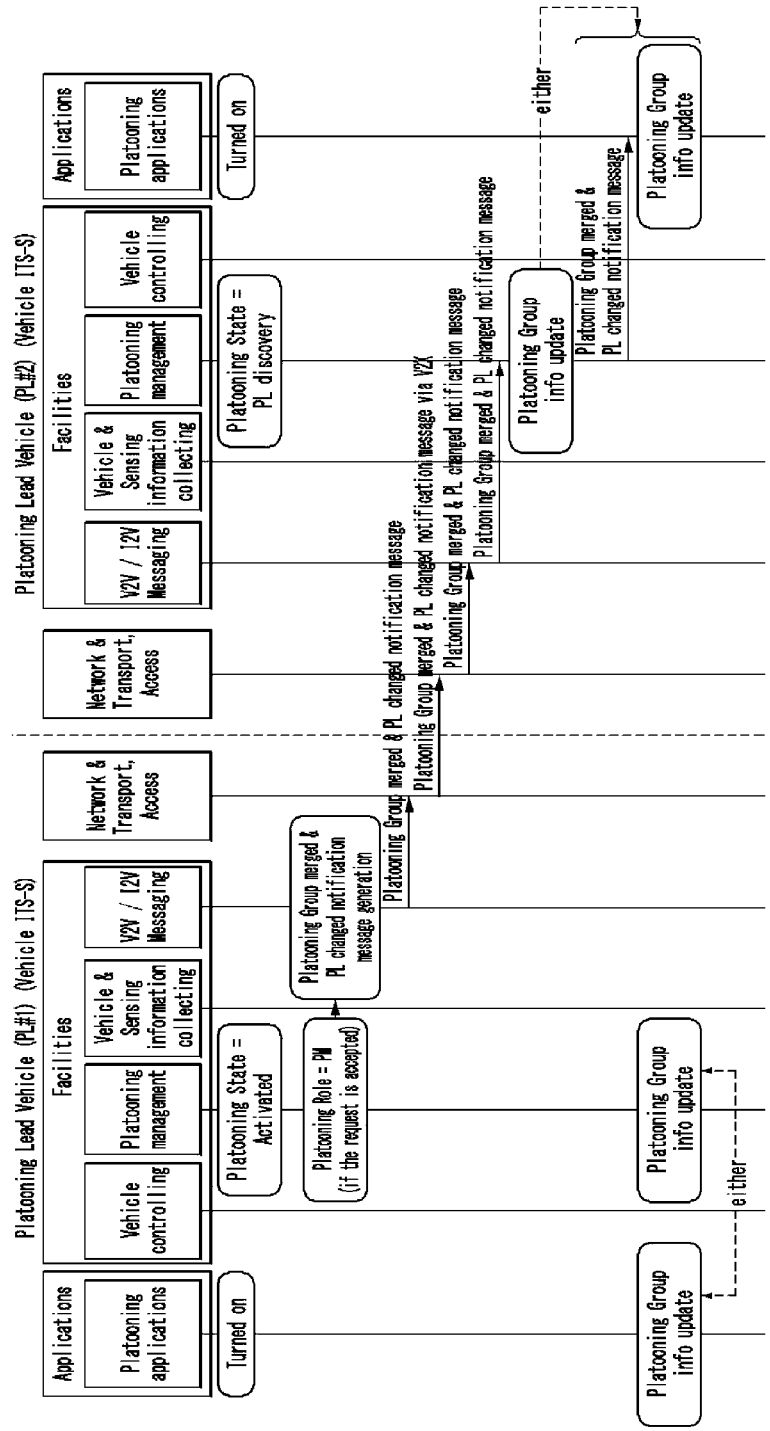
[FIG. 18]

[FIG. 19]
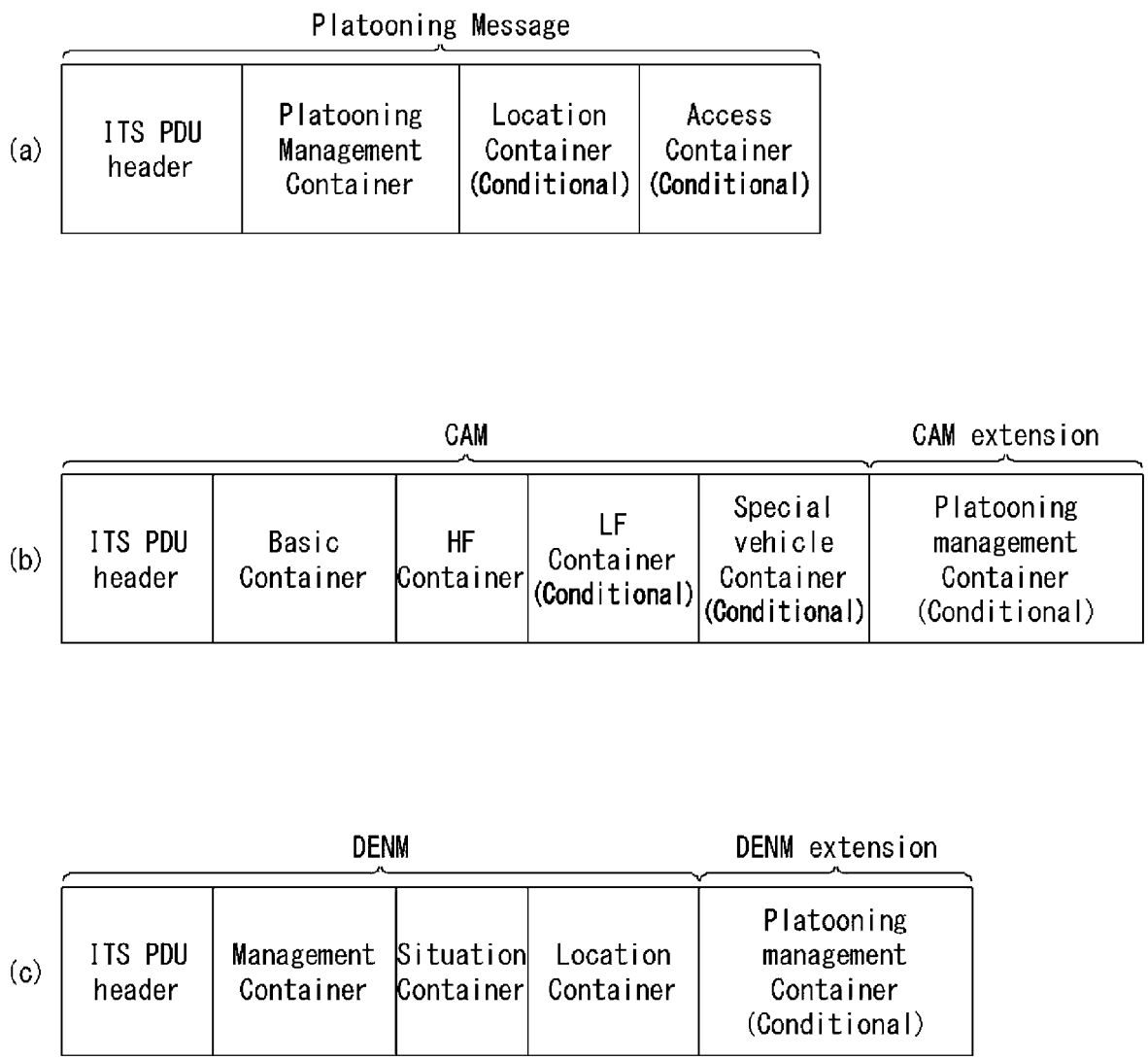

[FIG. 20]
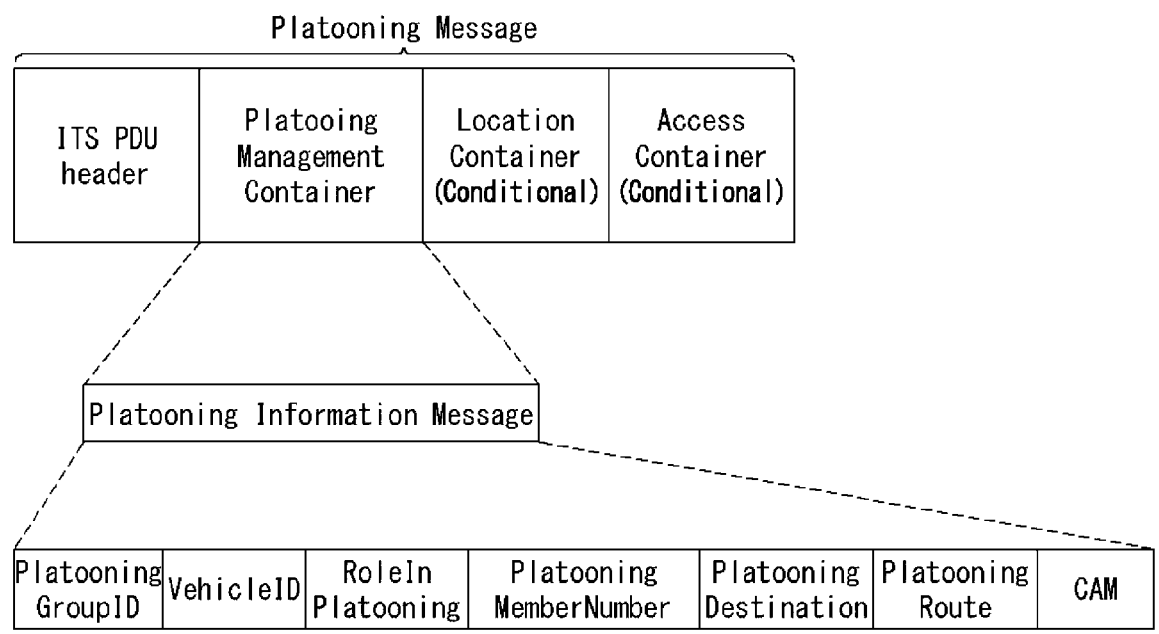

[FIG. 21]
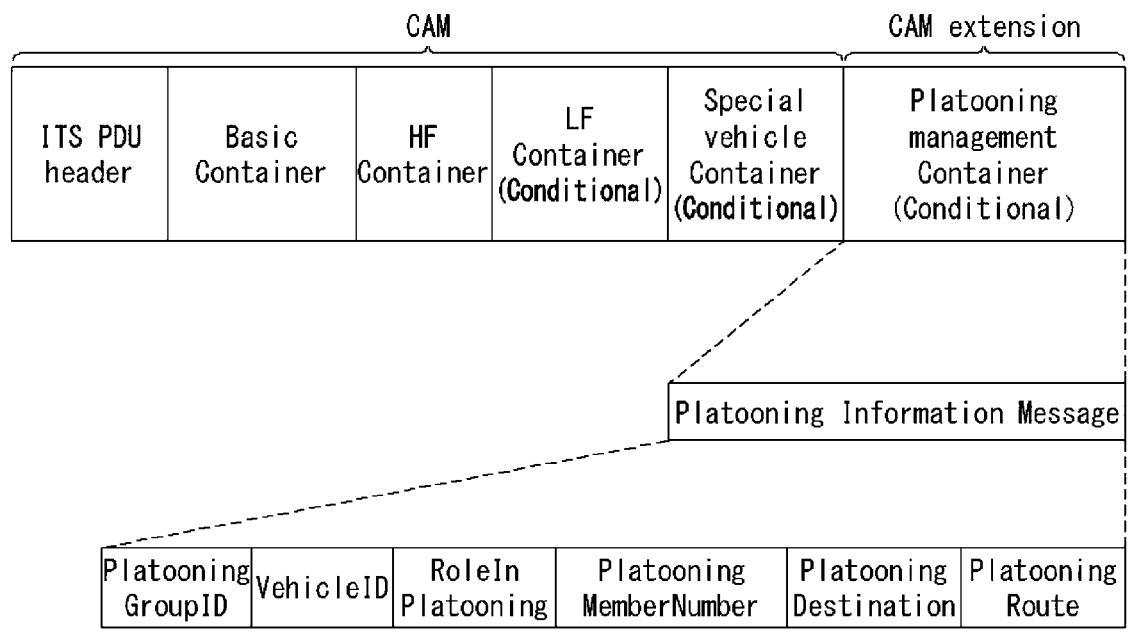

[FIG. 22]
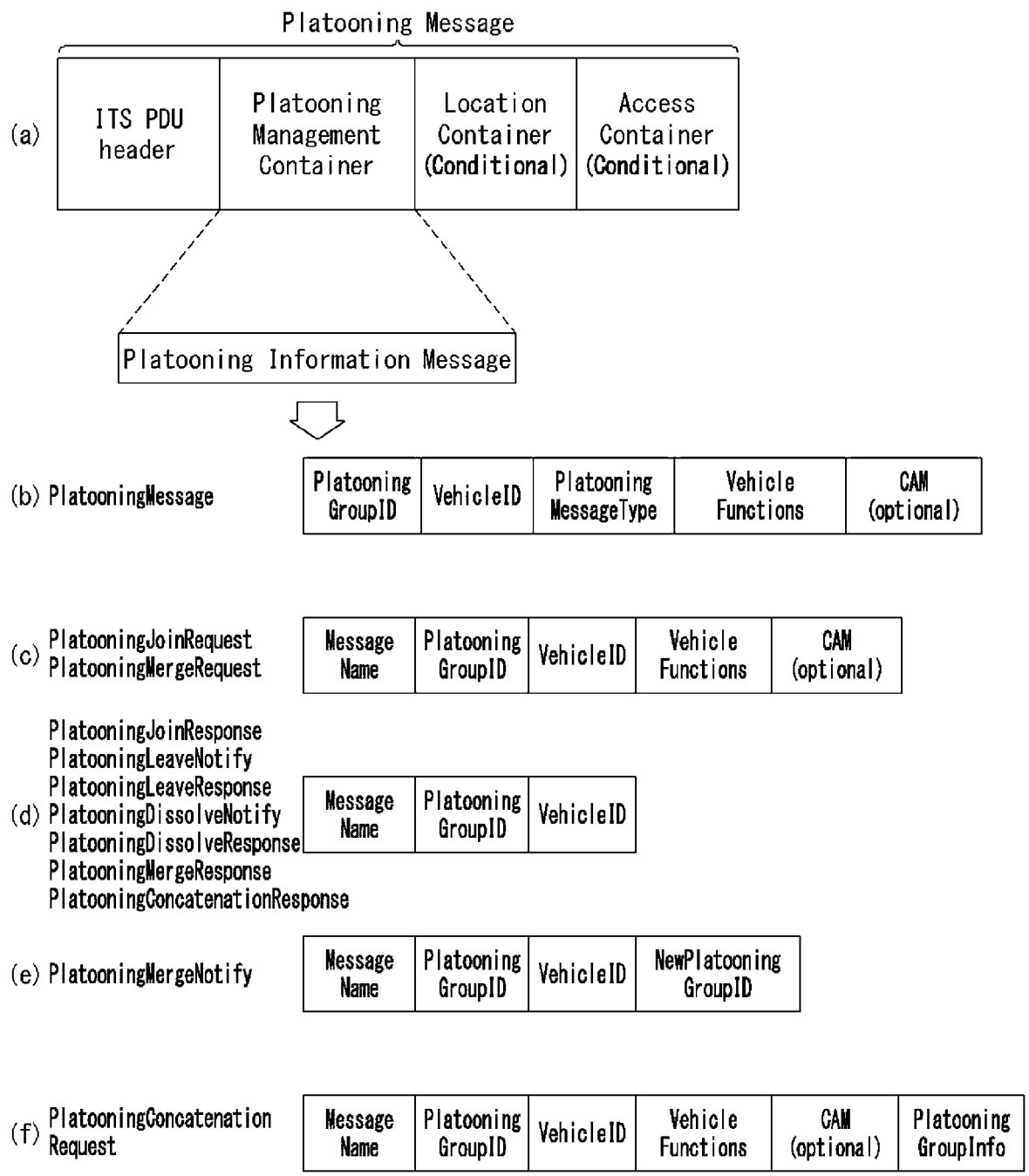

[FIG. 23]

[FIG. 24a]
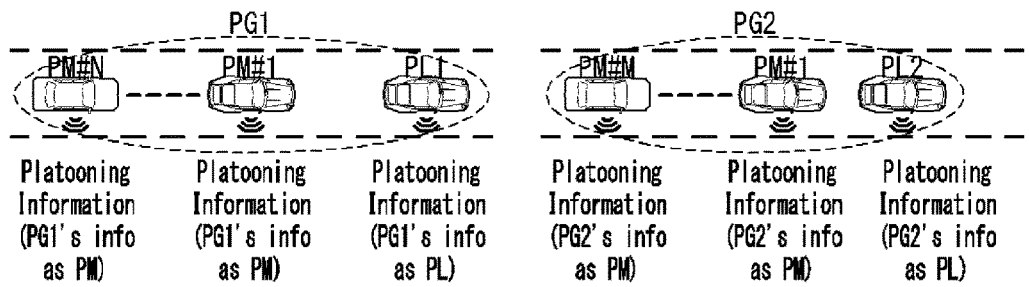
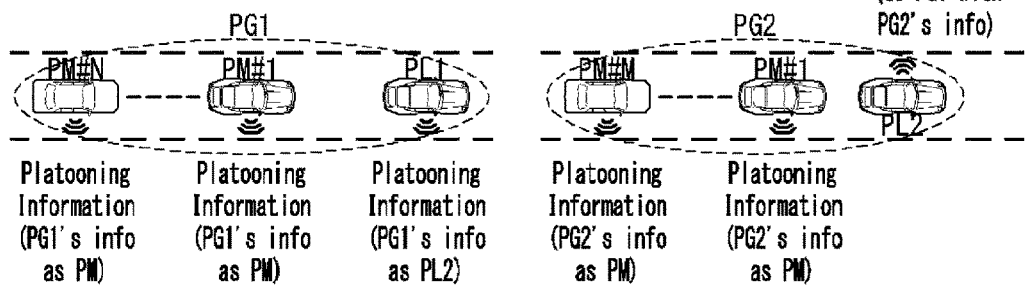
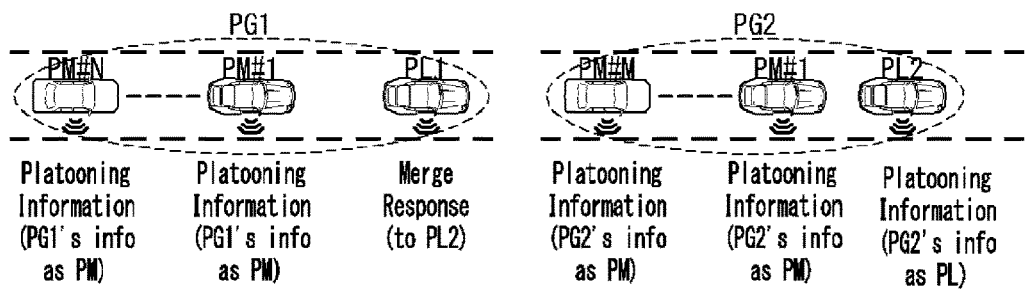
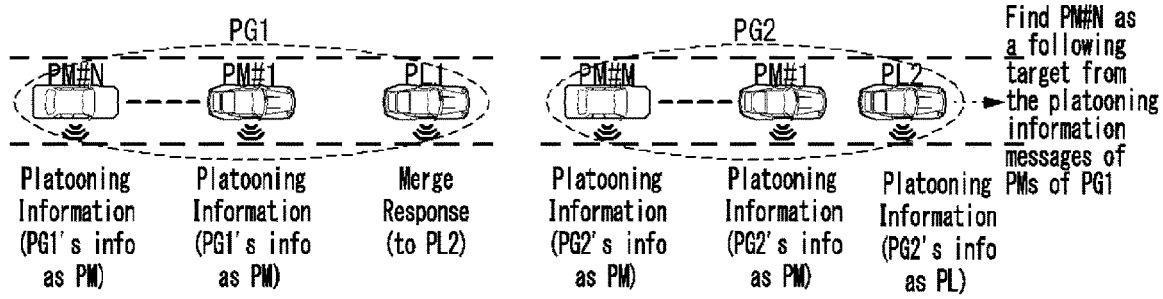

[FIG. 24b]
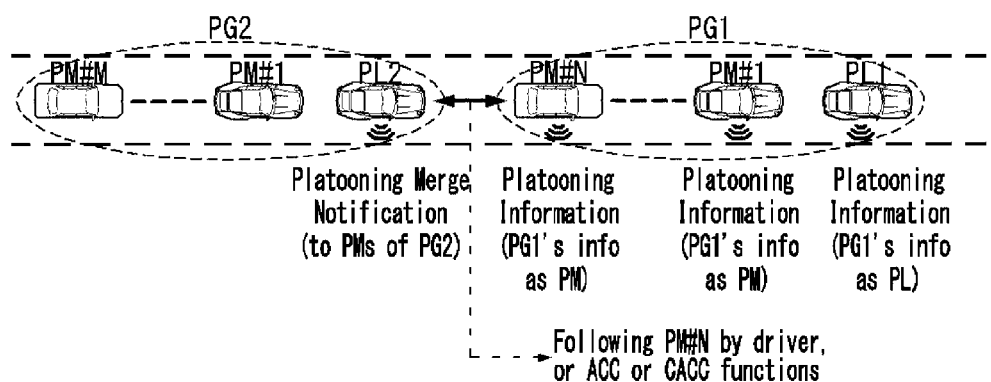
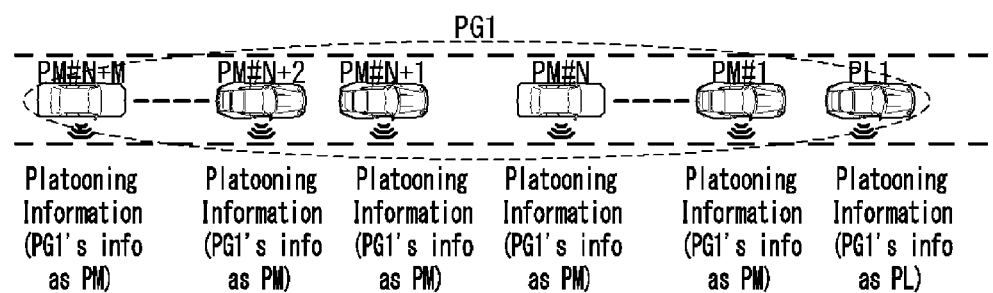

[FIG. 25]
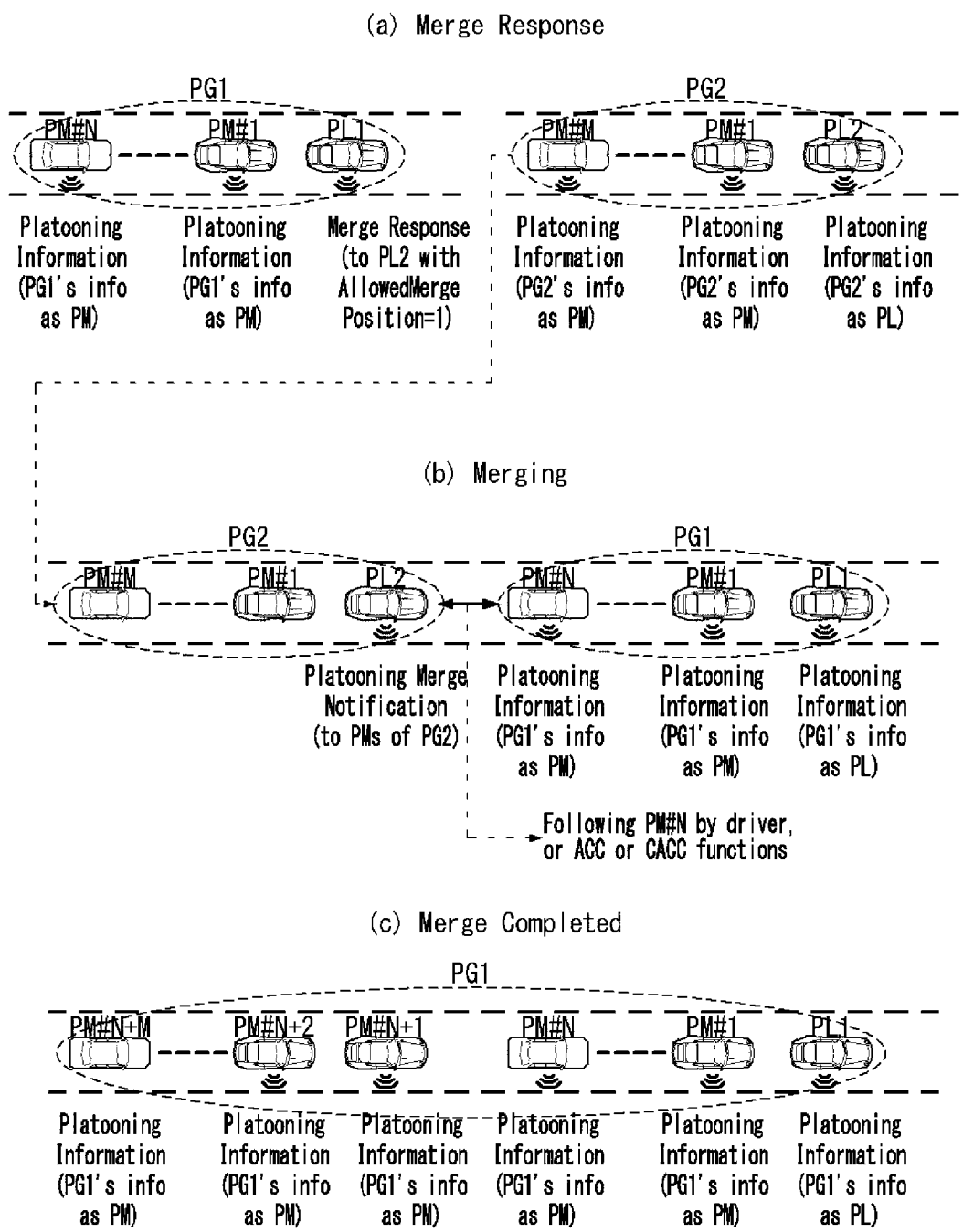

[FIG. 26]
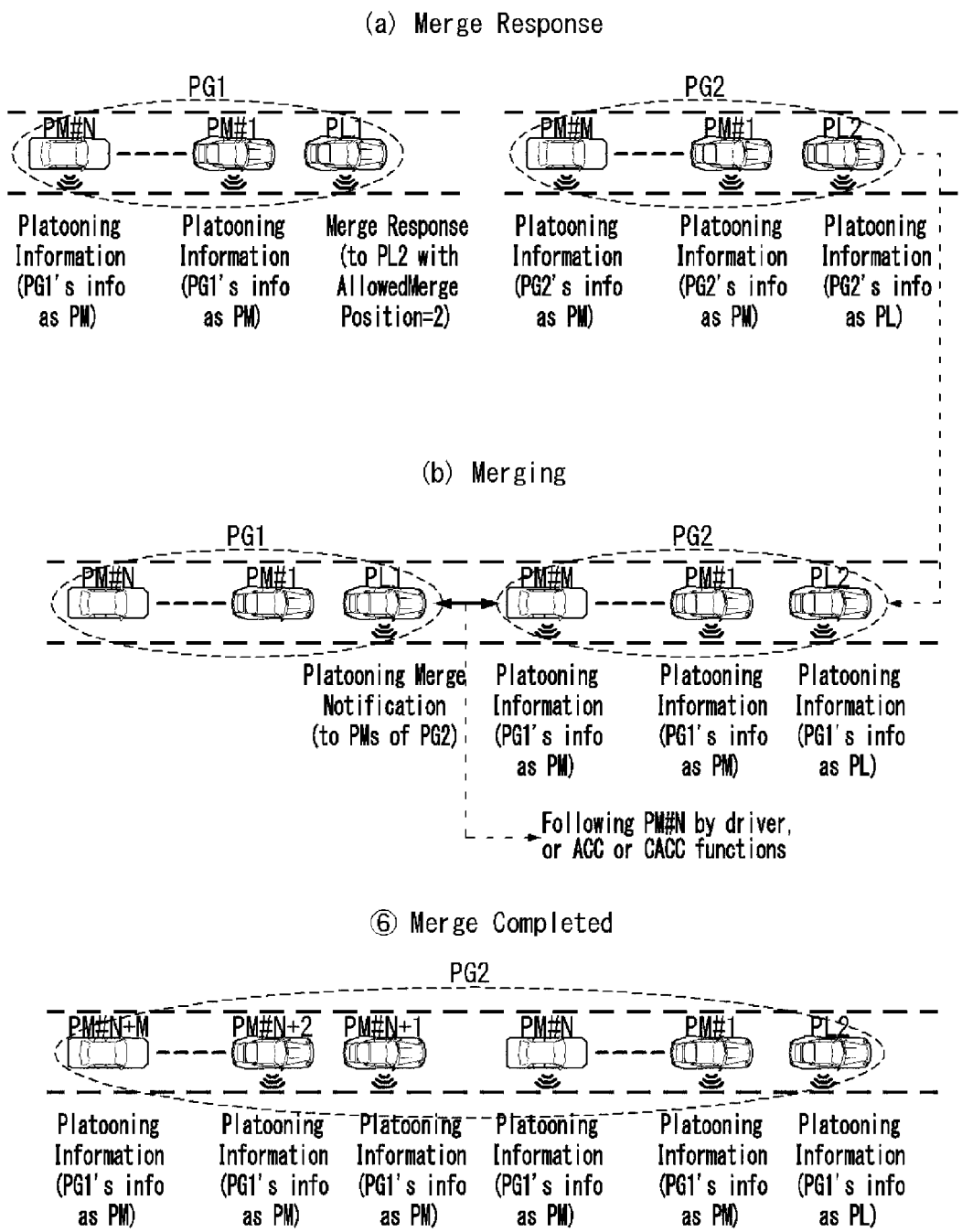

[FIG. 27]
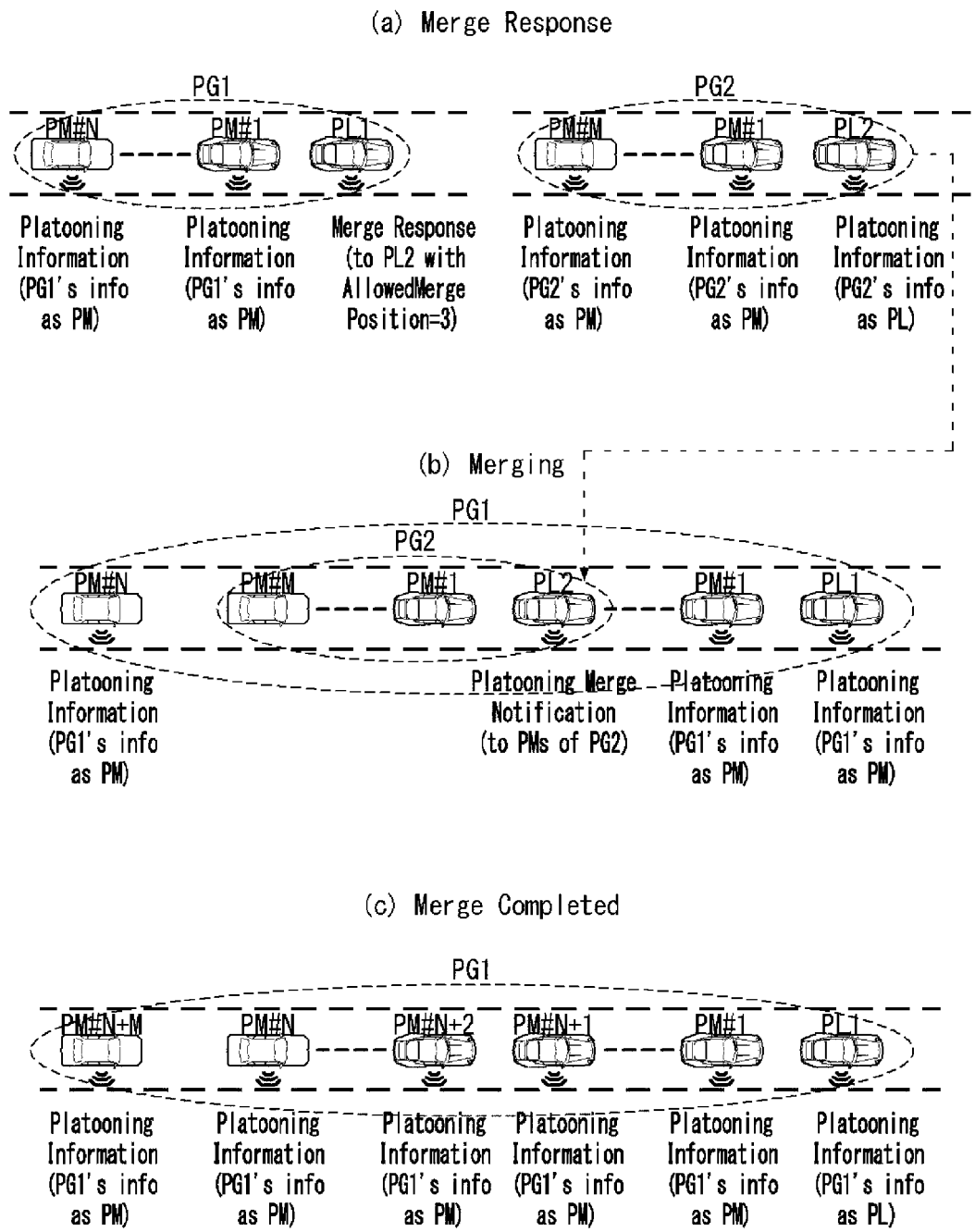

[FIG. 28a]
① 2 Platooning Groups
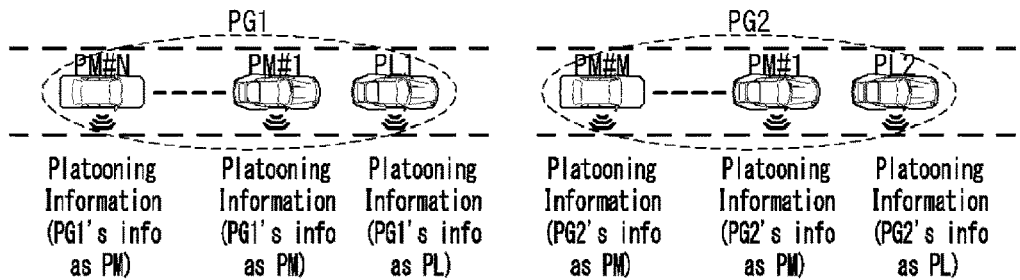
② Concatenation Request
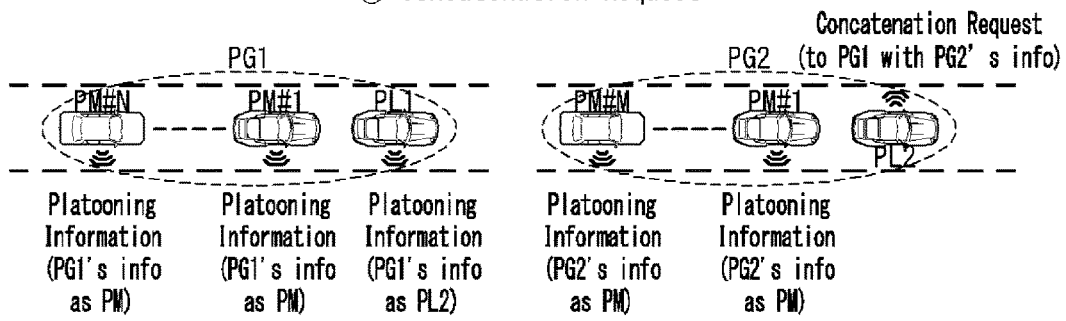
③ Concatenation Response
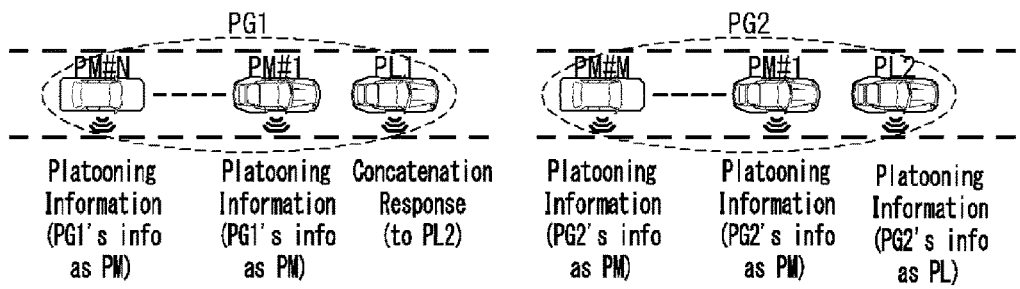
④ Find following target vehicle
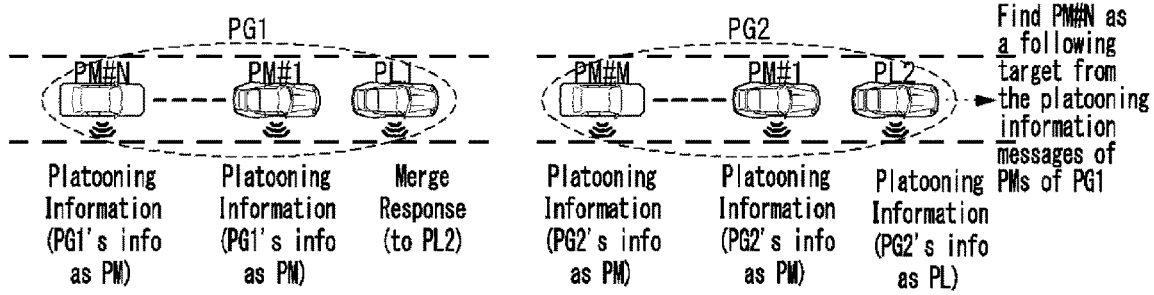

[FIG. 28b]
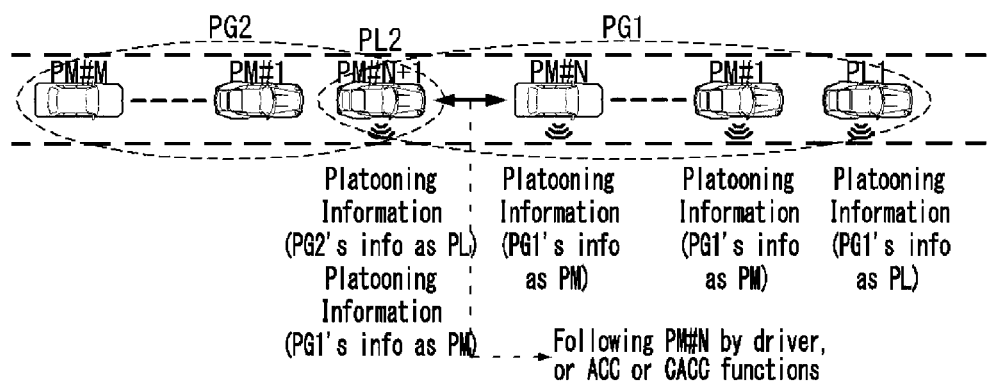

[FIG. 29]
(a) Concatenation
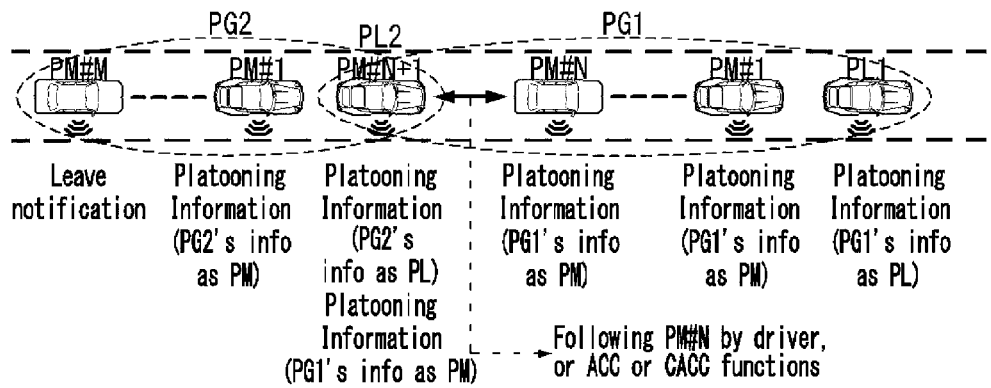
(b) Merging
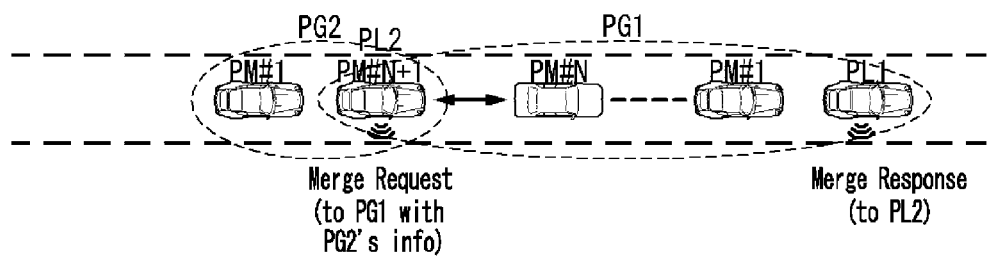
(c) Merge Completed
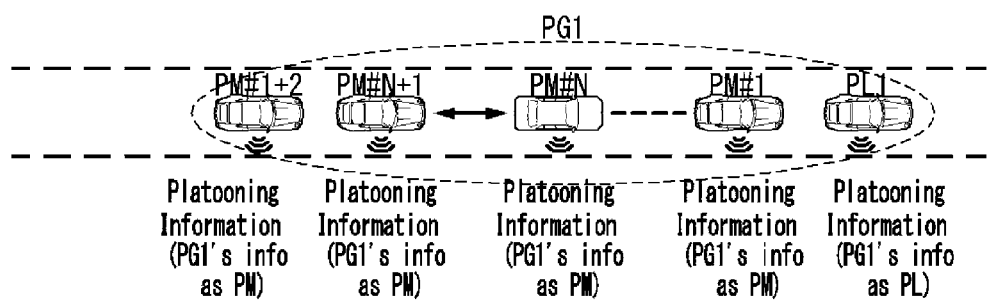

[FIG. 30]
(a) Concatenation
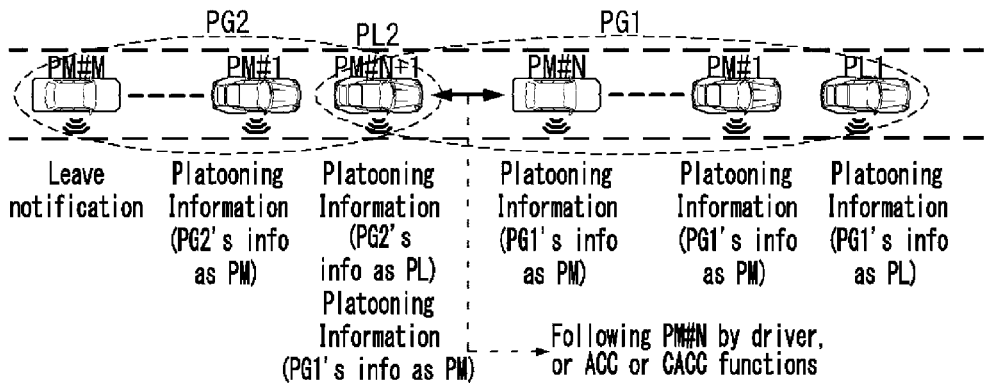
(b) Separating
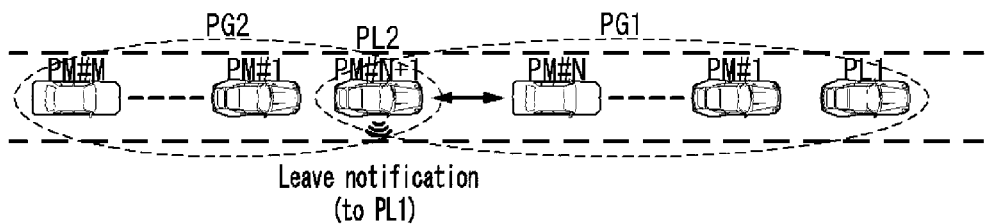
(c) Separation Completed
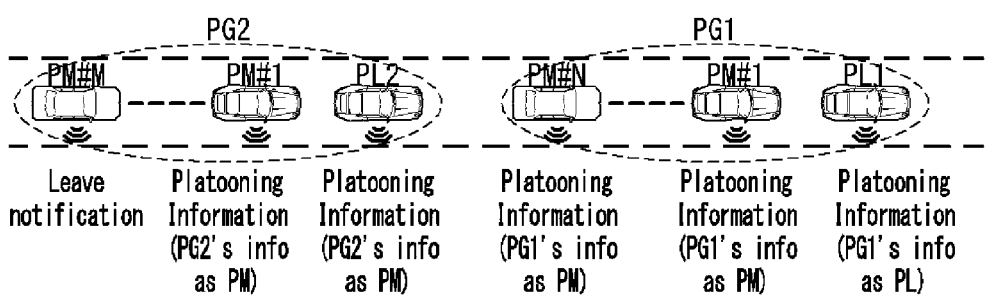

[FIG. 31]
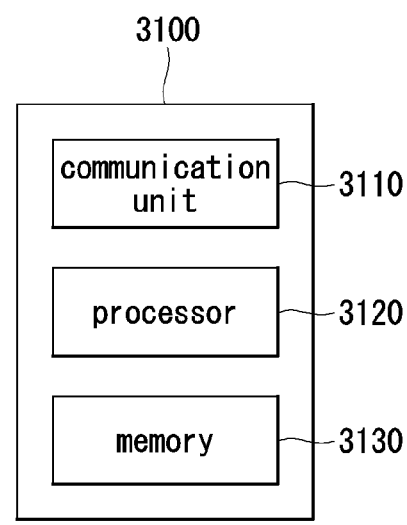

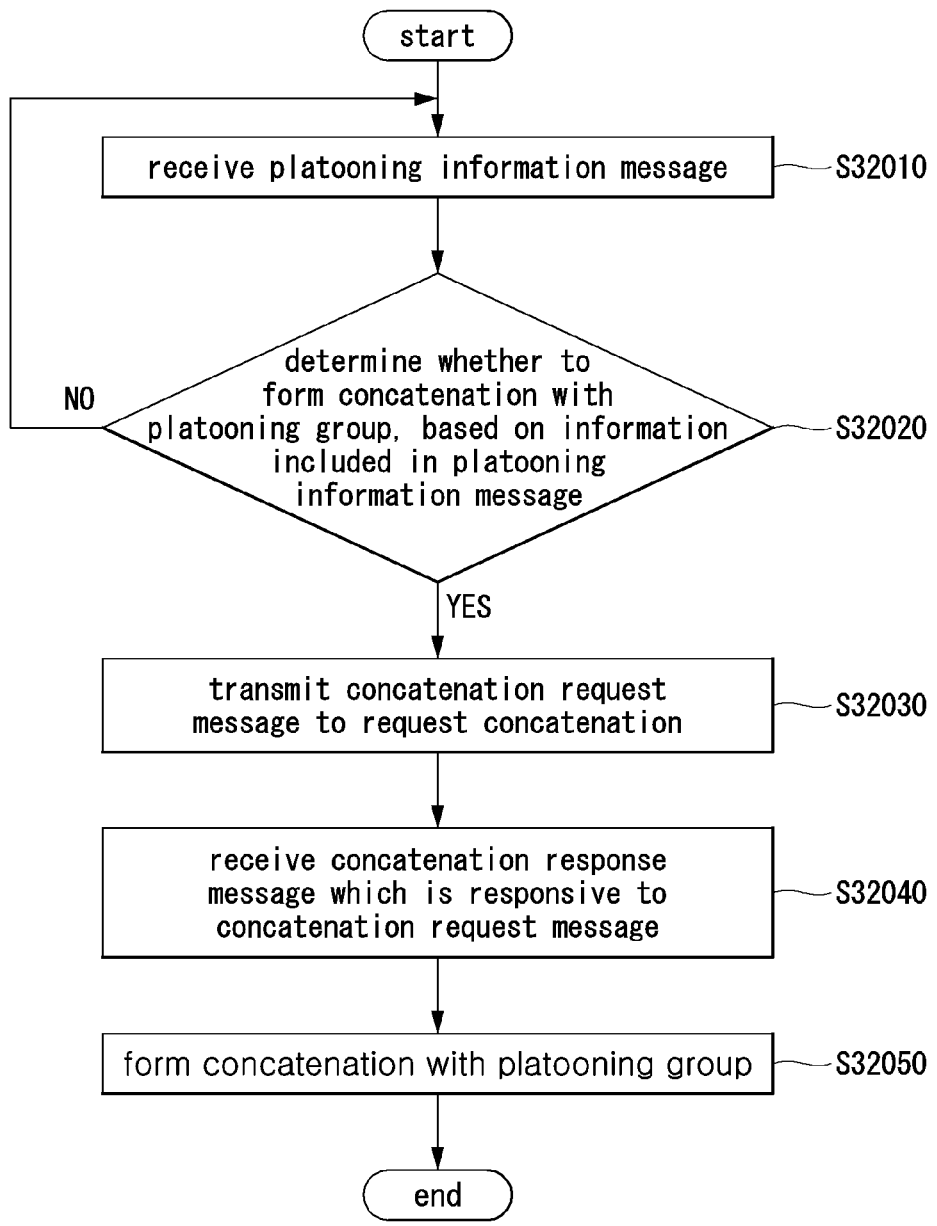

V2X COMMUNICATION DEVICE AND METHOD FOR TRANSMITTING AND RECEIVING V2X MESSAGE BY MEANS OF SAME

CROSS-REFERENCE TO RELATED APPLICATIONS

This application is the National Stage filing under 35 U.S.C. 371 of International Application No. PCT/KR2018/001947, filed on Feb. 14, 2018, the contents of which are all hereby incorporated by reference herein in its entirety.

TECHNICAL FIELD

The disclosure relates to a V2X communication device and V2X message transmission/reception method, and more particularly, to a method for transmitting and receiving a V2X message containing platooning service-related information.

BACKGROUND ART

In recent years, vehicles have become a result of complex industrial technology, which is a fusion of electric, electronic, and communication technologies, centering on mechanical engineering and the vehicle is also called a smart car in such an aspect. Smart cars have been providing various customized mobile services as well as traditional vehicle technology such as traffic safety/complicatedness by connecting drivers, vehicles, and transportation infrastructures. The connectivity may be implemented using vehicle to everything (V2X) communication technology. In addition to safety-related messages between vehicles, communication of a multimedia content may be required. However, due to characteristics of vehicle communication, transmission and reception of the multimedia content are performed quickly and stably and should not cause excessive communication traffic.

DETAILED DESCRIPTION OF THE DISCLOSURE

Technical Problem

Various services may be provided via V2X communication. For example, a platooning service may be provided via V2X communication to enhance drivers' comfort and traffic efficiency and reduce fuel consumption.

However, since no definitions have been made yet for standardized communication architectures, message structures, and operation procedures, efficient communication for a platooning service is hard to achieve. This needs to be thus taken into consideration.

Technical Solution

To achieve the foregoing objectives, there are disclosed a vehicle to everything (V2X) communication device and a V2X communication method by the V2X communication device.

According to an embodiment of the disclosure, a vehicle-to-everything (V2X) communication method performed by a V2X communication device may comprise receiving a platooning information message from an external V2X communication device, the platooning information message including information for a platooning group where a vehicle with the external V2X communication device belongs, determining whether to form a concatenation with the platooning group based on information included in the platooning information message, upon determining to form the concatenation, transmitting a concatenation request message for requesting the concatenation to the external V2X device, receiving a concatenation response message responsive to the concatenation request message from the external V2X device, and forming a concatenation with the platooning group.

According to an embodiment, the platooning information message may include at least one of ID information for identifying a message transmitter transmitting the platooning information message, platooning group ID information for identifying a platooning group where the message transmitter belongs, platooning role information indicating a role of the message transmitter, platooning member count information indicating a number of members of the platooning group, platooning destination information indicating a geographical location of a destination of the platooning group, or platooning route information indicating a geographical location of at least one route of the platooning group.

According to an embodiment, the concatenation request message may include at least one of ID information for identifying a message transmitter transmitting the concatenation request message, platooning group ID information for identifying a platooning group with which the message transmitter desires to concatenate, or function information indicating a function associated with the message transmitter, and the concatenation response message may include at least one of the ID information or the platooning group ID information.

According to an embodiment, the concatenation response message may further include concatenation location information indicating a location of concatenation of the platooning group, and forming the concatenation with the platooning group may further include determining the location of concatenation with the platooning group based on the concatenation location information.

According to an embodiment, forming the concatenation may include configuring a vehicular role to allow the vehicle with the V2X communication device to play a role as a leading vehicle of an original platooning group and a role as a member vehicle of a newly concatenated platooning group.

According to an embodiment, the V2X communication method may further comprise transmitting a merge request message for requesting to merge with the platooning group to the external V2X device, receiving a merge response message responsive to the merge request message from the external V2X device, and merging with the platooning group.

According to an embodiment, the merge request message may include at least one of ID information for identifying a message transmitter transmitting the merge request message, platooning group ID information for identifying a platooning group with which the message transmitter desires to merge, or function information indicating a function associated with the message transmitter, and the merge response message may include at least one of the ID information or the platooning group ID information.

According to an embodiment, merging with the platooning group may further include transmitting a merge notification message to member vehicles of an original platooning group and configuring a vehicular role to allow the vehicle with the V2X communication device to play a role as a member vehicle of a newly merged platooning group, and the merge notification message may include platooning group ID information for identifying the original platooning group and new platooning group information for providing information for the newly merged platooning group.

According to an embodiment, the V2X communication method may further comprise separating the concatenation, the separating including transmitting a leave notification message to the external V2X communication device. The leave notification message may include at least one of ID information for identifying a message transmitter transmitting the leave notification message or platooning group ID information for identifying a platooning group from which the message transmitter desires to leave.

According to an embodiment of the disclosure, a V2X communication device may comprise a memory storing data, a communication unit transmitting and receiving a wireless signal, and a processor controlling the communication unit. The processor may receive a platooning information message from an external V2X communication device, the platooning information message including information for a platooning group where a vehicle with the external V2X communication device belongs, determine whether to form a concatenation with the platooning group based on information included in the platooning information message, upon determining to form the concatenation, transmits a concatenation request message for requesting the concatenation to the external V2X device, receive a concatenation response message responsive to the concatenation request message from the external V2X device, and form a concatenation with the platooning group.

Advantageous Effects

According to the disclosure, a communication architecture and state transition model are defined for a platooning service, allowing the V2X communication device to provide a platooning service.

Further, operation procedures for a platooning service, such as a platooning group forming procedure, a platooning group join procedure, a platooning group leave procedure, a platooning group dissolving procedure, a platooning group merge procedure, and a platooning group concatenation procedure, are proposed, allowing the V2X communication device to efficiently provide the platooning service.

Further, message structures for a platooning service may be defined, allowing the V2X communication device to efficiently provide a platooning service.

BRIEF DESCRIPTION OF DRAWINGS

The accompanying drawings, which are included to provide a further understanding of the disclosure and are incorporated in and constitute a part of this application, illustrate embodiments of the disclosure together with the detailed description serving to describe the principle of the disclosure.

FIG. 1 illustrates an intelligent transport system (ITS) according to an embodiment of the disclosure.

FIG. 2 illustrates a V2X transmission/reception system according to an embodiment of the disclosure.

FIG. 3 illustrates a configuration of a V2X system according to an embodiment of the disclosure.

FIG. 4 illustrates a packet structure of a network/transport layer according to an embodiment of the disclosure.

FIG. 5 illustrates a configuration of a V2X system according to another embodiment of the disclosure.

FIG. 6 illustrates a WSMP packet configuration according to an embodiment of the disclosure.

FIG. 7 illustrates a conceptual internal architecture of an MAC sublayer performing a multi-channel operation (MCO) according to an embodiment of the disclosure.

FIG. 8 illustrates a relationship between a user priority of EDCA and access category (AC) according to an embodiment of the disclosure.

FIG. 9 illustrates a physical layer configuration of a V2X transmitting apparatus according to an embodiment of the disclosure.

FIG. 10 illustrates a normal platooning architecture according to an embodiment of the disclosure.

FIG. 11 illustrates a dedicated platooning architecture according to an embodiment of the disclosure.

FIG. 12 illustrates a state transition model for a platooning member vehicle according to an embodiment of the disclosure.

FIG. 14 illustrates a procedure for joining a platooning group according to an embodiment of the disclosure.

FIG. 15 illustrates a procedure for leaving a platooning group according to an embodiment of the disclosure.

FIG. 16 illustrates a procedure for dissolving a platooning group according to an embodiment of the disclosure.

FIG. 17 illustrates a procedure for merging platooning groups according to an embodiment of the disclosure.

FIG. 18 illustrates a procedure for notifying of a merging of platooning groups according to an embodiment of the disclosure.

FIG. 19 illustrates a structure of an ITS message for a platooning service according to an embodiment of the disclosure.

FIG. 20 illustrates a transmission scheme of a platooning information message using a platooning dedicated ITS message according to an embodiment of the disclosure.

FIG. 21 illustrates a transmission scheme of a platooning information message using an extended CAM message according to an embodiment of the disclosure.

FIG. 22 illustrates a transmission scheme of a platooning negotiation message using a platooning dedicated ITS message according to an embodiment of the disclosure.

FIG. 23 illustrates a transmission scheme of a platooning information message using an extended DENM message according to an embodiment of the disclosure.

FIG. 24a and FIG. 24b illustrate a merging procedure among platooning groups according to an embodiment of the disclosure.

FIG. 25 illustrates a merging procedure using allowed merging position information according to a first embodiment of the disclosure.

FIG. 26 illustrates a merging procedure using allowed merging position information according to a second embodiment of the disclosure.

FIG. 27 illustrates a merging procedure using allowed merging position information according to a third embodiment of the disclosure.

FIG. 28a and FIG. 28b illustrate a linking procedure among platooning groups according to an embodiment of the disclosure.

FIG. 29 illustrates a procedure of switching from connection to merging according to an embodiment of the disclosure.

FIG. 30 illustrates a separation procedure according to an embodiment of the disclosure.

FIG. 31 illustrates a configuration of a V2X communication device according to an embodiment of the disclosure.

FIG. 32 is a flowchart illustrating a V2X communication method by a V2X communication device according to an embodiment of the disclosure.

MODE FOR CARRYING OUT THE DISCLOSURE

Figure 13:
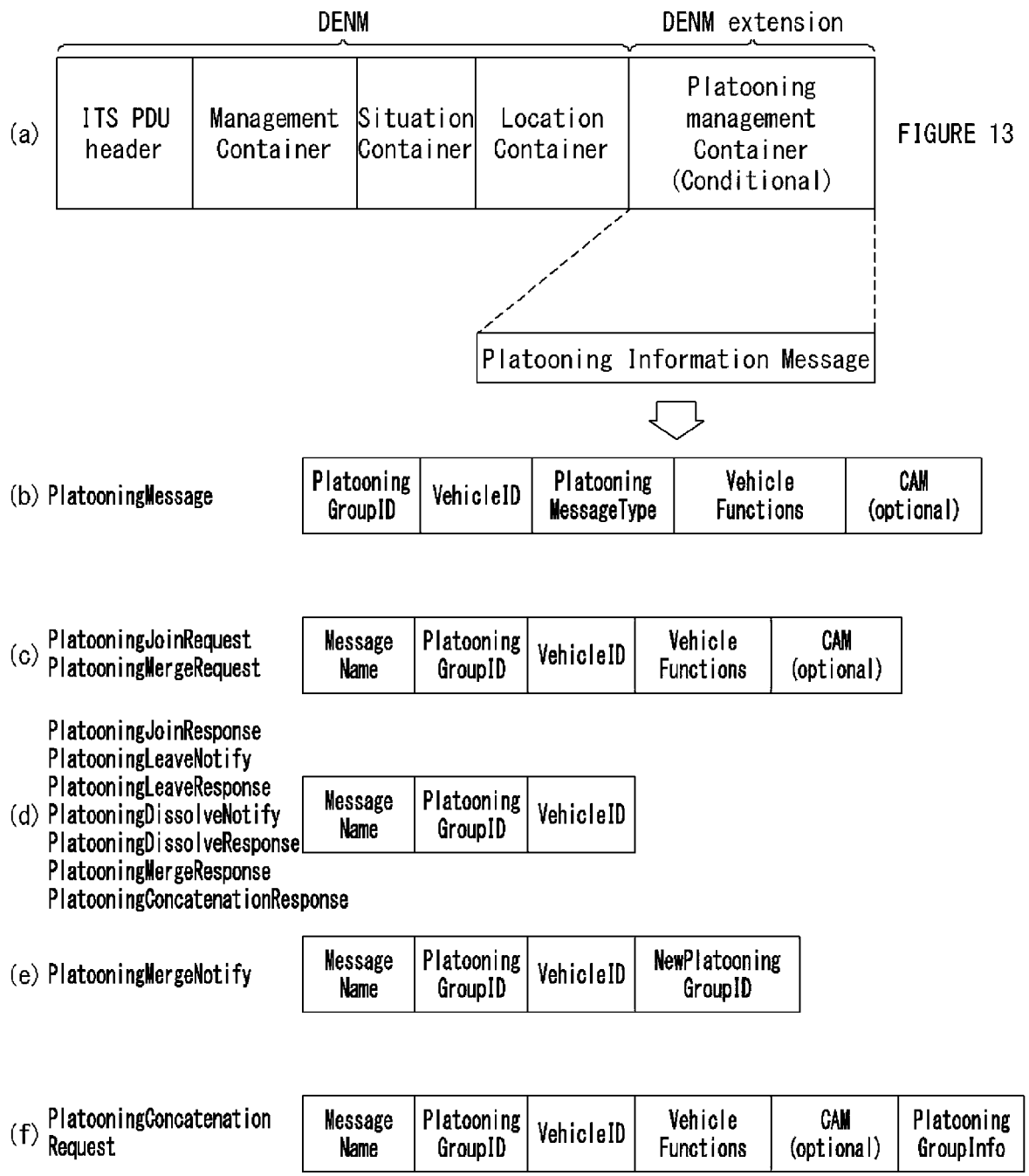
FIG. 13 illustrates a state transition model for a platooning leader vehicle according to an embodiment of the disclosure.

Preferred embodiments of the disclosure are described in detail and examples thereof are illustrated in the accompanying drawings. The following detailed description with reference to the accompanying drawings is intended to illustrate the preferred embodiments of the disclosure rather than merely illustrating embodiments that may be implemented according to embodiments of the disclosure. The following detailed description includes details in order to provide a thorough understanding of the disclosure, but the disclosure does not require all of these details. In the disclosure, respective embodiments described below need not be particularly used separately. Multiple embodiments or all embodiments may be together used and specific embodiments may be used as a combination.

Most of the terms used in the disclosure are selected from the general ones that are widely used in the field, but some terms are arbitrarily selected by the applicant and the meaning thereof will be described in detail in the following description, as necessary. Accordingly, the disclosure should be understood based on the intended meaning of the term rather than the mere name or meaning of the term.

The disclosure relates to a V2X communication apparatus and the V2X communication apparatus is included in an Intelligent Transport System (ITS) to perform all or some functions of the ITS. The V2X communication apparatus may communicate with vehicles and vehicles, vehicles and infrastructure, vehicles and bicycles, and mobile devices. The V2X communication apparatus may be abbreviated as a V2X apparatus. As an embodiment, the V2X apparatus may correspond to an on board unit (OBU) of the vehicle or may be included in the OBU. The OBU may also be referred to as on a board equipment (OBE). The V2X apparatus may correspond to a road side unit (RSU) of the infrastructure or may be included in the RSU. The RSU may also be referred to as a road side equipment (RSE). Alternatively, the V2X communication apparatus may correspond to an ITS station or may be included in the ITS station. All of a predetermined OBU, a predetermined RSU, and a predetermined mobile equipment that perform V2X communication may also be referred to as the ITS station or the V2X communication apparatus.

FIG. 1 illustrates an intelligent transport system (ITS) according to an embodiment of the disclosure.

The intelligent transport system means a system that provides an efficient and safe transport service by applying information and communication technology such as an electronic control and communication device to transportation means such as automobiles, buses, trains, or the like and transportation facilities including traffic lights, an electronic display board, and the like. In order to support the ITS, vehicle to everything (V2X) technology may be used. V2X communication technology represents communication technology between vehicles or between the vehicle and a peripheral device.

A vehicle that supports V2X communication is equipped with the OBU and the OBU includes a dedicated short-range communication (DSRC) communication modem. An infrastructure including a V2X module installed around a road, such as the traffic light, may be referred to as an RSU. Vulnerable road users (VRUs) are transportation weakness and pedestrians, bicycles, wheelchairs, etc. may correspond to the VRUs. The VRU may perform V2X communication.

Vehicle to vehicle (V2V) refers to inter-vehicle communication or communication technology including a V2X communication apparatus. Vehicle to infra-structure (V2I) refers to communication or communication technology between the vehicle and an infra-structure including the V2X communication apparatus. Besides, communication between the vehicle and the transportation weakness may refer to V2O and communication between the infra-structure and the transportation weakness may refer to I2O.

FIG. 2 illustrates a V2X transmission/reception system according to an embodiment of the disclosure.

A V2X transmission/reception system includes a V2X transmitter 2100 and a V2X receiver 2200 and the transmitter and the receiver are distinguished from each other according to roles of transmitting and receiving data and are not different from each other in a configuration of a device. The V2X transmitter 2100 and the V2X receiver 2200 are both the V2X communication apparatuses.

The V2X transmitter 2100 includes a Global Navigation Satellite System (GNSS) receiver 2110, a DSRC radio 2120, a DSRC device processor 2130, an application Electronic Control Unit (ECU) 2140, a sensor 2150, and a human interface 2160.

The DSRC radio 2120 may perform communications based on the IEEE 802.11 standard based on a Wireless Local Area Network (WLAN) and/or the Wireless Access in Vehicular Environments (WAVE) standard of the Society of Automotive Engineers (SAE). The DSRC radio 2120 may perform operations of a physical layer and an MAC layer.

The DSRC device processor 2130 may decode a message received by the DSRC radio 2120 or decode a message to be transmitted. The GNSS receiver 2110 may process GNSS and acquire positional information and temporal information. As an example, the GNSS receiver 2110 may become a Global Positioning System (GPS) device.

The application ECU 2140 may be a microprocessor for providing a specific application service. The application ECU may generate an operation/message based on sensor information and a user input in order to provide a service and transmit/receive the message by using the DSRC device processor. The sensor 2150 may obtain vehicle status and ambient sensor information. The human interface 2160 may receive a user's input or display/provide the message through an interface such as an input button or a monitor.

The V2X receiver 2200 includes a Global Navigation Satellite System (GNSS) receiver 2210, a DSRC radio 2220, a DSRC device processor 2230, an application Electronic Control Unit (ECU) 2240, a sensor 2250, and a human interface 2260. The aforementioned description of the configuration of the V2X transmitter 2100 is applied to the configuration of the V2X receiver 2200.

The DSRC radio and the DSRC device processor correspond to one embodiment of a communication unit. The communication unit may perform communication based on cellular communication technology such as 3GPP and Long Term Evolution (LTE).

FIG. 3 illustrates a configuration of a V2X system according to an embodiment of the disclosure.

As an embodiment, the V2X system of FIG. 3 may correspond to an ITS station reference architecture defined in ISO 21217/EN302 665. In FIG. 3, the ITS station illustrates an example of an ITS station based on a reference architecture. FIG. 3 illustrates a hierarchical architecture for end-to-end communication. When a vehicle-to-vehicle message is communicated, the message is passed through each layer one layer down in a transmitting vehicle/ITS system and the message is delivered to an upper layer one layer up in a receiving vehicle/ITS system. The description of each layer is as follows.

Application layer: The application layer may implement and support various use cases. For example, an application may provide road safety, efficient traffic information, and other application information.

The application layer may classify and define the ITS application and provide an end vehicle/user/infra-structure through the lower layer. The application may be defined/applied for each user case or the use-case may be grouped and defined/applied like the road safety, traffic efficiency, a local service, and infotainment. As an embodiment, application classification, the use-case, and the like may be updated when a new application scenario is generated. Layer management may manage and serve information related to an operation and a security of the application layer. The information and the service may be bidirectionally delivered and shared through an interface between MAMA (management entity and application layer and SA (interface between security entity and ITS-S applications) or service access point (SAP) (e.g., MA-SAP and SA-SAP). A request from the application layer to a facility layer or information delivery from the facility layer to the application layer may be performed through FA (interface between facilities layer and ITS-S applications) (or FA-SAP).

Facilities layer: The facility layer may support various use-cases defined in the application layer so as to effectively implement various use-cases. For example, the facility layer may perform application support, information support, and session/communication support.

The facility layer may basically support functions of a session layer, a presentation layer, and an application layer which are top three layers. The facility layer may additionally provide evolved facilities such as the application support, the information support, and the session/communication support for the ITS system. The facility means a component that provides functionality, information, and data.

The facilities may be classified into a common facility and a domain facility. The common facility may provide a core service or function required for a basic application set of the ITS and an operation of the ITS station. For example, time management, position management, service management, and the like may be provided. The domain facility may provide a special service or function to the basic application set of one or plural ITSs. For example, the domain facility may provide DEcentralized Notification Messages (DENM) management for Road Hazard Warning applications (RHW). When the domain facility as an optional function is not supported by the ITS station, the domain facility may not be used.

Networking & Transport layer: The network/transport layer may configure a network for vehicle communication between homogeneous/heterogeneous networks by using various transport protocols and network protocols. For example, the networking/transport layer may provide Internet connection and routing using an Internet protocol such as TCP/UDP+IPv6 or the like. Alternatively, the networking/transport layer may configure a vehicle network by using a geographical position based protocol such as a basic transport protocol (BTP)/geonetworking.

The transport layer corresponds to a connection layer between services providing upper layers (session layer, presentation layer, and application layer) and lower layers (network layer, data link layer, and physical layer). The transport layer serves to manage data sent by a user to accurately arrive at a destination. At a transmitting side, the transport layer may serve to split data into packets having an appropriate size for transmission for efficient data transmission. At a receiving side, the transport layer may serve to recombine the received packets into an original file. As an embodiment, the transport protocol may adopt TCP/UDP and a transport protocol for ITS such as VTS may be used.

The network layer may allocate a logical address and decide a packet transfer path. The network layer may receive a packet generated by the transport layer and add a network header including the logical address of the destination. As an example of a packet path design, unicast/broadcast may be considered between the vehicles, between the vehicle and a fixation station, and between fixation stations. As an embodiment, as the network protocol for the ITS, a protocol such as geo-networking, IPv6 networking with mobility support, IPv6 over geo-networking, or the like may be considered.

Access layer: The access layer may transmit messages/data received by the upper layer through a physical channel. For example, the access layer may perform/support data communication based on IEEE 802.11 and/or 802.11p standard-based communication technology, ITS-G5 wireless communication technology based on physical transmission technology of the IEEE 802.11 and/or 802.11p standards, 2G/3G/4G (LTE)/5G wireless cellular communication technology including satellite/broadband wireless mobile communication, broadband terrestrial digital broadcasting technology such as DVB-T/T2/ATSC, GPS technology, IEEE 1609 WAVE technology, and the like.

The ITS system for vehicle communication and networking may be organically designed in consideration of various access technologies, network protocols, and communication interfaces for providing various use-cases. Further, the role and the function of each layer may be enhanced or reinforced.

FIG. 4 illustrates a packet structure of a network/transport layer according to an embodiment of the disclosure.

FIG. 4 illustrates a packet structure of the network/transport layer, and the transport layer may generate a BTP packet and the network layer may generate a geo-networking packet. The geo-networking packet corresponds to data of a logical link control (LLC) packet to be included in the LLC packet. The geo-networking packet may be encapsulated into the LLC packet. In an embodiment of FIG. 4, the data may include a message set and the message set may become a basic safety message.

The BTP is a protocol for transmitting the message such as the CAM or DENM generated by the facility layer to the lower layer. The BTP header is constituted by A type and B type. An A type BTP header may include a destination port and a source port required for transmission/reception for interactive packet transmission. A B type BTP header may include the destination port and destination port information required for transmission for non-interactive packet transmission. The description of a field/information included in the header is as follows.

Destination port: The destination port identifies a facility entity corresponding to the destination of data (BTP-PDU) included in the BTP packet.

Source port: as a field generated in the case of BTP-A type, indicates a port of a protocol entity of the facility layer in a source in which the corresponding packet is transmitted. This field may have a size of 16 bits.

Destination port Information: as a field generated in the case of BTP-B type, may provide additional information when the destination port is a most well-known port. This field may have the size of 16 bits.

The geo-networking packet includes a basic header and a common header according to the protocol of the network layer and optionally includes an extension header according to a geo-networking mode.

The basic header may be 32 bits (4 bytes). The basic header may include at least one of a version field, a next header (NH) field, a lifetime (LT) field, and a remaining hop limit (RHL) field. The description of the fields included in the basic header is as follows. A bit size configuring each field is just an embodiment and may be modified.

Version (4 bits): A version field indicates a version of the geo-networking protocol.

NH (4 bits): A next header (NH) field indicates a type of subsequent header/field. When a field value is 1, the common header may be followed and when the field value is 2, a secured packet in which the security is configured may be followed.

LT (8 bits): A lifetime (LT) field indicates a maximum survival time of the corresponding packet.

RHL (8 bits): A remaining hop limit (RHL) field indicates a remaining hop limit. An RHL field value may be reduced by one for each forwarding on a GeoAdhoc router. When the RHL field value is 0, the corresponding packet is not forwarded any longer.

The common header may be 64 bits (8 bytes). The common header may include at least one of a next header (NH) field, a header type (HT) field, a header sub-type (HST) field, a header sub-type (HST) field, a traffic class (TC) field, a flags field, a payload length (PL) field, and a maximum hop limit (MHL) field. The description of each of the fields is as follows.

NH (4 bits): The next header (NH) field indicates the type of subsequent header/field. When the field value is 0, the NH field may indicate "ANY" type which is not defined, when the field value is 1, the NH field may indicate a BTP-A type packet, when the field value is 2, the NH field may indicate a BTP-B type, and when the field value is 3, the NH field may indicate an IP diagram of IPv6.

HT (4 bits): The header type field indicates a geo-networking type. The geo-networking type includes Beacon, GeoUnicast, GeoAnycast, GeoBroadcast, Topologically-Scoped Broadcast (TSB), and Location Service (LS).

HST (4 bits): The header sub type field indicates a detailed type together with the header type. As an embodiment, when the HT type is set to the TSB, the HST may indicate a single hop for the HST value of '0' and a multi-hop for the HST value of '1'.

TC (8 bits): The traffic class field may include Store-Carry-Forward (SCF), channel offload, and TC ID. The SCF field indicates whether to store the packet when there is no neighbor to which the packet is to be transferred. The channel offload field indicates that the packet may be transferred to another channel in the case of a multi-channel operation. The TC ID field as a value allocated when transferring the packet in the facility layer may be used for setting a contention window value in the physical layer.

Flag (8 bits): The flag field indicates whether the ITS apparatus is mobile or stationary and as an embodiment, the flag field may become last 1 bit.

PL (8 bits): The payload length field indicates a data length subsequent to the geo-networking header in units of bytes. For example, in the case of the geo-networking packet that carries the CAM, the PL field may indicate the BTP header and the length of the CAM.

MHL (8 bits): The Maximum Hop Limit (MHL) field may indicate a maximum hopping number.

The LLC header is added to the geo-networking packet to generate the LLC packet. The LLC header provides a function to distinguish and transmit IP data from geo-networking data. The IP data and the geo-networking data may be distinguished by Ethertype of SNAP. As an embodiment, when the IP data is transmitted, the Ethertype may be set to 0x86DD and included in the LLC header. As an embodiment, when the geo-networking data is transmitted, the Ethertype may be set to 0x86DC and included in the LLC header. The receiver may verify the Ethertype field of the LLC packet header and forward and process the packet to an IP data path or a geo networking path according to the value.

FIG. 5 illustrates a configuration of a V2X system according to another embodiment of the disclosure.

FIG. 5 illustrates a hierarchical architecture corresponding to another embodiment of the V2X system of FIG. 3. As an embodiment, the North American V2X system uses IEEE 802.11 PHY technology and MAC technology, and further may use the MAC technology of IEEE 1609.4. In the network/transport layer technology, the technology of the IEEE802.2 standard may be applied to an LLC block and the IEEE 1609.3 technology may be applied to a WAVE short message protocol (WSMP). The facility layer may use a message set of a J2735 standard of SAE and the application layer may use an application defined for V2V, V21, and V20 in a J2945 standard.

The application layer may perform a function to implement and support the use-case. The application may be optionally used according to the use-case. A system requirement of each use-case may be defined in the J2945 standard. J2945/1 defines an application of V2V technology such as V2V safety communication.

A J2945/1 document defines applications including emergency electronic brake lights (EEBL), forward crash warning (FCW), blind spot warning (BSW), lane change warning (LCW), intersection movement assist (IMA), and control loss warning (CLW). As an embodiment, FCW technology is V2V safety communication technology that warns of a collision with a preceding vehicle. When a vehicle equipped with the V2X communication apparatus makes emergency stop or crashes, an FCW safety message may be transmitted in order to prevent a collision of a subsequent vehicle. The subsequent vehicle may receive FCW messages and alert a driver or perform such controls as speed deceleration or lane change. In particular, even when there is another vehicle between a stopped vehicle and a driving vehicle, it is possible to determine a state of the stopped through the FCW. The FCW safety message may include positional information (latitude, longitude, and lane) of the vehicle, vehicle information (vehicle type, length, direction, speed), and event information (stop, sudden stop, and slow down) and the information may be generated by the request of the facility layer.

The facility layer may correspond to OSI layer 5 (session layer), layer 6 (presentation layer), or layer 7 (application layer). The facility layer may generate the message set according to a situation in order to support the application. The message set may be defined in the J2735 standard and described/decoded through ASN.1. The message set may include a BasicSafetyMessage message, a MapData message, an SPAT message, CommonSafetyRequest message, an EmergencyVehicleAlert message, an IntersectionCollision message, a ProbeVehicleData message, a RoadSideAlert message, and a PersonalSafetyMessag message.

The facility layer collects the information to be transmitted from the upper layer to generate the message set. The message set may be displayed in an Abstract Syntax Notation 1 (ASN.1) scheme. The ASN.1 as a notation used to describe the data structure may also set an encoding/decoding rule. The ASN.1 does not depend on specific devices, a data representation scheme, programming languages, hardware platforms, and so on. The ASN.1 as a language for describing data regardless of platform is a joint standard between Consultative Committee on International Telegraphy and Telephony (CCITT) X.208 and International Organization for Standardization, (ISO) 8824.

The message set as a collection of messages related to V2X operations and there is a message set appropriate to the context of the upper application. The message set may be expressed in a format of the data frame and may include at least one element. Each element may include the data frame or a data element.

The data frame represents two or more data sequences. The data frame may become a sequence structure of the data element or a sequence structure of the data frame. As an embodiment, DV vehicleData as a data frame structure representing information of a vehicle may include a plurality of data elements (for example, Height, Bumbers, mass, and trailerweight). The data element defines a description of the data element. As an embodiment, an element called Height used in the data frame is defined in DE VehicleHeight and may express a height of the vehicle. As an embodiment, the height of the vehicle may be expressed from 0 to 127, and an LBS unit may be increased by 5 cm and be expressed up to 6.35 meters.

As an embodiment, a basic safety message (BasicSafetyMessage) may be transmitted. The BasicSafetyMessage as a most basic and important message in the message set is used for periodically transmitting basic information of the vehicle. The corresponding message may include coreData defined as BSMcoreData, PartII which is optional, and regional data. The coreData may include data elements including msgCnt, id, lat, long, elev, speed, deading, break, size, and the like. The coreData uses the data elements to display a message count, ID, latitude, longitude, altitude, speed, direction, a brake, a vehicle size, and so on. The corresponding BSM may generally transmit information corresponding to the coreData in a period of 100 msec (10 times per second).

The network/transport layer may correspond to OSI layer 3 (network layer) and layer 4 (transport layer). A WAVE short message protocol (WSMP) may be used for transmitting a WAVE Short Message (WSM) delivered by the upper layer. Additionally, an IPv6/TCP may be used for processing an IP signal in the related art. The LLC block may adopt the IEEE 802.2 standard and may distinguish IP diagrams from WSM packets.

The access layer may correspond to OSI layer 1 (physical layer) and OSI layer 2 (data link layer). The access layer may use PHY technology and MAC technology of IEEE 802.11 and additionally use MAC technology of IEEE 1609.4 in order to support vehicle communication.

The security entity and the management entity may be connected and operated in all intervals.

FIG. 6 illustrates a WSMP packet configuration according to an embodiment of the disclosure.

The network/transport layer of FIG. 5 may transmit a vehicle security message such as the BSM via the WSMP. The WSMP is described in an IEEE 1609.3 document and may also support the Ipv6 and the TCP/UDP in order to additionally transmit the IP data.

The WSMP is a protocol for delivering the WAVE short message generated in the ASN.1 scheme in the facility layer to the lower layer. As illustrated in FIG. 6, the WSMP packet includes the WSMP header and the WSM data including the message. The WSMP header includes a version field, a PSID field, an extension field, a WSM WAVE element ID field, and a length field.

The version field may be defined as a Wsmp Version field indicating an actual WSMP version of 4 bits and a reserved field of 4 bits. The PSID field as a provider service identifier may be allocated according to the application in the upper layer. The PSID field helps deciding an appropriate upper layer at the receiver side. The extension field is a field for extending the WSMP header and information including a channel number, data rate, transmit power used, and the like may be inserted into the extension field. The WSMP WAVE element ID field may designate a type of transmitted WAVE short message. The length field may designate a length of the WSM data transmitted through a WSMLength field of 12 bits in units of octets.

The LLC header provides a function to distinguish and transmit the IP data from the WSMP data. The IP data and the WSMP data may be distinguished by Ethertype of SNAP. As an embodiment, the LLC header and SNAP header structures may be defined in the IEEE 802.2 document. As an embodiment, when the IP data is transmitted, the Ethertype may be set to 0x86DD and included in the LLC header. As an embodiment, when the WSMP data is transmitted, the Ethertype may be set to 0x86DC and included in the LLC header. The receiver may verify the Ethertype field of the LLC packet header and forward and process the packet to an IP data path or a WSMP path according to the value.

FIG. 7 illustrates a conceptual internal architecture of an MAC sublayer performing a multi-channel operation (MCO) according to an embodiment of the disclosure.

As an embodiment, the architecture of FIG. 7 may be included in the access layer of FIG. 5 or included in the MAC layer of the access layer. The MCO structure of FIG. 7 may include channel coordination in which a channel access is defined, channel routing in which operation processes of overall data and a management frame between PHY-MAC layers are defined, Enhanced Dedicated Channel Access (EDCA) of deciding and defining the priority of the transmission frame and a data buffer (or queue) storing the frame received by the upper layer. A channel coordination block is not illustrated in FIG. 7 and the channel coordination may be performed by the entirety of an MAC sublayer of FIG. 5.

Channel coordination: As an embodiment, channel accesses to a control channel (CCH) and a service channel (SCH) may be controlled. A channel access coordination will be described below. As an embodiment, the Wave short message (WSM) may be transmitted as (via) the CCH and the WSM and/or IP data may be transmitted as the SCH.

Data buffer (queue): The data buffer may store the data frame received from the upper layer according to defined access category (AC). In the embodiment of FIG. 3, the data buffer may be provided for each AC.

Channel routing: A channel routing block may deliver data input in the upper layer to the data buffer. Transmission operation parameters such as the channel number, the transmit power, and the data rate for the channel coordination and the frame transmission may be called with respect to a transmission request of the upper layer.

EDCA: As a scheme for guaranteeing QoS in the IEEE 802.11e MAC layer in the related art is a contention based medium access scheme that divides the AC into four access categories (AC) according to a type of traffic and assigns different priorities for each category and allocates different parameters for each AC and gives more transmission opportunities to traffic having a higher priority. An EDCA block may designate 8 priorities of 0 to 7 for data transmission including the priority and data which reach the MAC layer may be mapped to four ACs according to the priority.

FIG. 8 illustrates a relationship between a user priority of EDCA and access category (AC) according to an embodiment of the disclosure.

A relationship between a user priority of the EDCA and the AC is illustrated in FIG. 8. In FIG. 8, as an AC number is larger, a rank has a higher priority. Every AC has a transmission queue and an AC parameter thereof and the difference in AC priority is decided based on the AC parameter values set differently from each other. The AC parameter values set differently from each other are connected with back-off to have different channel access priorities. The corresponding AC parameter values adopt AIFS [AC], CW min[AC], and CW max[AC], respectively and here, an arbitration inter-frame space (AIFS) refers to a minimum time for verifying whether the channel is idle before performing transmission. The lower the value of AIFS [AC] and CW min [AC] is, the higher the priority is, and accordingly, the channel access delay is shortened so that more bandwidth may be used in a given traffic environment.

When a collision between stations occurs during transmitting the frame, the transmitter generates a new back-off counter. Transmission queues for four ACs defined in the IEEE 802.11 MAC individually compete with each other for radio medium access in one station. Since the respective ACs have back-off counters which are independent from each other, a virtual collision may occur. When there are two or more ACs that simultaneously complete the back-off, data of an AC having a highest priority is first transmitted and other ACs update the back-off counter again by increasing a CW value. Such a collision resolution process is referred to as a virtual collision process. Further, the EDCA allows the channel to be accessed during data transmission through a transmission opportunity (TXOP). When one frame is too long and may not be transmitted during one TXOP, one frame may be divided into small frames and transmitted.

FIG. 9 illustrates a physical layer configuration of a V2X transmitting apparatus according to an embodiment of the disclosure.

As an embodiment, FIG. 9 illustrates a block diagram of physical layer signal processing of IEEE 802.11 or ITS-G5. However, FIG. 9 illustrates a physical layer configuration according to an embodiment of the disclosure, and is not limitedly applied only to the aforementioned transmission standard technology.

The physical layer processor of FIG. 9 may include a physical layer convergence protocol (PLCP) sublayer baseband signal processing part including at least one of a scrambler 9010, an FEC encoder 9020, an interleaver 9030, a mapper 9040, a pilot insertion block 9050, an IFFT block 9060, a guard insertion block 9070, and a preamble insertion block 9080 and a physical medium dependent (PMD) sublayer RF band signal processing part including at least one of a wave shaping 9090, an I/Q modulation block 9100, and a DAC 9110. The description of a function of each block is as follows.

The scrambler 9010 XORs an input bitstream with a pseudo random binary sequence (PRBS) to randomize the input bitstream. The FEC encoder 9020 may add redundancy to the transmission data so as to correct an error on a transmission channel at the receiving side. The interleaver 9030 may interleave input data/bitstreams based on an interleaving rule so as to cope with a burst error. As an embodiment, when deep facing when deep fading or erasure is applied to a QAM symbol, since interleaved bits are mapped to each QAM symbol, it is possible to prevent an error from occurring consecutive bits among all codeword bits. The mapper 9040 may allocate input bit words to one constellation. The pilot insertion block 9050 inserts a reference signal into a predetermined location of a signal block. By using such a reference signal, the receiver may estimate a channel distortion phenomenon such as channel estimation, frequency offset, and timing offset.

The IFFT block 9060, that is, an inverse waveform transform block, may convert an input signal so as to enhance transmission efficiency and flexibility in consideration of the characteristics of the transmission channel and a system structure. As an embodiment, in the case of an OFDM system, the IFFT block 9060 may convert a signal in a frequency domain into a time domain by using an inverse FFT operation. In the case of a single carrier system, the IFFT block 9060 may not be used or may be omitted. The guard insertion block 9070 may insert a guard interval between adjacent signal blocks in order to minimize an influence of delay spread of the transmission channel. As an embodiment, in the case of the OFDM system, the guard insertion block 9070 may insert a cyclic prefix into the guard interval period. The preamble insertion block 9080 may insert a signal of a determined type, i.e., a preamble, into the transmission signal between the transmitter and receiver so that the receiver may quickly and efficiently detect a target signal. As an embodiment, in the case of the OFDM system, the preamble insertion block 9080 may define a signal block/signal frame including a plurality of OFDM symbols and insert a preamble symbol into a start portion of the signal block/signal frame.

The wave shaping block 90090 may waveform process an input baseband signal based on channel transmission characteristics. As an embodiment, the waveform shaping block 9090 may perform square-root-raised cosine (SRRC) filtering to obtain a base of out-of-band emission of a transmitted signal. In the case of a multi-carrier system, the waveform shaping block 9090 may not be used or may be omitted. The I/Q modulator 9100 may perform in-phase and quadrature modulation. A digital to analog converter (DAC) 9110 block may convert an input digital signal into an analog signal and output the analog signal. An output analog signal may be transmitted through an output antenna.

Respective blocks described in FIG. 9 may be omitted or may be replaced with other blocks having similar or equivalent functions. The blocks in FIG. 9 may be configured as a whole or a combination of some parts as needed. In this specification, the V2X communication apparatus may communicate based on the DSRC technology and the WAVE technology described in FIGS. 7 to 9. However, the V2X communication apparatus may perform communication based on other communication technologies including cellular technologies such as LTE, LTE-A, and 5G.

Hereinafter, platooning technology is described. Platooning technology corresponds to vehicle platooning technology used to enhance driver comfort and traffic efficiency and reduce fuel consumption. To enhance driver comfort and traffic efficiency and reduce fuel consumption, platooning technology provides techniques for forming a platooning group, maintaining the inter-vehicle gap in the group as minimum, and maintaining the group while following a platooning group leader or preceding vehicle.

In the disclosure, a platooning group is a group of vehicles performing platooning and may be composed of one platooning leader vehicle and one or more platooning member vehicles. The platooning leader vehicle plays a role to manage/control the platooning group and platooning member vehicles, and the platooning member vehicles correspond to vehicles led/managed by the platooning leader vehicle.

In the disclosure, platooning group may be abbreviated as PG, platooning leader vehicle as PL vehicle or PL, and platooning member vehicle as PM vehicle or PM.

Platooning Architecture and State Transition Model

An example platooning architecture for a platooning service is described below. In particular, the platooning architecture of ITS-S (V2X communication device) for providing a platooning service is described with reference to FIGS. 10 and 11.

The platooning protocol architecture may include an application layer including a platooning application and a facilities layer including facilities for messaging, vehicle and sensing information gathering, platooning management, vehicle control, and/or HMI support. In this case, the facilities may be common facilities that may also be used in other applications/services or platooning-dedicated facilities that may be used only in platooning applications/services. In the disclosure, the protocol architecture for a platooning service may be denoted, e.g., a protocol architecture or platooning architecture. The protocol architecture of ITS-S for a platooning service is described below with reference to FIGS. 10 and 11.

FIG. 10 illustrates a normal platooning architecture according to an embodiment of the disclosure. The platooning architecture of FIG. 10 corresponds to a normal protocol architecture for a platooning service. In other words, the entities/modules (e.g., each entity of the facilities layer) included in the platooning architecture of FIG. 10 correspond to entities that may be used for other services (e.g., cooperative adaptive cruise control (CACC) services), as well as platooning services.

Referring to FIG. 10, the platooning architecture may include an application layer, a facilities layer, a networking/transport layer, and/or an access layer. Further, the platooning architecture may further include a management entity and a security entity. The basic description of each layer and entity has been made above in connection with FIGS. 3 and 5.

The application layer may include a platooning application for providing a platooning service. Here, the platooning application denotes a higher layer entity (application layer entity) to enable a platooning service.

The facilities layer may include a V2V/I2V messaging module/entity, a vehicle and sensing information gathering module/entity, a platooning management module/entity, a vehicle control module/entity, and/or an HMI supporting module/entity. Each entity is described below.

V2V/I2V messaging entity is a concept encompassing V2V messaging entity and I2V messaging entity. Here, the V2V messaging entity denotes a facilities layer entity for exchanging V2V messages, and the I2V messaging entity denotes a facilities layer entity for exchanging I2V messages. In the disclosure, V2V/I2V messaging entity may be denoted an ITS messaging entity or V2X messaging entity.

Vehicle and sensing information gathering entity denotes a facilities layer entity for gathering vehicle itself information (vehicle information) and information (sensing information) obtained via sensors. In the disclosure, vehicle and sensing information gathering entity may be abbreviated as a vehicle information gathering entity.

Platooning management entity denotes a facilities layer entity that sets a platooning status, platooning group management, and/or target speed for a platooning service based on information for the V2X messaging entity and vehicle information gathering entity (vehicle and sensing information gathering entity).

Vehicle control entity denotes a facilities layer entity that controls the vehicle (e.g., platooning management or speed control). In an embodiment, the vehicle control entity may control the vehicle by transmitting a control command directly to the vehicle actuator or transmitting a control command to the assistance system in other vehicle through the in-vehicle network.

The HMI supporting entity denotes a facilities layer entity that transfers various notifications (for the driver) to the human machine interface (HMI) module. The facilities layer's V2X messaging entity, vehicle information gathering entity, and vehicle control entity and HMI supporting entity are not dedicated facilities layer entities (dedicated facilities) used only for platooning services but common facilities layer entities (common facilities) used in other applications.

FIG. 11 illustrates a dedicated platooning architecture according to an embodiment of the disclosure. The platooning architecture of FIG. 11 corresponds to an example dedicated protocol architecture for a platooning service. In other words, the platooning architecture of FIG. 11 includes at least one module/entity (e.g., platooning dedicated entities of facilities layer) used only for platooning services. In connection with FIG. 11, what has been described in connection with FIG. 10 is not repeatedly described.

Referring to FIG. 11, the platooning architecture may include an application layer, a facilities layer, a networking/transport layer, and/or an access layer. Further, the platooning architecture may further include a management entity and a security entity. The basic description of each layer and entity has been made above in connection with FIGS. 3 and 5.

Like in the embodiment of FIG. 10, in the embodiment of FIG. 11, the application layer may include a CACC application for providing a platooning service. As set forth above, the platooning application may be a higher layer entity (application layer entity) to enable a platooning service.

However, unlike in the embodiment of FIG. 10, in the embodiment of FIG. 11, the facilities layer may include a dedicated platooning module/entity (dedicated facility) for a platooning service. For example, the facilities layer may include a V2V/I2V messaging module/entity, a platooning vehicle and sensing information gathering module/entity, and/or a platooning vehicle control module/entity. Each entity is described below.

Platooning V2V/I2V messaging entity is a concept encompassing platooning V2V messaging entity and platooning I2V messaging entity. Here, the platooning V2V messaging entity denotes a facilities layer entity for exchanging V2V messages for a platooning service, and the platooning I2V messaging entity denotes a facilities layer entity for exchanging I2V messages for a platooning service. In the disclosure, platooning V2V/I2V messaging entity may be denoted a platooning ITS messaging entity or platooning V2X messaging entity.

Platooning vehicle and sensing information gathering entity denotes a facilities layer entity for gathering vehicle itself information (vehicle information) for a platooning service and information (sensing information) obtained via sensors. In the disclosure, platooning vehicle and sensing information gathering entity may be abbreviated as a platooning vehicle information gathering entity.

The platooning vehicle control entity denotes a facilities layer entity that controls (e.g., platooning control and speed control) the vehicle for a platooning service. In an embodiment, the vehicle control entity may control the vehicle by transmitting a control command directly to the vehicle actuator or transmitting a control command to the assistance system in other vehicle through the in-vehicle network.

The facilities layer's platooning V2X messaging entity, platooning vehicle information gathering entity, and platooning vehicle control entity correspond to dedicated facilities layer entities (dedicated facilities) used only for platooning services. In a case where such dedicated facilities are used, a platooning service may be provided in low latency using the platooning-dedicated facility of the facilities layer.

Further, the facilities layer may further include a platooning management module/entity and an HMI supporting module/entity. The description of these entities is the same as what has been described above in connection with FIG. 10.

For example, platooning management entity denotes a facilities layer entity that sets a platooning status, platooning group management, and/or target speed for a platooning service based on information for the platooning V2X messaging entity and platooning vehicle information gathering entity (vehicle and sensing information gathering entity). Further, the HMI supporting entity denotes a facilities layer entity that transfers various notifications (for the driver) to the human machine interface (HMI) module.

FIG. 12 illustrates a state transition model for a platooning member vehicle according to an embodiment of the disclosure. FIG. 12 may be an example state machine diagram of a platooning application for platooning member vehicles. In the embodiment of FIG. 12, an example is described in which, for a platooning member (PM) vehicle to join a platooning group (PG), a platooning member (PM) vehicle discovers and selects a platooning leader (PL) vehicle and transmits an join request message for joining the PG to the selected PM vehicle.

In the embodiment of FIG. 12, entry into each status may require a confirmation/permission from the platooning application or the driver. For example, PL/PG discovery, platooning enabled, or platooning terminated status may first be determined by the platooning management entity and, as necessary, a confirmation/permission from the platooning application or the driver may be needed. Each status is described below with reference to FIG. 12.

Platooning disabled status: A status in which the platooning application has been disabled. This status may be triggered when the platooning application is turned off. For example, if the platooning application is turned off in the PL/PG discovery status, negotiation status, platooning activated state, or platooning terminated status, the platooning application may enter this status.

Platooning enabled status: A status in which the platooning application has been enabled. This status may be triggered when the platooning application is turned on. According to an embodiment, this status may include a PL/PG discovery status, negotiation status, platooning activated status, and/or platooning terminated status.

PL/PG discovery status: A status in which the PM vehicle discovers the PL vehicle or PG. This status may be triggered when the platooning application is turned on in the platooning disabled status. Or, this status may be triggered when the negotiation is rejected in the negotiation status or when the platooning application does not turn off but stays on in the platooning terminated status. The PM vehicle may perform a preconfigured discovery procedure using the platooning application which has been enabled, discovering and selecting the PL vehicle and/or PG.

Negotiation status: A status in which the PM vehicle negotiates with the PL vehicle for joining the PG. This status may be triggered when the PL/PG is discovered/selected in the PL/PG discovery status and an join request is transferred to the PL/PG. For example, where the PM vehicle discovers and selects the PL/PG which desires to join and transmits an join request message to the selected PL/PG, the PL/PG discovery status may switch into the negotiation status.

Platooning activated status: A status in which the platooning service has been activated. For example, a status in which the PM vehicle has joined the PG. This status may be triggered when the negotiation is approved in the negotiation discovery status. For example, where the negotiation for the PM vehicle to join the PG is approved, the negotiation status may switch into the platooning activated status. In this status, the PM vehicle may determine whether a preset termination condition is met. Unless the termination condition is met, this status may be maintained. Or, if the termination condition is met, the platooning activated status may switch into the platooning terminated status. The termination condition may include the following examples.

PM leaves the PG: Where the PM vehicle leaves the PG.

PL dissolves the PG: Where the PL vehicle dissolves the PG where the PM belongs.

Lane Change: Where the PL vehicle changes lanes, and the PM vehicle lacks platooning functionality with lane change functionality.

Unwanted Route: Where the PL vehicle moves to a route that the PM vehicle does not want.

Traffic signal: Where it is impossible to follow the PL vehicle due to a traffic signal.

Misbehavior: Where the PL vehicle does not follow the traffic signal and regulation speed.

Connection Lost: Where it is impossible to receive the PL vehicle's V2V signal.

Platooning terminated status: A status in which the platooning service has been terminated. This status may be triggered when no PL/PG is selected in the PL/PG discovery status. Or, this status may be triggered when the above-described preset termination condition is met in the platooning activated status.

FIG. 13 illustrates a state transition model for a platooning leader vehicle according to an embodiment of the disclosure. FIG. 13 may be an example state machine diagram of a platooning application for a platooning leader vehicle. In the embodiment of FIG. 13, unlike in the embodiment of FIG. 12, an example is described in which, for a PM vehicle to join a PG, a PL vehicle discovers and selects a PM vehicle and transmits an join request message for joining the PG to the selected PM vehicle. In connection with FIG. 13, what has been described with reference to FIG. 12 is not described.

Platooning disabled status: A status in which the platooning application has been disabled. This status may be triggered when the platooning application is turned off. For example, if the platooning application is turned off in the PM discovery status, negotiation status, platooning activated state, or platooning terminated status, the platooning application may enter this status.

Platooning enabled status: A status in which the platooning application has been enabled. This status may be triggered when the platooning application is turned on. According to an embodiment, this status may include a PM discovery status, negotiation status, platooning activated status, and/or platooning terminated status.

PM discovery status: A status in which the PL vehicle discovers a PM vehicle. This status may be triggered when the platooning application is turned on in the platooning disabled status. Or, this status may be triggered when the negotiation is rejected in the negotiation status or when the platooning application does not turn off but stays on in the platooning terminated status. The PL vehicle may perform a preconfigured discovery procedure using the platooning application which has been enabled, discovering and selecting the PM vehicle.

Negotiation status: A status in which the PL vehicle negotiates with the PM vehicle for joining the PG. This status may be triggered when the PM is discovered/selected in the PM discovery status and an join request is transferred to the PM vehicle. For example, where the PL vehicle discovers and selects the PM vehicle which desires to join the PG and transmits an join request message to the selected PM, the PM discovery status may switch into the negotiation status.

Platooning activated status: A status in which the platooning service has been activated. For example, a status in which the PM vehicle has joined the PG. This status may be triggered when the negotiation is approved in the negotiation discovery status. For example, where the negotiation for the PM vehicle to join the PG is approved, the negotiation status may switch into the platooning activated status. In this status, the PL vehicle may determine whether a preset termination condition is met. Unless the termination condition is met, this status may be maintained. Or, if the termination condition is met, the platooning activated status may switch into the platooning terminated status. The termination condition may include the following examples.

All PM leaves the PG: Where all the PM vehicles leave the PG.

PL dissolves the PG: Where the PL vehicle dissolves the PG.

Lane Change: Where the PL vehicle changes lanes, and the PM vehicle lacks platooning functionality with lane change functionality.

Connection Lost: Where the PL vehicle is unable to receive V2V signals from all the PM vehicles.

Platooning terminated status: A status in which the platooning service has been terminated. This status may be triggered when no PM vehicle is selected in the PM discovery status. Or, this status may be triggered when the above-described preset termination condition is met in the platooning activated status.

For vehicles to form a PG and drive, the PG needs to be managed by the PL vehicle. Various embodiments for such management are described below. For example, a forming of a PG among any vehicles, joining and leaving the PG, discovering of the PG, merging of PGs, and concatenating among PGs are described below.

In the following embodiment, for ease of description, each embodiment is described under the assumption that the ITS-S of PM vehicle and the ITS-S of PL vehicle are implemented via the normal platooning architecture of FIG. 9. However, this is merely an example for description purposes and, even where the ITS-S of PM vehicle and the ITS-S of PL vehicle are implemented via the dedicated platooning architecture of FIG. 10, it is apparent to one of ordinary skill in the art that the same or similar description may be applied except that some operations may be performed by the dedicated facilities layer entity, rather than by the platooning application.

Platooning Group Joining

FIG. 14 illustrates a procedure for joining a platooning group according to an embodiment of the disclosure. FIG. 14 shows an example message flow between a non-PM vehicle and a PL vehicle to join a platooning group (PG). In other words, the message flow when a vehicle (non-PM vehicle) which does not belong to the PG may be as shown in FIG. 14. In the embodiment of FIG. 14, vehicle ITS-S denotes the ITS-S of non-PM vehicle, and PL vehicle ITS-S denotes the ITS-S of PL vehicle.

In the embodiment of FIG. 14, it is assumed that a platooning group joining procedure starts under the conditions that the platooning application of the vehicle ITS-S and PL vehicle ITS-S is on, the platooning status of the vehicle ITS-S is the PL discovery status, and the platooning status of the PL vehicle ITS-S is the activated status. Here, the PL discovery status is the same status as the above-described PL/PG discovery status, and the activated status corresponds to the same status as the above-described platooning activated status.

The PL vehicle ITS-S may transmit a platooning information message to the vehicle ITS-S via a V2X network. To that end, the platooning management entity of the PL vehicle ITS-S may transfer a request for transmitting a platooning information message to the V2V/I2V messaging entity, and the V2V/I2V messaging entity may generate a platooning information message and transfer the platooning information message to the networking/transport layer. The so-transferred platooning information message may be processed as a wireless signal via networking/transport layer and access layer processing and be transmitted to the vehicle ITS-S.

The vehicle ITS-S may receive the platooning information message via the V2X network and process the platooning information message. To that end, the vehicle ITS-S may receive a wireless signal including the platooning information message, perform access layer processing and networking/transport layer processing on the same, and transfer the platooning information message to the V2V/I2V messaging entity. The V2V/I2V messaging entity of the vehicle ITS-S may parse the platooning information message and transfer the information (platooning information) included in the platooning information message to the platooning management entity.

The vehicle ITS-S may determine the PL vehicle based on the platooning information included in the platooning information message. For example, the platooning management entity of the vehicle ITS-S may determine the PL vehicle based on the platooning information transferred from the V2V/I2V messaging entity. As another example, the platooning management entity of the vehicle ITS-S may transfer the platooning information transferred from the V2V/I2V messaging entity to the platooning application, and the platooning application may determine the PL vehicle based on the platooning information.

Where the PL vehicle is determined, the vehicle ITS-S may generate a join request message. For example, where the PL vehicle is determined by the platooning management entity, the platooning management entity may transfer a request for generating a join request message to the V2V/

I2V messaging entity, and the V2V/I2V messaging entity may generate a join request message. As another example, where the PL vehicle is determined by the platooning application, the platooning application may transfer a request for generating a join request message to the V2V/I2V messaging entity, and the V2V/I2V messaging entity may generate a join request message.

The vehicle ITS-S may transmit the join request message to the PL vehicle ITS-S via the V2X network. To that end, the V2V/I2V messaging entity of the vehicle ITS-S may transfer the generated join request message to the networking/transport layer. The so-transferred join request message may be processed as a wireless signal via networking/transport layer processing and access layer processing and be transferred to the PL vehicle ITS-S.

The PL vehicle ITS-S may receive the join request message via the V2X network and process the join request message. To that end, the PL vehicle ITS-S may receive a wireless signal including the join request message, perform access layer processing and networking/transport layer processing on the same, and transfer the join request message to the V2V/I2V messaging entity. The V2V/I2V messaging entity of the PL vehicle ITS-S may parse the join request message and transfer the information (join request information) included in the join request message to the platooning management entity.

The PL vehicle ITS-S may determine whether to approve based on the join request information included in the join request message. For example, the platooning management entity of the PL vehicle ITS-S may determine whether to approve the vehicle (non-PM vehicle) to join the PG based on the join request information transferred from the V2V/I2V messaging entity. As another example, the platooning management entity of the PL vehicle ITS-S may transfer the join request information transferred from the V2V/I2V messaging entity to the platooning application, and the platooning application may determine whether to approve the vehicle to join the PG based on the join request information.

Where it is determined whether to approve, the PL vehicle ITS-S may generate a join response message. For example, where it is determined by the platooning management entity whether to approve, the platooning management entity may transfer a request for generating a join response message to the V2V/I2V messaging entity, and the V2V/I2V messaging entity may generate a join response message. As another example, where it is determined by the platooning application whether to approve, the platooning application may transfer a request for generating a join response message to the V2V/I2V messaging entity, and the V2V/I2V messaging entity may generate a join response message.

The PL vehicle ITS-S may transmit the join response message to the vehicle ITS-S via the V2X network. To that end, the V2V/I2V messaging entity of the PL vehicle ITS-S may transfer the generated join response message to the networking/transport layer. The so-transferred join response message may be processed as a wireless signal via networking/transport layer processing and access layer processing and be transferred to the vehicle ITS-S.

The vehicle ITS-S may receive the join response message via the V2X network and process the join response message. To that end, the vehicle ITS-S may receive a wireless signal including the join response message, perform access layer processing and networking/transport layer processing on the same, and transfer the join response message to the V2V/I2V messaging entity. The V2V/I2V messaging entity of the vehicle ITS-S may parse the join response message and transfer the information (join response information) included in the join response message to the platooning management entity.

The vehicle ITS-S may determine the platooning status based on the join response information included in the join response message. For example, where the join response information indicates that the join request has been approved, the vehicle ITS-S may switch the platooning status from the PL discovery status to the activated status. Here, the activated status may be the same status as the above-described platooning activated status. As another example, where the join response information indicates that the join request has been rejected, the vehicle ITS-S may maintain the platooning status as the PL discovery status.

The vehicle ITS-S may update the platooning group information. For example, the vehicle ITS-S may update the platooning group information by the platooning management entity. As another example, the vehicle ITS-S may update the platooning group information via the platooning application.

Various examples of the platooning information message, join request message, and join response message used for the above-described platooning group joining procedure are described below.

Platooning Information Message

Platooning information message means a message containing information (PG information) about the PG associated with the message sender. Here, the message sender may be the ITS-S or vehicle transmitting the message.

In an embodiment, the platooning information message may be periodically broadcast according to the PL's determination. In this case, the repetition interval of platooning information message may be adjusted according to the PL's determination. The receiving vehicle may obtain the PG information based on the platooning information message and determine whether to join. Meanwhile, where the PG information is changed, it is required that the platooning information message be altered to reflect the change and be broadcast.

In an embodiment, the platooning information message may be broadcast by the PL as default. However, without limitations thereto, the platooning information message may be broadcast by the PM, according to an embodiment. For example, to broadcast the PG information more frequently or in a broader area, the PL may allow the PM to transmit the platooning information message. As another example, where any vehicle attempts to merge or join one PG, the PMs which belong to the PG needs to be identified to follow one PM. To that end, the PL may allow the PM to periodically transmit the platooning information message. In other words, the platooning information message may be periodically transmitted by the PM.

Table 1 below shows an example of the platooning information message. In the disclosure, platooning information message may also be denoted a platooning group information (PlatooningGroupInfo) message.

TABLE 1

| Descriptive Name | PlatooningGroupInfo |
|---|---|
| Identifier | DataType_xxx |
| ASN.1 representation | PlatooningGroupInfo ::= SEQUENCE { <br> PlatooningGroupID PlatooningGroupID, <br> VehicleID VehicleID <br> RoleInPlatooning RoleInPlatooning, <br> PlatooningMemberNumber PlatooningMemberNumber, <br> PlatooningDestination PlatooningDestination, <br> PlatooningRoute PlatooningRoute, <br> CAM optional <br> ... <br> } |
| Definition | This DF (Data Frame) informs information about the PG associated with the message sender. |
| Unit | N/A |

Referring to Table 1, the platooning information message may be a data frame (DF) indicating information about the PG associated with the message sender. According to an embodiment, the platooning information message may include platooning group ID(PlatooningGroupID) information, vehicle ID(VehicleID) information, platooning role (RoleInPlatooning) information, number-of-platooning members (PlatooningMemberNumber) information, platooning destination (PlatooningDestination) information, and/or platooning route (PlatooningRoute) information. Each piece of information included in the platooning information is described below with reference to Tables 2 to 7.

Further, the platooning information message may optionally include information (CAM information) included in the CAM message. For example, to send together such information as location, the platooning information message may be configured to include the CAM message itself or to include part (e.g., location information) of the information included in the CAM message. However, where the platooning information message is included in the CAM message and transmitted as part (extension) of the CAM message, rather than as an independent message, the platooning information message need not include the CAM information.

Table 2 shows an example of the platooning group ID (PlatooningGroupID) information.

TABLE 2

| Descriptive Name | PlatooningGroupInfo |
|---|---|
| Identifier | DataType_xxx |
| ASN 1 representation | PlatooningGroupID ::= INTEGER(0..1000) or <br> PlatooningGroupID ::= BIT STRING (64) or OCTET STRING (8) |
| Definition | This DE (Data Element) identifies the Platooning Group. |
| Unit | N/A |

Referring to Table 2, the platooning group ID information, as a DE, may identify the platooning group. For example, the platooning group ID information may be an ID for identifying the platooning group. According to an embodiment, the platooning group ID group may be set to any integer or to the MAC address of the PL in a bit string or octet string type. Such platooning group ID information may be allocated by the PL.

Table 3 shows an example of the vehicle ID (VehicleID) information.

TABLE 3

| Descriptive Name | VehicleID |
|---|---|
| Identifier | DataType_xxx |
| ASN.1 representation | VehicleID ::= BIT STRING (64) or OCTET STRING (8) |
| Definition | This DE (Data Element) identifies the message sender. |
| Unit | N/A |

Referring to Table 3, the vehicle ID information, as a DE, may identify the message sender. For example, the vehicle ID information may be an ID for identifying the message sender transmitting the platooning information message. According to an embodiment, the vehicle ID information, as a bit string or octet string type of message sender ID, may be, e.g., the MAC address or geo-networking address of the message sender. If the message sender is the PL, the vehicle ID information may not be included in the platooning information message. In the disclosure, vehicle ID information may also be denoted ID information.

Table 4 shows an example of the platooning role (RoleInPlatooning) information.

TABLE 4

| Descriptive Name | RoleInPlatooning |
|---|---|
| Identifier | DataType_xxx |
| ASN.1 representation | RoleInPlatooning::= INTEGER(0..10), or BOOLEAN |
| Definition | This DE (Data Element) indicates the role of the message sender in its PG. For integer, "1" means "platooning group leader" and "2" means "platooning group member". For Boolean, "1" means "platooning group leader" and "0" means "platooning group member". |
| Unit | N/A |

Referring to Table 4, the platooning role information, as a DE, may indicate the role of the message sender in the PG.

If the platooning role information is of an integer type, "1" may mean "platooning group leader," and "2" means "platooning group member." That is, where the platooning role information value is "1," the platooning role information indicates that the message sender is the PL and, where the platooning role information value is "2," the platooning role information indicates that the message sender is the PM. For example, in the embodiment of FIG. 14, the platooning role information value is set to "1."

If the platooning role information is of a Boolean type, "1" may mean "platooning group leader," and "0" means "platooning group member." That is, where the platooning role information value is "1," the platooning role information indicates that the message sender is the PL and, where the platooning role information value is "0," the platooning role information indicates that the message sender is the PM.

Table 5 shows an example of the number-of-platooning members (PlatooningMemberNumber) information.

TABLE 5

| Descriptive Name | PlatooningMemberNumber |
|---|---|
| Identifier | DataType_xxx |
| ASN.1 representation | PlatooningMemberNumber ::= INTEGER(0..1000) |
| Definition | This DE (Data Element) indicates the current number of platooning group members. |
| Unit | N/A |

Referring to FIG. 5, the number-of-platooning members information may indicate the current number of platooning group members. That is, the number-of-platooning members information may be used to indicate the number of PMs belonging to the PG.

Table 6 shows an example of the platooning destination (PlatooningDestination) information.

TABLE 6

| Descriptive Name | PlatooningDestination |
|---|---|
| Identifier | DataType_xxx |
| ASN.1 representation | PlatooningDestination :: = SEQUENCE {<br>DestinationLatitude Latitude,<br>DestinationLongitude Longitude,<br>DestinationAltitude Altitude<br>} |
| Definition | This DF (Data Frame) indicates the geographical position of the destination of the PG. |
| Unit | N/A |

Referring to Table 6, the platooning destination information, as a DE, may indicate the geographical location of the destination of the PG. According to an embodiment, the platooning destination information provides information about the latitude, longitude, and/or altitude of the PG.

Table 7 shows an example of the platooning route (PlatooningRoute) information.

TABLE 7

| Descriptive Name | PlatooningRoute |
|---|---|
| Identifier | DataType_xxx |
| ASN.1 representation | PlatooningRoute :: = SEQUENCE {SIZE (1 . . . 1000)} of PlatooningDestination |
| Definition | This DF (Data Frame) indicates one or more geographical positions of the route of the PG. |
| Unit | N/A |

Referring to Table 7, the platooning route information, as a DE, may indicate one or more geographical locations of the route of the PG. In other words, the platooning route information may indicate the locations of one or more intermediate points which the PG passes through before arriving at the final destination. According to an embodiment, the PL may indicate the locations of a plurality of intermediate points as the platooning route information and may broadcast the platooning information message including the platooning route information. The platooning route information may aid in determining whether the non-PM vehicle is to join the PG. For example, in the embodiment of FIG. 14, the information may assist in determining whether the vehicle ITS-S joins the PG.

Meanwhile, where the PG changes the route before arriving at the final destination, the platooning route information value also needs to be changed.

Join Request Message

Join request message means a message for requesting to join the PG. That is, the join request message corresponds to a message used to request to join the PG.

According to an embodiment, the join request message may be carried via a platooning message (PlatooningMessage) that conveys various types of messages regarding platooning (option #1). In another embodiment, the join request message may be carried via a message with an independent structure/format (option #2).

Join Request Message-Option #1

The join request message of option #1 is described below with reference to Tables 8 to 10. No duplicate description is given of those described above in connection with Tables 1 to 7.

Table 8 shows an example of the platooning message (PlatooningMessage).

TABLE 8

| Descriptive Name | PlatooningMessage |
|---|---|
| Identifier | DataType_xxx |
| ASN.1 representation | PlatooningMessage :: = SEQUENCE {<br>VehicleID VehicleID,<br>PlatooningGroupID PlatooningGroupID,<br>PlatooningMessageType PlatooningMessageType,<br>VehicleFunctions VehicleFunctions,<br>CAM optional,<br>. . . |

TABLE 8-continued

| | |
|---|---|
| Descriptive Name | PlatooningMessage |
| Definition | }<br>This DF (Data Frame) conveys various types of messages about platooning. |
| Unit | N/A |

Referring to Table 8, the platooning message, as a DF, may carry various types of messages regarding platooning. According to an embodiment, the platooning message may include vehicle ID information, platooning group ID information, platooning message type (PlatooningMessageType) information, and/or vehicle function (VehicleFunctions) information. Further, optionally, the platooning message may further include CAM information for transferring the basic information of the vehicle transmitting the message. Here, for each piece of information, no duplicate information is given of those described above.

In the embodiment of Table 8, the vehicle ID information indicates the ID of the message sender transmitting the join request message, and the platooning group ID information indicates the ID of the PG which the message sender transmitting the join request message desires to join.

Table 9 shows an example of the platooning message type (PlatooningMessageType) information.

TABLE 9

| | |
|---|---|
| Descriptive Name | PlatooningMessageType |
| Identifier | DataType_xxx |
| ASN.1 representation | PlatooningMessageType :: = INTEGER (0 . . . 100) |
| Definition | This DE (Data Element) indicates the type of message about platooning. "1" means "request to join the platooning group". |
| Unit | N/A |

Referring to Table 9, the platooning message type information may indicate the type of message regarding platooning. That is, the platooning message type information may indicate the type of the message carried via the platooning message.

"1" means "requesting to join the PG." That is, where the value of the platooning message type information is "1," the platooning message type information may indicate that the platooning message carries the join request message.

Table 10 shows an example of the vehicle function (VehicleFunctions) information.

TABLE 10

| | |
|---|---|
| Descriptive Name | VehicleFunctions |
| Identifier | DataType_xxx |
| ASN.1 representation | VehicleFunctions :: = BIT STRING {<br>LaneKeepingFunction (0),<br>LaneChangeAssistanceFunction (1),<br>BrakingAssistanceFunction (2),<br>CollisionAvoidanceFunction (3),<br>AdaptiveCruiseControlFunction (4),<br>CooperativeAdaptiveCruiseControlFunction (5),<br>. . .<br>} |
| Definition | This DE (Data Element) indicates the available functions of the vehicle sending the message. Each bit shall be set to 1 if the corresponding function is supported. |
| Unit | N/A |

Referring to FIG. 10, the vehicle function information, as a DE, may indicate available functions of the vehicle transmitting the message. According to an embodiment, the vehicle function information may be of a bit string type, and each bit may indicate whether the corresponding function is supported. For example, the vehicle function information may include a bit (a zeroth bit) indicating whether the lane keeping function is supported, a bit (a first bit) indicating whether the lane change assist function is supported, a bit (a second bit) indicating whether the brake assist function is supported, a bit (a third bit) indicating whether the collision avoid function is supported, a bit (a fourth bit) indicating whether the adaptive cruise control function is supported, and/or a bit (a fifth bit) indicating whether the CACC function is supported. In this case, if the corresponding function is supported, each bit may be set to 1 and, unless the corresponding function is supported, each bit may be set to 0. In the disclosure, vehicle function information may also be denoted function information.

Upon receiving the join request message, the PL may determine whether to approve the vehicle transmitting the message to join the PG based on the vehicle function information.

Join Request Message-Option #2

The join request message of option #2 is described below with reference to Tables 11 to 12. No duplicate description is given of those described above in connection with Tables 1 to 10.

Table 11 shows an example of the join request message. To distinguish from the above-described join request message of option #1, the join request message of Table 11 may be denoted a platooning join request (PlatooningJoinRequest) message. That is, the join request message of option #2 may be denoted a platooning join request message. However, this is solely for distinguishing from the join request message of option #1, and the join request messages of option #1 and option #2, both, may be collectively referred to as join request message.

TABLE 11

| Descriptive Name | PlatooningJoinRequest |
|---|---|
| Identifier | DataType_xxx |
| ASN.1 representation | PlatooningJoinRequest :: = SEQUENCE { <br> MessageName MessageName, <br> VehicleID VehicleID, <br> PlatooningGroupID PlatooningGroupID, <br> VehicleFunctions VehicleFunctions, <br> CAM optional, <br> . . . <br> } |
| Definition | This DF (Data Frame) conveys a message requesting to join the platooning group. |
| Unit | N/A |

Referring to Table 11, the platooning join request message, as a DF, may carry the message requesting to join the PG. According to an embodiment, the platooning join request message may include message name (MessageName) information, vehicle ID information, platooning group ID information, and/or vehicle function information. Further, optionally, the platooning join request message may further include CAM information for transferring the basic information of the vehicle transmitting the message. Here, for each piece of information, no duplicate information is given of those described above.

In the embodiment of Table 11, the vehicle ID information indicates the ID of the message sender transmitting the platooning join request message, and the platooning group ID information indicates the ID of the PG which the message sender transmitting the platooning join request message desires to join.

Table 12 shows an example of the message name (MessageName) information.

TABLE 12

| Descriptive Name | MessageName |
|---|---|
| Identifier | DataType_xxx |
| ASN.1 representation | MessageName :: = INTEGER (0 . . . 100) |
| Definition | This DE (Data Element) indicates the name of message. |
| Unit | N/A |

Referring to Table 12, the message name information, as a DE, may indicate the name of message. In the case of option #2, there may be one or more different platooning join request messages with the same format and, thus, such message name information indicating message names is needed. The message name information may have the same role as the platooning message type information in Table 9. In this case, the message name information may be set to a value (e.g., "1") indicating that the message containing the message name information is a join request message.

Join Response Message

Join response message means a response message for the join request message. That is, the join response message corresponds to a message responsive to the request for joining the PG. The join response message may be transmitted only when the join request is approved. Or, the join response message may be transmitted both when the join request is approved and when the join request is rejected. In this case, whether the join request is approved/rejected may be indicated via an additional field of the join response message.

According to an embodiment, the join response message may be carried via a platooning message (PlatooningMessage) that conveys various types of messages regarding platooning (option #1). In another embodiment, the join response message may be carried via a message with an independent structure/format (option #2).

Join Response Message-Option #1

The join response message of option #1 is described below with reference to Tables 13 and 14. No duplicate description is given of those described above in connection with Tables 1 to 12.

Table 13 shows an example of the platooning message (PlatooningMessage). The platooning message of Table 13 may have the same structure/format as the platooning message of FIG. 8.

TABLE 13

| Descriptive Name | PlatooningMessage |
|---|---|
| Identifier | DataType_xxx |
| ASN.1 representation | PlatooningMessage :: = SEQUENCE { VehicleID VehicleID, PlatooningGroupID PlatooningGroupID, PlatooningMessageType PlatooningMessageType, VehicleFunctions VehicleFunctions, CAM optional, . . . } |
| Definition | This DF (Data Frame) conveys various types of messages about platooning. |
| Unit | N/A |

Referring to Table 13, the platooning message, as a DF, may carry various types of messages regarding platooning. According to an embodiment, the platooning message may include vehicle ID information, platooning group ID information, platooning message type (PlatooningMessageType) information, and/or vehicle function (VehicleFunctions) information. Further, optionally, the platooning message may further include CAM information for transferring the basic information of the vehicle transmitting the message. Here, for each piece of information, no duplicate information is given of those described above.

In the embodiment of Table 13, the vehicle ID information indicates the ID of the message sender transmitting the join request message, and the platooning group ID information indicates the ID of the PG to which the message sender transmitting the join response message belongs. Meanwhile, where the platooning message carries the join response message, the vehicle function information may not be included in the platooning message.

Table 14 shows an example of the platooning message type (PlatooningMessageType) information. The platooning message type information of Table 14 may have the same structure/format as the platooning message type information of FIG. 9.

TABLE 14

| Descriptive Name | PlatooningMessageType |
|---|---|
| Identifier | DataType_xxx |
| ASN.1 representation | PlatooningMessageType :: = INTEGER (0 . . . 100) |

TABLE 14-continued

| Descriptive Name | PlatooningMessageType |
|---|---|
| Definition | This DE (Data Element) indicates the type of message about platooning. "1" means "request to join the platooning group", "2" means "response to a request to join the platooning group" |
| Unit | N/A |

Referring to Table 14, the platooning message type information may indicate the type of message regarding platooning. That is, the platooning message type information may indicate the type of the message carried via the platooning message.

"1" means "requesting to join the PG." That is, where the value of the platooning message type information is "1," the platooning message type information may indicate that the platooning message carries the join request message.

"2" means "responding to the request for joining the PG." That is, where the value of the platooning message type information is "2," the platooning message type information may indicate that the platooning message carries the join response message.

Join Response Message-Option #2

The join response message of option #2 is described below with reference to Table 15. No duplicate description is given of those described above in connection with Tables 1 to 14.

Table 15 shows an example of the join response message. To distinguish from the above-described join response message of option #1, the join response message of Table 15 may be denoted a platooning join response (PlatooningJoinResponse) message. That is, the join response message of option #2 may be denoted a platooning join response message. However, this is solely for distinguishing from the join response message of option #1, and the join response messages of option #1 and option #2, both, may be collectively referred to as join response message.

TABLE 15

| Descriptive Name | PlatooningJoinResponse |
|---|---|
| Identifier | DataType_xxx |
| ASN.1 representation | PlatooningJoinResponse :: = SEQUENCE {<br>MessageName MessageName,<br>VehicleID VehicleID,<br>PlatooningGroupID PlatooningGroupID,<br>} |
| Definition | This DF (Data Frame) conveys a message responding to a request to join the platooning group. |
| Unit | N/A |

Referring to Table 15, the platooning join response message, as a DF, may carry a message responsive to the request for joining the PG. According to an embodiment, the platooning join response message may include message name (MessageName) information, vehicle ID information, and/or platooning group ID information. Here, for each piece of information, no duplicate information is given of those described above.

In the embodiment of Table 15, the vehicle ID information indicates the ID of the message sender transmitting the platooning join request message, and the platooning group ID information indicates the ID of the PG which the message sender transmitting the platooning join response message desires to join.

Meanwhile, if a new PM joins, the PL may update the platooning group information. For example, in the embodiment of FIG. 14, if the vehicle ITS-S is the new PM, the PL vehicle ITS-S may generate platooning group information.

In an embodiment, the platooning group information may include the whole or part of the information included in the above-described platooning information message. For example, the platooning group information may include platooning group ID information, platooning leader ID information, platooning role information, number-of-platooning members information, platooning destination information, and/or platooning route information.

Platooning Group Leaving

FIG. 15 illustrates a procedure for leaving a platooning group according to an embodiment of the disclosure. FIG.

15 shows an example message flow between a PM vehicle and a PL vehicle to leave a platooning group (PG). In other words, the message flow when a vehicle (PM vehicle) which belongs to the PG may be as shown in FIG. 15. In the embodiment of FIG. 15, vehicle ITS-S denotes the ITS-S of PM vehicle, and PL vehicle ITS-S denotes the ITS-S of PL vehicle.

In the embodiment of FIG. 15, it is assumed that a platooning group leaving procedure starts under the conditions that the platooning application of the vehicle ITS-S and PL vehicle ITS-S is on, and the platooning status of the vehicle ITS-S and the PL vehicle ITS-S is the activated status. Here, the activated status corresponds to the same status as the above-described platooning activated status.

The vehicle ITS-S may determine to leave the platooning group. For example, the vehicle ITS-S may determine to leave via the platooning management entity. As another example, the vehicle ITS-S may determine to leave via the platooning application.

Where it is determined to leave the platooning group, the vehicle ITS-S may generate a leave message. To that end, the platooning application or platooning management entity of the vehicle ITS-S may transfer a request for generating a leave message to the V2V/I2V messaging entity, and the V2V/I2V messaging entity may generate a leave message. In the disclosure, leave message may be denoted a leave notification message.

The vehicle ITS-S may transmit the leave message to the PL vehicle ITS-S via the V2X network. To that end, the V2V/I2V messaging entity of the vehicle ITS-S may transfer the generated leave message to the networking/transport layer. The so-transferred leave message may be processed as a wireless signal via networking/transport layer and access layer processing and be transmitted to the PL vehicle ITS-S.

The PL vehicle ITS-S may receive the leave message via the V2X network and process the leave message. To that end, the PL vehicle ITS-S may receive a wireless signal including the leave message, perform access layer processing and networking/transport layer processing on the same, and transfer the leave message to the V2V/I2V messaging entity. The V2V/I2V messaging entity of the PL vehicle ITS-S may parse the leave message and transfer the information (leave information) included in the leave message to the platooning management entity. In the disclosure, leave information may be denoted a leave notification information.

The PL vehicle ITS-S may update the platooning group based on the leave information included in the leave message. For example, the platooning management entity of the PL vehicle ITS-S may update the platooning group based on the leave information transferred from the V2V/I2V messaging entity. As another example, the platooning management entity of the PL vehicle ITS-S may transfer the leave information transferred from the V2V/I2V messaging entity to the platooning application, and the platooning application may update the platooning group based on the leave information.

Where the platooning group is updated, the PL vehicle ITS-S may generate a leave response message. For example, where the platooning group update is performed by the platooning management entity, the platooning management entity may transfer a request for generating a leave response message to the V2V/I2V messaging entity, and the V2V/I2V messaging entity may generate a leave response message. As another example, where the platooning group update is performed by the platooning application, the platooning application may transfer a request for generating a leave response message to the V2V/I2V messaging entity, and the V2V/I2V messaging entity may generate a leave response message.

The PL vehicle ITS-S may transmit the leave response message to the vehicle ITS-S via the V2X network. To that end, the V2V/I2V messaging entity of the PL vehicle ITS-S may transfer the generated leave response message to the networking/transport layer. The so-transferred leave response message may be processed as a wireless signal via networking/transport layer processing and access layer processing and be transferred to the vehicle ITS-S.

The vehicle ITS-S may receive the leave response message via the V2X network and process the leave response message. To that end, the vehicle ITS-S may receive a wireless signal including the leave response message, perform access layer processing and networking/transport layer processing on the same, and transfer the leave response message to the V2V/I2V messaging entity. The V2V/I2V messaging entity of the vehicle ITS-S may parse the leave response message and transfer the information (leave response information) included in the leave response message to the platooning management entity.

The vehicle ITS-S may switch the platooning status from the activated status to the terminated status based on the leave response information included in the leave response message. In this case, the vehicle ITS-S may turn off the platooning application or switch the platooning status from the terminated status to the PL discovery status. Where the platooning application is turned off, the platooning status switches from the terminated status to the disabled status. Here, the terminated status corresponds to the above-described platooning terminated status, the PL discovery status corresponds to the above-described PL/PG discovery status, and the disabled status corresponds to the above-described platooning disabled status.

The vehicle ITS-S may update the platooning group. For example, the vehicle ITS-S may update the platooning group via the platooning application or platooning management entity.

Various examples of the leave message (leave notification message) and leave response message used in the above-described platooning group leave procedure are described below.

Leave Notification Message

Leave notification message means a message for notifying of leaving the PG. That is, the leave notification message corresponds to a message used to notify of leaving the PG.

According to an embodiment, the leave notification message may be carried via a platooning message (PlatooningMessage) that conveys various types of messages regarding platooning (option #1). In another embodiment, the leave notification message may be carried via a message with an independent structure/format (option #2).

Leave Notification Message-Option #1

The leave notification message of option #1 is described below with reference to Tables 16 and 17. No duplicate description is given of those described above in connection with Tables 1 to 15.

Table 16 shows an example of the platooning message (PlatooningMessage). The platooning message of Table 16 may have the same structure/format as the platooning message of FIG. 8.

TABLE 16

| | |
|---|---|
| Descriptive Name | PlatooningMessage |
| Identifier | DataType_xxx |
| ASN.1 representation | PlatooningMessage :: = SEQUENCE {<br>VehicleID VehicleID,<br>PlatooningGroupID PlatooningGroupID,<br>PlatooningMessageType PlatooningMessageType,<br>VehicleFunctions VehicleFunctions optional,<br>CAM optional,<br>. . .<br>} |
| Definition | This DF (Data Frame) conveys various messages about platooning. |
| Unit | N/A |

Referring to Table 16, the platooning message, as a DF, may carry various types of messages regarding platooning. According to an embodiment, the platooning message may include vehicle ID information, platooning group ID information, platooning message type information, and/or vehicle function information. Further, optionally, the platooning message may further include CAM information for transferring the basic information of the vehicle transmitting the message. Here, for each piece of information, no duplicate information is given of those described above.

In the embodiment of Table 16, the vehicle ID information indicates the ID of the message sender transmitting the leave notification message, and the platooning group ID information indicates the ID of the PG which the message sender transmitting the leave notification message desires to leave. Meanwhile, where the platooning message carries the leave notification message, the vehicle function information may not be included in the platooning message.

Table 17 shows an example of the platooning message type (PlatooningMessageType) information. The platooning message type information of Table 17 may have the same structure/format as the platooning message type information of FIG. 9.

TABLE 17

| | |
|---|---|
| Descriptive Name | PlatooningMessageType |
| Identifier | DataType_xxx |
| ASN.1 representation | PlatooningMessageType :: = INTEGER (0 . . . 100) |
| Definition | This DE (Data Element) indicates the type of message about platooning. "1" means "request to join the platooning group", "2" means "response to a request to join the platooning group", "3" means "notify leaving from the platooning group" |
| Unit | N/A |

Referring to Table 17, the platooning message type information may indicate the type of message regarding platooning. That is, the platooning message type information may indicate the type of the message carried via the platooning message.

"1" means "requesting to join the PG." That is, where the value of the platooning message type information is "1," the platooning message type information may indicate that the platooning message carries the join request message.

"2" means "responding to the request for joining the PG." That is, where the value of the platooning message type information is "2," the platooning message type information may indicate that the platooning message carries the join response message.

"3" means "notifying of leaving the PG." That is, where the value of the platooning message type information is "3," the platooning message type information may indicate that the platooning message carries the leave notification message.

Leave Notification Message-Option #2

The leave notification message of option #2 is described below with reference to Table 18. No duplicate description is given of those described above in connection with Tables 1 to 17.

Table 18 shows an example of the leave notification message. To distinguish from the above-described leave notification message of option #1, the leave notification message of Table 18 may be denoted a platooning leave notification (PlatooningLeaveNotify) message. That is, the leave notification message of option #2 may be denoted a platooning leave notification message. However, this is solely for distinguishing from the leave notification message of option #1, and the leave notification messages of option #1 and option #2, both, may be collectively referred to as leave notification message.

TABLE 18

| Descriptive Name | PlatooningLeaveNotify |
|---|---|
| Identifier | DataType_xxx |
| ASN.1 representation | PlatooningLeaveNotify :: = SEQUENCE {<br>MessageName MessageName,<br>VehicleID VehicleID,<br>PlatooningGroupID PlatooningGroupID,<br>} |
| Definition | This DF (Data Frame) conveys a message notifying to leave the platooning group. |
| Unit | N/A |

Referring to Table 18, the platooning leave notification message, as a DF, may carry the message notifying of leaving the PG According to an embodiment, the platooning leave notification message may include message name information, vehicle ID information, and/or platooning group ID information. Here, for each piece of information, no duplicate information is given of those described above.

In the embodiment of Table 18, the vehicle ID information indicates the ID of the message sender transmitting the platooning leave notification message, and the platooning group ID information indicates the ID of the PG which the message sender transmitting the platooning leave notification message desires to leave.

Meanwhile, if the PM leaves, the PL may update the platooning group information. Here, the platooning group information may include the whole or part of the information included in the above-described platooning information message. According to an embodiment, the PL may delete the information for the leaving PM from the platooning group information. For example, in the embodiment of FIG. 15, where the vehicle ITS-S leaves, the PL vehicle ITS-S may delete the information for the leaving vehicle ITS-S from the platooning group information. That is, the value of the number-of-platooning members information may be reduced by one.

Further, if the PM leaves the PL, the platooning group information may be updated. According to an embodiment, the PM may delete the platooning group information itself. For example, where the vehicle ITS-S leaves in the embodiment of FIG. 15, the vehicle ITS-S may delete the platooning group information itself Leave Response Message Where the PM leaves, the PL, which receives the leave notification message, may transmit its confirmation as a response. The leave response message means a response message for the leave notification message. That is, the leave response message corresponds to a message responsive to the notification of leaving the PG.

According to an embodiment, the leave response message may be carried via a platooning message (PlatooningMessage) that conveys various types of messages regarding platooning (option #1). In another embodiment, the leave response message may be carried via a message with an independent structure/format (option #2).

Leave Response Message-Option #1

The leave response message of option #1 is described below with reference to Tables 19 and 20. No duplicate description is given of those described above in connection with Tables 1 to 18.

Table 19 shows an example of the platooning message (PlatooningMessage). The platooning message of Table 19 may have the same structure/format as the platooning message of FIG. 8.

TABLE 19

| Descriptive Name | PlatooningMessage |
|---|---|
| Identifier | DataType_xxx |
| ASN.1 representation | PlatooningMessage :: = SEQUENCE {<br>VehicleID VehicleID,<br>PlatooningGroupID PlatooningGroupID,<br>PlatooningMessageType PlatooningMessageType,<br>VehicleFunctions VehicleFunctions optional,<br>CAM optional,<br>. . .<br>} |
| Definition | This DF (Data Frame) conveys various messages about platooning. |
| Unit | N/A |

Referring to Table 19, the platooning message, as a DF, may carry various types of messages regarding platooning. According to an embodiment, the platooning message may include vehicle ID information, platooning group ID information, platooning message type information, and/or vehicle function information. Further, optionally, the platooning message may further include CAM information for transferring the basic information of the vehicle transmitting the message. Here, for each piece of information, no duplicate information is given of those described above.

In the embodiment of Table 19, the vehicle ID information indicates the ID of the message sender transmitting the leave notification message, and the platooning group ID information indicates the ID of the PG which the message sender transmitting the leave notification message desires to leave. Meanwhile, where the platooning message carries the leave response message, the vehicle function information may not be included in the platooning message.

Table 20 shows an example of the platooning message type (PlatooningMessageType) information. The platooning message type information of Table 20 may have the same structure/format as the platooning message type information of FIG. 9.

TABLE 20

| Descriptive Name | PlatooningMessageType |
| --- | --- |
| Identifier | DataType_xxx |
| ASN.1 representation | PlatooningMessageType :: = INTEGER (0 . . . 100) |
| Definition | This DE (Data Element) indicates the type of message about platooning. "1" means "request to join the platooning group", "2" means "response to a request to join the platooning group", "3" means "notify leaving from the platooning group", "4" means "confirm the notification of leaving from the platooning group" |
| Unit | N/A |

Referring to Table 20, the platooning message type information may indicate the type of message regarding platooning. That is, the platooning message type information may indicate the type of the message carried via the platooning message.

"1" means "requesting to join the PG." That is, where the value of the platooning message type information is "1," the platooning message type information may indicate that the platooning message carries the join request message.

"2" means "responding to the request for joining the PG." That is, where the value of the platooning message type information is "2," the platooning message type information may indicate that the platooning message carries the join response message.

"3" means "notifying of leaving the PG." That is, where the value of the platooning message type information is "3," the platooning message type information may indicate that the platooning message carries the leave notification message.

"4" means "confirming the notification of leaving the PG." That is, where the value of the platooning message type information is "4," the platooning message type information may indicate that the platooning message carries the leave response message.

Leave Response Message-Option #2

The leave response message of option #2 is described below with reference to Table 21. No duplicate description is given of those described above in connection with Tables 1 to 20.

Table 21 shows an example of the leave notification message. To distinguish from the above-described leave notification message of option #1, the leave notification message of Table 21 may be denoted a platooning leave response (PlatooningLeaveResponse) message. That is, the leave response message of option #2 may be denoted a platooning leave notification message. However, this is solely for distinguishing from the leave response message of option #1, and the leave response messages of option #1 and option #2, both, may be collectively referred to as leave response message.

TABLE 21

| Descriptive Name | PlatooningLeaveResponse |
| --- | --- |
| Identifier | DataType_xxx |
| ASN.1 representation | PlatooningLeaveResponse ::= SEQUENCE { MessageName MessageName, VehicleID VehicleID, PlatooningGroupID PlatooningGroupID, } |

TABLE 21-continued

| Definition | This DF (Data Frame) conveys a message responding to leave the platooning group. |
| --- | --- |
| Unit | N/A |

Referring to Table 21, the platooning leave response message, as a DF, may carry the message responsive to the notification of leaving the PG. According to an embodiment, the platooning leave response message may include message name information, vehicle ID information, and/or platooning group ID information. Here, for each piece of information, no duplicate information is given of those described above.

In the embodiment of Table 21, the vehicle ID information indicates the ID of the message sender transmitting the platooning leave notification message, and the platooning group ID information indicates the ID of the PG which the message sender transmitting the platooning leave notification message desires to leave.

Meanwhile, where the PM desiring to leave fails to receive the leave response message, the leave notification message may be retransmitted.

Platooning Group Dissolving

FIG. 16 illustrates a procedure for dissolving a platooning group according to an embodiment of the disclosure. FIG. 16 shows an example message flow between a PM vehicle and a PL vehicle to dissolve a platooning group (PG). In other words, the message flow when a PG is dissolved may be as shown in FIG. 16. In the embodiment of FIG. 16, vehicle ITS-S denotes the ITS-S of PM vehicle, and PL vehicle ITS-S denotes the ITS-S of PL vehicle.

In the embodiment of FIG. 16, it is assumed that a platooning group dissolving procedure starts under the conditions that the platooning application of the vehicle ITS-S and PL vehicle ITS-S is on, and the platooning status of the vehicle ITS-S and the PL vehicle ITS-S is the activated status. Here, the activated status corresponds to the same status as the above-described platooning activated status.

The PL vehicle ITS-S may determine to dissolve the platooning group. For example, the vehicle ITS-S may determine to dissolve via the platooning management entity. As another example, the vehicle ITS-S may determine to dissolve via the platooning application.

Where it is determined to dissolve the platooning group, the PL vehicle ITS-S may generate a dissolving message. To that end, the platooning application or platooning management entity of the PL vehicle ITS-S may transfer a request for generating a dissolving message to the V2V/I2V messaging entity, and the V2V/I2V messaging entity may generate a dissolving message. In the disclosure, dissolving message may be denoted a dissolving notification message.

The PL vehicle ITS-S may transmit the dissolving message to the vehicle ITS-S via the V2X network. To that end, the V2V/I2V messaging entity of the PL vehicle ITS-S may transfer the generated dissolving message to the networking/transport layer. The so-transferred dissolving message may be processed as a wireless signal via networking/transport layer and access layer processing and be transmitted to the vehicle ITS-S.

The vehicle ITS-S may receive the dissolving message via the V2X network and process the leave response message. To that end, the vehicle ITS-S may receive a wireless signal including the dissolving message, perform access layer processing and networking/transport layer processing on the same, and transfer the dissolving message to the V2V/I2V messaging entity. The V2V/I2V messaging entity of the vehicle ITS-S may parse the dissolving message and transfer the information (dissolving information) included in the dissolving message to the platooning management entity. In the disclosure, dissolving information may be denoted dissolving notification information.

The vehicle ITS-S may switch the platooning status from the activated status to the terminated status based on the dissolving information included in the dissolving message. In this case, the vehicle ITS-S may turn off the platooning application or switch the platooning status from the terminated status to the PL discovery status. Where the platooning application is turned off, the platooning status switches from the terminated status to the disabled status. Here, the terminated status corresponds to the above-described platooning terminated status, the PL discovery status corresponds to the above-described PL/PG discovery status, and the disabled status corresponds to the above-described platooning disabled status.

The vehicle ITS-S may update the platooning group. For example, the vehicle ITS-S may update the platooning group via the platooning application or platooning management entity.

Where the platooning status switches into the terminated status, the vehicle ITS-S may generate a dissolving response message. For example, the platooning management entity of the vehicle ITS-S may transfer a request for generating a dissolving response message to the V2V/I2V messaging entity, and the V2V/I2V messaging entity may generate a dissolving response message.

The vehicle ITS-S may transmit the dissolving response message to the vehicle ITS-S via the V2X network. To that end, the V2V/I2V messaging entity of the vehicle ITS-S may transfer the generated dissolving response message to the networking/transport layer. The so-transferred dissolving response message may be processed as a wireless signal via networking/transport layer processing and access layer processing and be transferred to the PL vehicle ITS-S.

The PL vehicle ITS-S may receive the dissolving response message via the V2X network and process the dissolving response message. To that end, the PL vehicle ITS-S may receive a wireless signal including the dissolving response message, perform access layer processing and networking/transport layer processing on the same, and transfer the dissolving response message to the V2V/I2V messaging entity. The V2V/I2V messaging entity of the vehicle ITS-S may parse the dissolving response message and transfer the information (dissolving response information) included in the dissolving response message to the platooning management entity.

Thereafter, the PL vehicle ITS-S may perform a next, optional procedure. For example, the PL vehicle ITS-S may switch the platooning status from the activated status to the terminated status based on the dissolving information included in the dissolving message. In this case, the vehicle ITS-S may turn off the platooning application and switch the platooning status from the terminated status to the disabled status. Here, the terminated status corresponds to the above-described platooning terminated status, and the disabled status corresponds to the above-described platooning disabled status.

The PL vehicle ITS-S may update the platooning group. For example, the PL vehicle ITS-S may update the platooning group via the platooning application or platooning management entity.

Various examples of the dissolving message (dissolving notification message) and dissolving response message used in the above-described platooning group dissolving procedure are described below.

Dissolving Notification Message

Dissolving notification message means a message for notifying of dissolving the PG. That is, the dissolving notification message corresponds to a message used to notify of dissolving the PG.

According to an embodiment, the dissolving notification message may be carried via a platooning message (PlatooningMessage) that conveys various types of messages regarding platooning (option #1). In another embodiment, the dissolving notification message may be carried via a message with an independent structure/format (option #2).

Dissolving Notification Message-Option #1

The dissolving notification message of option #1 is described below with reference to Tables 22 and 23. No duplicate description is given of those described above in connection with Tables 1 to 21.

Table 22 shows an example of the platooning message (PlatooningMessage). The platooning message of Table 22 may have the same structure/format as the platooning message of FIG. 8.

TABLE 22

| | |
|---|---|
| Descriptive Name | PlatooningMessage |
| Identifier | DataType_xxx |
| ASN.1 representation | PlatooningMessage ::= SEQUENCE { VehicleID VehicleID, PlatooningGroupID PlatooningGroupID, |

TABLE 22-continued

| | |
|---|---|
| | PlatooningMessageType PlatooningMessageType,<br>VehicleFunctions VehicleFunctions optional,<br>CAM optional,<br>. . .<br>} |
| Definition | This DF (Data Frame) conveys various messages about platooning. |
| Unit | N/A |

Referring to Table 22, the platooning message, as a DF, may carry various types of messages regarding platooning. According to an embodiment, the platooning message may include vehicle ID information, platooning group ID information, platooning message type information, and/or vehicle function information. Further, optionally, the platooning message may further include CAM information for transferring the basic information of the vehicle transmitting the message. Here, for each piece of information, no duplicate information is given of those described above.

In the embodiment of Table 22, the vehicle ID information indicates the ID of the message sender transmitting the dissolving notification message, and the platooning group ID information indicates the ID of the PG which the message sender transmitting the dissolving notification message belongs to. Meanwhile, where the platooning message carries the dissolving notification message, the vehicle function information may not be included in the platooning message.

Table 23 shows an example of the platooning message type (PlatooningMessageType) information. The platooning message type information of Table 23 may have the same structure/format as the platooning message type information of FIG. 9.

TABLE 23

| | |
|---|---|
| Descriptive Name | PlatooningMessageType |
| Identifier | DataType_xxx |
| ASN.1 representation | PlatooningMessageType ::= INTEGER(0 . . . 100) |
| Definition | This DE (Data Element) indicates the type of message about platooning. "1" means "request to join the platooning group", "2" means "response to a request to join the platooning group", "3" means "notify leaving from the platooning group", "4" means "confirm the notification of leaving from the platooning group", "5" means "notify dissolving the platooning group" |
| Unit | N/A |

Referring to Table 23, the platooning message type information may indicate the type of message regarding platooning. That is, the platooning message type information may indicate the type of the message carried via the platooning message.

"1" means "requesting to join the PG." That is, where the value of the platooning message type information is "1," the platooning message type information may indicate that the platooning message carries the join request message.

"2" means "responding to the request for joining the PG." That is, where the value of the platooning message type information is "2," the platooning message type information may indicate that the platooning message carries the join response message.

"3" means "notifying of leaving the PG." That is, where the value of the platooning message type information is "3," the platooning message type information may indicate that the platooning message carries the leave notification message.

"4" means "confirming the notification of leaving the PG." That is, where the value of the platooning message type information is "4," the platooning message type information may indicate that the platooning message carries the leave response message.

"5" means "notifying of dissolving the PG." That is, where the value of the platooning message type information is "5," the platooning message type information may indicate that the platooning message carries the dissolving notification message.

Dissolving Notification Message-Option #2

The dissolving notification message of option #2 is described below with reference to Table 24. No duplicate description is given of those described above in connection with Tables 1 to 23.

Table 24 shows an example of the dissolving notification message. To distinguish from the above-described dissolving notification message of option #1, the dissolving notification message of Table 18 may be denoted a platooning dissolving notification (PlatooningDissolveNotify) message. That is, the dissolving notification message of option #2 may be denoted a platooning dissolving notification message. However, this is solely for distinguishing from the dissolving notification message of option #1, and the dissolving notification messages of option #1 and option #2, both, may be collectively referred to as dissolving notification message.

TABLE 24

| | |
|---|---|
| Descriptive Name | PlatooningDissolveNotify |
| Identifier | DataType_xxx |
| ASN.1 representation | PlatooningDissolveNotify ::= SEQUENCE {<br>MessageName MessageName,<br>VehicleID VehicleID,<br>PlatooningGroupID PlatooningGroupID,<br>} |
| Definition | This DF (Data Frame) conveys a message notifying dissolution of the platooning group. |
| Unit | N/A |

Referring to Table 24, the platooning dissolving notification message, as a DF, may carry the message notifying of dissolving the PG According to an embodiment, the platooning dissolving notification message may include message name information, vehicle ID information, and/or platooning group ID information. Here, for the message name information, vehicle ID information, platooning group ID information, and vehicle function information, no duplicate description is given of those described above in connection with Tables 1 to 23.

In the embodiment of Table 24, the vehicle ID information indicates the ID of the message sender transmitting the platooning dissolving notification message, and the platooning group ID information indicates the ID of the PG which the message sender transmitting the platooning dissolving notification message belongs to.

Meanwhile, if the PG is dissolved, the PL and PM may update the platooning group information. Here, the platooning group information may include the whole or part of the information included in the above-described platooning information message. According to an embodiment, the PL and PM may delete the platooning group information itself. For example, where the PG is dissolved in the embodiment of FIG. 16, the vehicle ITS-S and PL vehicle ITS-S may delete the platooning group information itself Dissolving Response Message Where the PG is dissolved, the PM, which receives the dissolving notification message, may transmit its confirmation as a response. The dissolving response message means a response message for the dissolving notification message. That is, the dissolving response message corresponds to a message responsive to the notification of dissolving the PG.

According to an embodiment, the dissolving response message may be carried via a platooning message (PlatooningMessage) that conveys various types of messages regarding platooning (option #1). In another embodiment, the dissolving response message may be carried via a message with an independent structure/format (option #2).

Dissolving Response Message-Option #1

The dissolving response message of option #1 is described below with reference to Tables 25 and 26. No duplicate description is given of those described above in connection with Tables 1 to 24.

Table 25 shows an example of the platooning message (PlatooningMessage). The platooning message of Table 25 may have the same structure/format as the platooning message of FIG. 8.

TABLE 25

| | |
|---|---|
| Descriptive Name | PlatooningMessage |
| Identifier | DataType_xxx |
| ASN.1 representation | PlatooningMessage ::= SEQUENCE { VehicleID VehicleID, PlatooningGroupID PlatooningGroupID, PlatooningMessageType PlatooningMessageType, VehicleFunctions VehicleFunctions optional, CAM optional, . . . } |
| Definition | This DF (Data Frame) conveys various messages about platooning. |
| Unit | N/A |

Referring to Table 25, the platooning message, as a DF, may carry various types of messages regarding platooning. According to an embodiment, the platooning message may include vehicle ID information, platooning group ID information, platooning message type information, and/or vehicle function information. Further, optionally, the platooning message may further include CAM information for transferring the basic information of the vehicle transmitting the message. Here, for each piece of information, no duplicate information is given of those described above.

In the embodiment of Table 25, the vehicle ID information indicates the ID of the message sender transmitting the dissolving notification message, and the platooning group ID information indicates the ID of the PG which the message sender transmitting the dissolving notification message belongs to. Meanwhile, where the platooning message carries the dissolving response message, the vehicle function information may not be included in the platooning message.

Table 26 shows an example of the platooning message type (PlatooningMessageType) information. The platooning message type information of Table 26 may have the same structure/format as the platooning message type information of FIG. 9.

TABLE 26

| | |
|---|---|
| Descriptive Name | PlatooningMessageType |
| Identifier | DataType_xxx |
| ASN.1 representation | PlatooningMessageType ::= INTEGER(0 . . . 100) |

TABLE 26-continued

| | |
|---|---|
| Definition | This DE (Data Element) indicates the type of message about platooning. "1" means "request to join the platooning group", "2" means "response to a request to join the platooning group", "3" means "notify leaving from the platooning group", "4" means "confirm the notification of leaving from the platooning group", "5" means "notify dissolving the platooning group", "6" means "confirm the notification of dissolving the platooning group" |
| Unit | N/A |

Referring to Table 26, the platooning message type information may indicate the type of message regarding platooning. That is, the platooning message type information may indicate the type of the message carried via the platooning message.

"1" means "requesting to join the PG." That is, where the value of the platooning message type information is "1," the platooning message type information may indicate that the platooning message carries the join request message.

"2" means "responding to the request for joining the PG." That is, where the value of the platooning message type information is "2," the platooning message type information may indicate that the platooning message carries the join response message.

"3" means "notifying of leaving the PG." That is, where the value of the platooning message type information is "3," the platooning message type information may indicate that the platooning message carries the leave notification message.

"4" means "confirming the notification of leaving the PG." That is, where the value of the platooning message type information is "4," the platooning message type information may indicate that the platooning message carries the leave response message.

"5" means "notifying of dissolving the PG." That is, where the value of the platooning message type information is "5," the platooning message type information may indicate that the platooning message carries the dissolving notification message.

"6" means "confirming the notification of dissolving the PG." That is, where the value of the platooning message type information is "6," the platooning message type information may indicate that the platooning message carries the dissolving response message.

Dissolving Response Message-Option #2

The dissolving response message of option #2 is described below with reference to Table 27. No duplicate description is given of those described above in connection with Tables 1 to 26.

Table 27 shows an example of the dissolving notification message. To distinguish from the above-described dissolving notification message of option #1, the dissolving notification message of Table 27 may be denoted a platooning dissolving response (PlatooningLeaveResponse) message. That is, the dissolving response message of option #2 may be denoted a platooning dissolving notification message. However, this is solely for distinguishing from the dissolving response message of option #1, and the dissolving response messages of option #1 and option #2, both, may be collectively referred to as dissolving response message.

TABLE 27

| | |
|---|---|
| Descriptive Name | PlatooningDissolveResponse |
| Identifier | DataType_xxx |
| ASN.1 representation | PlatooningDissolveResponse ::= SEQUENCE {<br>MessageName MessageName,<br>VehicleID VehicleID,<br>PlatooningGroupID PlatooningGroupID,<br>} |
| Definition | This DF (Data Frame) conveys a message notifying dissolution of the platooning group. |
| Unit | N/A |

Referring to Table 27, the platooning dissolving response message, as a DF, may carry the message responsive to the notification of dissolving the PG. According to an embodiment, the platooning dissolving response message may include message name information, vehicle ID information, and/or platooning group ID information. Here, for the message name information, vehicle ID information, platooning group ID information, and vehicle function information, no duplicate description is given of those described above in connection with Tables 1 to 26.

In the embodiment of Table 27, the vehicle ID information indicates the ID of the message sender transmitting the platooning dissolving notification message, and the platooning group ID information indicates the ID of the PG which the message sender transmitting the platooning dissolving notification message belongs to.

Meanwhile, if the PG is dissolved, the PL and PM may update the platooning group information. Here, the platooning group information may include the whole or part of the information included in the above-described platooning information message. According to an embodiment, the PL and PM may delete the platooning group information itself. For example, where the PG is dissolved in the embodiment of FIG. 16, the vehicle ITS-S and PL vehicle ITS-S may delete the platooning group information itself.

Further, where the PM desiring to dissolve fails to receive the dissolving response message, the dissolving notification message may be retransmitted.

Platooning Group Merging

FIG. 17 illustrates a procedure for merging platooning groups according to an embodiment of the disclosure. FIG. 17 shows an example message flow between a first PL vehicle and a second PL vehicle to merge platooning groups (PG). In other words, the message flow when PGs are merged may be as shown in FIG. 17. In the embodiment of FIG. 17, first PL vehicle ITS-S denotes the ITS-S of the first PM vehicle, and second PL vehicle ITS-S denotes the ITS-S of the second PL vehicle.

In the embodiment of FIG. 17, it is assumed that a platooning group merging procedure starts under the conditions that the platooning application of the first PL vehicle ITS-S and the second PL vehicle ITS-S is on, and the platooning status of the first PL vehicle ITS-S and the second PL vehicle ITS-S is the activated status. Here, the activated status corresponds to the same status as the above-described platooning activated status.

The second PL vehicle ITS-S may transmit a platooning information message to the first vehicle ITS-S via a V2X network. To that end, the platooning management entity of the second PL vehicle ITS-S may transfer a request for transmitting a platooning information message to the V2V/I2V messaging entity, and the V2V/I2V messaging entity may generate a platooning information message and transfer the platooning information message to the networking/transport layer. The so-transferred platooning information message may be processed as a wireless signal via networking/transport layer and access layer processing and be transmitted to the vehicle ITS-S.

The first PL vehicle ITS-S may receive the platooning information message via the V2X network and process the platooning information message. To that end, the first PL vehicle ITS-S may receive a wireless signal including the platooning information message, perform access layer processing and networking/transport layer processing on the same, and transfer the platooning information message to the V2V/I2V messaging entity. The V2V/I2V messaging entity of the first PL vehicle ITS-S may parse the platooning information message and transfer the information (platooning information) included in the platooning information message to the platooning management entity.

The first PL vehicle ITS-S may determine to merge platooning groups. For example, the first PL vehicle ITS-S may determine to merge via the platooning management entity. As another example, the first PL vehicle ITS-S may determine to merge via the platooning application.

Where it is determined to merge platooning groups, the first PL vehicle ITS-S may generate a merge request message. To that end, the platooning application or platooning management entity of the first PL vehicle ITS-S may transfer a request for generating a merge request message to the V2V/I2V messaging entity, and the V2V/I2V messaging entity may generate a merge request message. In the disclosure, merge request message may be denoted a merge message.

The first PL vehicle ITS-S may transmit the merge request message to the vehicle ITS-S via the V2X network. To that end, the V2V/I2V messaging entity of the first PL vehicle ITS-S may transfer the generated merge request message to the networking/transport layer. The so-transferred merge request message may be processed as a wireless signal via networking/transport layer and access layer processing and be transmitted to the second PL vehicle ITS-S.

The second PL vehicle ITS-S may receive the merge request message via the V2X network and process the merge request message. To that end, the vehicle ITS-S may receive a wireless signal including the merge request message, perform access layer processing and networking/transport layer processing on the same, and transfer the merge request message to the V2V/I2V messaging entity. The V2V/I2V messaging entity of the vehicle ITS-S may parse the merge request message and transfer the information (merge request information) included in the merge message to the platooning management entity. In the disclosure, merge request information may be denoted merge information.

The second PL vehicle ITS-S may determine whether to approve based on the merge request information included in the merge request message. For example, the platooning management entity of the second PL vehicle ITS-S may determine whether to approve to merge PGs based on the merge request information transferred from the V2V/I2V messaging entity. As another example, the platooning management entity of the second PL vehicle ITS-S may transfer the merge request information transferred from the V2V/I2V messaging entity to the platooning application, and the platooning application may determine whether to approve to merge PGs based on the merge request information.

Where it is determined whether to approve, the second PL vehicle ITS-S may generate a merge response message. For example, where it is determined by the platooning management entity whether to approve, the platooning management entity may transfer a request for generating a merge response message to the V2V/I2V messaging entity, and the V2V/I2V messaging entity may generate a merge response message. As another example, where it is determined by the platooning application whether to approve, the platooning application may transfer a request for generating a merge response message to the V2V/I2V messaging entity, and the V2V/I2V messaging entity may generate a merge response message.

The second PL vehicle ITS-S may transmit the merge response message to the first PL vehicle ITS-S via the V2X network. To that end, the V2V/I2V messaging entity of the second PL vehicle ITS-S may transfer the generated merge response message to the networking/transport layer. The so-transferred merge response message may be processed as a wireless signal via networking/transport layer processing and access layer processing and be transferred to the first PL vehicle ITS-S.

The first PL vehicle ITS-S may receive the merge response message via the V2X network and process the merge response message. To that end, the first PL vehicle ITS-S may receive a wireless signal including the merge response message, perform access layer processing and networking/transport layer processing on the same, and transfer the merge response message to the V2V/I2V messaging entity. The V2V/I2V messaging entity of the first PL vehicle ITS-S may parse the merge response message and transfer the information (merge response information) included in the merge response message to the platooning management entity.

The first PL vehicle ITS-S may determine the platooning status based on the merge response information included in the merge response message. For example, where the merge response information indicates that the merge request has been approved, the first PL vehicle ITS-S may change the value of platooning role information to a value indicating that the corresponding vehicle is the PM. As another example, where the merge response information indicates that the merge request has been rejected, the first PL vehicle ITS-S may maintain the value of platooning role information as a value indicating that the corresponding vehicle is the PL.

The first PL vehicle ITS-S may update the platooning group information. For example, the first PL vehicle ITS-S may update the platooning group information by the platooning management entity. As another example, the first PL vehicle ITS-S may update the platooning group information via the platooning application.

Various examples of the merge message (merge request message) and merge response message used in the above-described platooning group merging procedure are described below.

Merge Request Message

Merge request message means a message to request to merge PGs. That is, the merge request message corresponds to a message used to request to merge PGs.

According to an embodiment, the merge request message may be carried via a platooning message (PlatooningMessage) that conveys various types of messages regarding platooning (option #1). In another embodiment, the merge request message may be carried via a message with an independent structure/format (option #2).

Merge Request Message-Option #1

The merge request message of option #1 is described below with reference to Tables 28 to 29. No duplicate description is given of those described above in connection with Tables 1 to 27.

Table 28 shows an example of the platooning message (PlatooningMessage). The platooning message of Table 28 may have the same structure/format as the platooning message of FIG. 8.

TABLE 28

| Descriptive Name | PlatooningMessage |
|---|---|
| Identifier | DataType_xxx |
| ASN.1 representation | PlatooningMessage ::= SEQUENCE { VehicleID VehicleID, PlatooningGroupID PlatooningGroupID, PlatooningMessageType PlatooningMessageType, VehicleFunctions VehicleFunctions, CAM optional, . . . } |
| Definition | This DF (Data Frame) conveys various messages about platooning. |
| Unit | N/A |

Referring to Table 28, the platooning message, as a DF, may carry various types of messages regarding platooning. According to an embodiment, the platooning message may include vehicle ID information, platooning group ID information, platooning message type information, and/or vehicle function information. Further, optionally, the platooning message may further include CAM information for transferring the basic information of the vehicle transmitting the message. Here, for each piece of information, no duplicate information is given of those described above.

In the embodiment of Table 28, the vehicle ID information indicates the ID of the message sender transmitting the merge request message, and the platooning group ID information indicates the ID of the PG which the message sender transmitting the merge request message desires to join.

Table 29 shows an example of the platooning message type (PlatooningMessageType) information. The platooning message type information of Table 29 may have the same structure/format as the platooning message type information of FIG. 9.

TABLE 29

| Descriptive Name | PlatooningMessageType |
|---|---|
| Identifier | DataType_xxx |
| ASN.1 representation | PlatooningMessageType ::= INTEGER(0 . . . 100) |
| Definition | This DE (Data Element) indicates the type of message about platooning. "1" means "request to join the platooning group", "2" means "response to a request to join the platooning group", "3" means "notify leaving from the platooning group", "4" means "confirm the notification of leaving from the platooning group", "5" means "notify dissolving the platooning group", "6" means "confirm the notification of dissolving the platooning group", "7" means "request to merge into the platooning group" |
| Unit | N/A |

Referring to Table 29, the platooning message type information may indicate the type of message regarding platooning. That is, the platooning message type information may indicate the type of the message carried via the platooning message.

"1" means "requesting to join the PG." That is, where the value of the platooning message type information is "1," the platooning message type information may indicate that the platooning message carries the join request message.

"2" means "responding to the request for joining the PG." That is, where the value of the platooning message type information is "2," the platooning message type information may indicate that the platooning message carries the join response message.

"3" means "notifying of leaving the PG." That is, where the value of the platooning message type information is "3," the platooning message type information may indicate that the platooning message carries the leave notification message.

"4" means "confirming the notification of leaving the PG." That is, where the value of the platooning message type information is "4," the platooning message type information may indicate that the platooning message carries the leave response message.

"5" means "notifying of dissolving the PG." That is, where the value of the platooning message type information is "5," the platooning message type information may indicate that the platooning message carries the dissolving notification message.

"6" means "confirming the notification of dissolving the PG." That is, where the value of the platooning message type information is "6," the platooning message type information may indicate that the platooning message carries the dissolving response message.

"7" means "requesting to merge PGs." That is, where the value of the platooning message type information is "7," the platooning message type information may indicate that the platooning message carries the merge request message.

Merge Request Message-Option #2

The merge request message of option #2 is described below with reference to Table 30. No duplicate description is given of those described above in connection with Tables 1 to 29.

Table 30 shows an example of the merge request message. To distinguish from the above-described merge request message of option #1, the merge request message of Table 30 may be denoted a platooning merge request (PlatooningMergeRequest) message. That is, the merge request message of option #2 may be denoted a platooning merge request message. However, this is solely for distinguishing from the merge request message of option #1, and the merge request messages of option #1 and option #2, both, may be collectively referred to as merge request message.

TABLE 30

| | |
|---|---|
| Descriptive Name | PlatooningMergeRequest |
| Identifier | DataType_xxx |
| ASN.1 representation | PlatooningMergeRequest ::= SEQUENCE { MessageName MessageName, VehicleID VehicleID, PlatooningGroupID PlatooningGroupID, VehicleFunctions VehicleFunctions, CAM optional, . . . } |
| Definition | This DF (Data Frame) conveys a message requesting to merge the platooning group. |
| Unit | N/A |

Referring to Table 30, the platooning merge request message, as a DF, may carry the message requesting to merge PGs. According to an embodiment, the platooning merge request message may include message name information, vehicle ID information, platooning group ID information, vehicle function information, and/or CAM information. Here, for each piece of information, no duplicate information is given of those described above.

In the embodiment of Table 30, the vehicle ID information indicates the ID of the message sender transmitting the platooning merge request message, and the platooning group ID information indicates the ID of the PG which the message sender transmitting the platooning merge request message desires to join.

Merge Response Message

Where PGs are merged, the PL, which receives the merge request message, may transmit its confirmation as a response. Merge response message means a response message for the merge request message. That is, the merge response message corresponds to a message responsive to the PG merge request.

The merge response message may be transmitted only when the merge request is approved. Or, the merge response message may be transmitted both when the merge request is approved and when the merge request is rejected. In this case, whether the merge request is approved/rejected may be indicated via an additional field of the merge response message.

According to an embodiment, the merge response message may be carried via a platooning message (PlatooningMessage) that conveys various types of messages regarding platooning (option #1). In another embodiment, the merge response message may be carried via a message with an independent structure/format (option #2).

Merge Response Message-Option #1

The merge response message of option #1 is described below with reference to Tables 31 and 32. No duplicate description is given of those described above in connection with Tables 1 to 30.

Table 31 shows an example of the platooning message (PlatooningMessage). The platooning message of Table 31 may have the same structure/format as the platooning message of FIG. 8.

TABLE 31

| | |
|---|---|
| Descriptive Name | PlatooningMessage |
| Identifier | DataType_xxx |
| ASN.1 representation | PlatooningMessage ::= SEQUENCE { VehicleID VehicleID, PlatooningGroupID PlatooningGroupID, PlatooningMessageType PlatooningMessageType, VehicleFunctions VehicleFunctions optional, CAM optional, . . . } |
| Definition | This DF (Data Frame) conveys various messages about platooning. |
| Unit | N/A |

Referring to Table 31, the platooning message, as a DF, may carry various types of messages regarding platooning. According to an embodiment, the platooning message may include vehicle ID information, platooning group ID information, platooning message type information, and/or vehicle function information. Further, optionally, the platooning message may further include CAM information for transferring the basic information of the vehicle transmitting the message. Here, for each piece of information, no duplicate information is given of those described above.

In the embodiment of Table 31, the vehicle ID information indicates the ID of the message sender transmitting the merge request message, and the platooning group ID information indicates the ID of the PG which the message sender transmitting the merge request message desires to join. Meanwhile, where the platooning message carries the merge response message, the vehicle function information may not be included in the platooning message.

Table 32 shows an example of the platooning message type (PlatooningMessageType) information. The platooning message type information of Table 32 may have the same structure/format as the platooning message type information of FIG. 9.

TABLE 32

| | |
|---|---|
| Descriptive Name | PlatooningMessageType |
| Identifier | DataType_xxx |
| ASN.1 representation | PlatooningMessageType ::= INTEGER(0 . . . 100) |
| Definition | This DE (Data Element) indicates the type of message about platooning. "1" means "request to join the platooning group", "2" means "response to a request to join the platooning group", "3" means "notify leaving from the platooning group", "4" means "confirm the notification of leaving from the platooning group", "5" means "notify dissolving the platooning group", "6" means "confirm the notification of dissolving the platooning group", "7" means "request to merge into the platooning group", "8" means "response to a request to merge into the platooning group" |
| Unit | N/A |

Referring to Table 32, the platooning message type information may indicate the type of message regarding platooning. That is, the platooning message type information may indicate the type of the message carried via the platooning message.

"1" means "requesting to join the PG." That is, where the value of the platooning message type information is "1," the platooning message type information may indicate that the platooning message carries the join request message.

"2" means "responding to the request for joining the PG." That is, where the value of the platooning message type information is "2," the platooning message type information may indicate that the platooning message carries the join response message.

"3" means "notifying of leaving the PG." That is, where the value of the platooning message type information is "3," the platooning message type information may indicate that the platooning message carries the leave notification message.

"4" means "confirming the notification of leaving the PG." That is, where the value of the platooning message type information is "4," the platooning message type information may indicate that the platooning message carries the leave response message.

"5" means "notifying of dissolving the PG." That is, where the value of the platooning message type information is "5," the platooning message type information may indicate that the platooning message carries the dissolving notification message.

"6" means "confirming the notification of dissolving the PG." That is, where the value of the platooning message type information is "6," the platooning message type information may indicate that the platooning message carries the dissolving response message.

"7" means "requesting to merge PGs." That is, where the value of the platooning message type information is "7," the platooning message type information may indicate that the platooning message carries the merge request message.

"8" means "responding to the request for merging PGs." That is, where the value of the platooning message type information is "8," the platooning message type information may indicate that the platooning message carries the merge response message.

Merge Response Message-Option #2

The merge response message of option #2 is described below with reference to Table 33. No duplicate description is given of those described above in connection with Tables 1 to 32.

Table 33 shows an example of the merge response message. To distinguish from the above-described merge response message of option #1, the merge response message of Table 33 may be denoted a platooning merge response (PlatooningMergeResponse) message. That is, the merge response message of option #2 may be denoted a platooning merge response message. However, this is solely for distinguishing from the merge response message of option #1, and the merge response messages of option #1 and option #2, both, may be collectively referred to as merge response message.

TABLE 33

| | |
|---|---|
| Descriptive Name | PlatooningMergeResponse |
| Identifier | DataType_xxx |
| ASN.1 representation | PlatooningMergeResponse ::= SEQUENCE { MessageName MessageName, VehicleID VehicleID, PlatooningGroupID PlatooningGroupID, } |
| Definition | This DF (Data Frame) conveys a message responding to a request to merge into the platooning group. |
| Unit | N/A |

Referring to Table 33, the platooning merge response message, as a DF, may carry the message responsive to the merge request from the PG. According to an embodiment, the platooning merge response message may include message name information, vehicle ID information, and/or platooning group ID information. Here, for the message name information, vehicle ID information, platooning group ID information, and vehicle function information, no duplicate description is given of those described above in connection with Tables 13 and 14.

In the embodiment of Table 33, the vehicle ID information indicates the ID of the message sender transmitting the platooning merge request message, and the platooning group ID information indicates the ID of the PG which the message sender transmitting the platooning merge request message desires to join.

FIG. 18 illustrates a procedure for notifying of a merging of platooning groups according to an embodiment of the disclosure. FIG. 18 shows an example message flow between a first PL vehicle and a PM vehicle to merge platooning groups (PG). In other words, the message flow for merge notification may be as shown in FIG. 18. In the embodiment of FIG. 18, first PL vehicle ITS-S denotes the ITS-S of the first PM vehicle, and PM vehicle ITS-S denotes the ITS-S of the PM vehicle led/managed by the first PM.

In the embodiment of FIG. 18, it is assumed that a platooning group merging notification procedure starts under the conditions that the platooning application of the first PL vehicle ITS-S and the PM vehicle ITS-S is on, the platooning status of the first PL vehicle ITS-S and the PM vehicle ITS-S is the activated status, and the platooning role information for the first PL vehicle ITS-S is changed to a value indicating that the corresponding vehicle indicates the PM.

The first PL vehicle ITS-S may generate a platooning group merged & PL changed notification message. The platooning group merged & PL changed notification message may be abbreviated as a merge notification message. To generate the message, the platooning management entity of the first PL vehicle ITS-S may transfer a request for generating a merge notification message to the V2V/I2V messaging entity, and the V2V/I2V messaging entity may generate a merge notification message.

The first PL vehicle ITS-S may transmit the merge notification message to the vehicle ITS-S via the V2X network. To that end, the V2V/I2V messaging entity of the first PL vehicle ITS-S may transfer the generated merge notification message to the networking/transport layer. The so-transferred merge notification message may be processed as a wireless signal via networking/transport layer and access layer processing and be transmitted to the PM vehicle ITS-S.

The PM vehicle ITS-S may receive the merge notification message via the V2X network and process the merge notification message. To that end, the PM vehicle ITS-S may receive a wireless signal including the merge notification message, perform access layer processing and networking/transport layer processing on the same, and transfer the merge notification message to the V2V/I2V messaging entity. The V2V/I2V messaging entity of the PM vehicle ITS-S may parse the merge notification message and transfer the information (merge notification information) included in the merge notification message to the platooning management entity.

The PM vehicle ITS-S may update the platooning group based on the merge notification information included in the merge notification message. For example, the PM vehicle ITS-S may update the platooning group via the platooning application or platooning management entity.

Further, the first vehicle ITS-S may update the platooning group. For example, the first PL vehicle ITS-S may update the platooning group via the platooning application or platooning management entity.

Various examples of the merge notification message used in the above-described platooning group merge notification procedure are described below.

Merge Notification Message

Merge notification message means a message to notify of a merge of PGs. That is, the merge notification message corresponds to a message used to notify of a merge of PGs.

According to an embodiment, the merge notification message may be carried via a platooning message (PlatooningMessage) that conveys various types of messages regarding platooning (option #1). In another embodiment, the merge notification message may be carried via a message with an independent structure/format (option #2).

Merge Notification Message-Option #1

The merge notification message of option #1 is described below with reference to Tables 34 and 35. No duplicate description is given of those described above in connection with Tables 1 to 33.

Table 34 shows an example of the platooning message (PlatooningMessage). The platooning message of Table 35 may have the same structure/format as the platooning message of FIG. 8.

TABLE 34

| | |
|---|---|
| Descriptive Name | PlatooningMessage |
| Identifier | DataType_xxx |
| ASN.1 representation | PlatooningMessage ::= SEQUENCE {<br>VehicleID VehicleID,<br>PlatooningGroupID PlatooningGroupID optional,<br>PlatooningMessageType PlatooningMessageType, |

TABLE 34-continued

| | |
|---|---|
| | VehicleFunctions VehicleFunctions optional,<br>NewPlatooningGroupInfo PlatooningGroupInfo optional,<br>} |
| Definition | This DF (Data Frame) conveys various messages about platooning |
| Unit | N/A |

Referring to Table 34, the platooning message, as a DF, may carry various types of messages regarding platooning. According to an embodiment, the platooning message may include vehicle ID information, platooning group ID information, platooning message type information, and/or vehicle function information. Further, optionally, the platooning message may further include CAM information for transferring the basic information of the vehicle transmitting the message. Here, for the vehicle ID information, platooning group ID information, platooning message type information, vehicle function information, and CAM information, no duplicate description is given of those described above in connection with Tables 1 and 7.

In the embodiment of Table 34, the platooning message may further include new platooning group information (NewPlatooningGroupInfo). The new platooning group information may provide information about a new platooning group to be merged.

In the embodiment of Table 34, the vehicle ID information indicates the ID of the message sender transmitting the merge notification message, and the platooning group ID information indicates the ID of the PG which the message sender transmitting the merge notification message has previously belonged to.

Table 35 shows an example of the platooning message type (PlatooningMessageType) information. The platooning message type information of Table 35 may have the same structure/format as the platooning message type information of FIG. 9.

TABLE 35

| | |
|---|---|
| Descriptive Name | PlatooningMessageType |
| Identifier | DataType_xxx |
| ASN.1 representation | PlatooningMessageType ::= INTEGER(0 . . . 100) |
| Definition | This DE (Data Element) indicates the type of message about platooning. "1" means "request to join the platooning group", "2" means "response to a request to join the platooning group", "3" means "notify leaving from the platooning group", "4" means "confirm the notification of leaving from the platooning group", "5" means "notify dissolving the platooning group", "6" means "confirm the notification of dissolving the platooning group", "7" means "request to merge into the platooning group", "8" means "response to a request to merge into the platooning group", "9" means "notify the PG is merged into another PG" |
| Unit | N/A |

Referring to Table 35, the platooning message type information may indicate the type of message regarding platooning. That is, the platooning message type information may indicate the type of the message carried via the platooning message.

"1" means "requesting to join the PG." That is, where the value of the platooning message type information is "1," the platooning message type information may indicate that the platooning message carries the join request message.

"2" means "responding to the request for joining the PG." That is, where the value of the platooning message type information is "2," the platooning message type information may indicate that the platooning message carries the join response message.

"3" means "notifying of leaving the PG." That is, where the value of the platooning message type information is "3," the platooning message type information may indicate that the platooning message carries the leave notification message.

"4" means "confirming the notification of leaving the PG." That is, where the value of the platooning message type information is "4," the platooning message type information may indicate that the platooning message carries the leave response message.

"5" means "notifying of dissolving the PG." That is, where the value of the platooning message type information is "5," the platooning message type information may indicate that the platooning message carries the dissolving notification message.

"6" means "confirming the notification of dissolving the PG." That is, where the value of the platooning message type information is "6," the platooning message type information may indicate that the platooning message carries the dissolving response message.

"7" means "requesting to merge PGs." That is, where the value of the platooning message type information is "7," the platooning message type information may indicate that the platooning message carries the merge request message.

"8" means "responding to the request for merging PGs." That is, where the value of the platooning message type information is "8," the platooning message type information may indicate that the platooning message carries the merge response message.

"9" means "notifying that a PG is merged with another PG." That is, where the value of the platooning message type information is "9," the platooning message type information may indicate that the platooning message carries the merge notification message.

Merge Notification Message-Option #2

The merge notification message of option #2 is described below with reference to Table 36. No duplicate description is given of those described above in connection with Tables 1 to 35.

Table 36 shows an example of the merge notification message. To distinguish from the above-described merge notification message of option #1, the merge notification message of Table 36 may be denoted a platooning merge notification (PlatooningMergeNotify) message. That is, the merge notification message of option #2 may be denoted a platooning merge notification message. However, this is solely for distinguishing from the merge notification message of option #1, and the merge notification messages of option #1 and option #2, both, may be collectively referred to as merge notification message.

TABLE 36

| Descriptive Name | PlatooningMergeNotify |
|---|---|
| Identifier | DataType_xxx |
| ASN.1 representation | PlatooningMergeNotify ::= SEQUENCE { MessageName MessageName optional, VehicleID VehicleID, PlatooningGroupID PlatooningGroupID, NewPlatooningGroupInfo PlatooningGroupInfo, } |

TABLE 36-continued

| Descriptive Name | PlatooningMergeNotify |
|---|---|
| Definition | This DF (Data Frame) conveys a message requesting to merge the platooning group. |
| Unit | N/A |

Referring to Table 36, the platooning merge notification message, as a DF, may carry the message notifying that a PG is merged with another PG. According to an embodiment, the platooning merge notification message may include message name information, vehicle ID information, and/or platooning group ID information. Here, for the message name information, vehicle ID information, and platooning group ID information, no duplicate description is given of those described above in connection with Tables 13 and 14.

In the embodiment of Table 36, the platooning message may further include new platooning group information (NewPlatooningGroupInfo). The new platooning group information may provide information about a new platooning group to be merged.

In the embodiment of Table 36, the vehicle ID information indicates the ID of the message sender transmitting the platooning merge notification message, and the platooning group ID information indicates the ID of the PG which the message sender transmitting the platooning merge notification message has previously belonged to. Meanwhile, in this case, since there is no other message with the same format, the message name information may be unnecessary.

Meanwhile, if the PGs are merged, the PL and PM, which used to belong to the PG which is merged with the new PG, may update the platooning group information. By so doing, the platooning group information may be updated to new PL and PG information.

Platooning Group Concatenation

Meanwhile, platooning may continue, with the two PGs concatenated in such a manner that the PL (first PL) of one PG (first PG) joins the other PG (second PG), and the PMs (first PMs) of the first PG continue to belong to the first PG, not the second PG. The connection in such a manner is called platooning group concatenation. This is a connection scheme distinct from the above-described platooning group merge which is a scheme in which the first PL and first PMs, which used to belong to the first PG, happen to belong to the second PG which is newly merged.

A concatenation request message, concatenation response message, and platooning information message which are used in the platooning group concatenation procedure are described below with reference to Tables 37 to 44.

Concatenation Request Message

Concatenation request message means a message to request concatenation between PGs. That is, the concatenation request message corresponds to a message used to request concatenation between PGs.

According to an embodiment, the concatenation request message may be carried via a platooning message (PlatooningMessage) that conveys various types of messages regarding platooning (option #1). In another embodiment, the concatenation request message may be carried via a message with an independent structure/format (option #2).

Concatenation Request Message-Option #1

The concatenation request message of option #1 is described below with reference to Tables 37 and 38. No duplicate description is given of those described above in connection with Tables 1 to 36.

Table 37 shows an example of the platooning message (PlatooningMessage). The platooning message of Table 37 may have the same structure/format as the platooning message of FIG. 8.

TABLE 37

| Descriptive Name | PlatooningMessage |
|---|---|
| Identifier | DataType_xxx |
| ASN.1 representation | PlatooningMessage ::= SEQUENCE {<br>VehicleID VehicleID,<br>PlatooningGroupID PlatooningGroupID,<br>PlatooningMessageType PlatooningMessageType,<br>VehicleFunctions VehicleFunctions,<br>CAM optional,<br>PlatooningGroupInfo PlatooningGroupInfo,<br>...<br>} |
| Definition | This DF (Data Frame) conveys various messages about platooning. |
| Unit | N/A |

Referring to Table 37, the platooning message, as a DF, may carry various types of messages regarding platooning. According to an embodiment, the platooning message may include vehicle ID information, platooning group ID information, platooning message type information, and/or vehicle function information. Further, optionally, the platooning message may further include CAM information for transferring the basic information of the vehicle transmitting the message. Here, for the vehicle ID information, platooning group ID information, platooning message type information, vehicle function information, and CAM information, no duplicate description is given of those described above in connection with Tables 1 and 7.

In the embodiment of Table 37, the platooning message may further include platooning group information (PlatooningGroupInfo). The platooning group information may provide information for the PG which the message sender transmitting the concatenation request message follows.

In the embodiment of Table 37, the vehicle ID information indicates the ID of the message sender transmitting the concatenation request message, and the platooning group ID information indicates the ID of the PG which the message sender transmitting the concatenation request message desires to concatenate with.

Table 38 shows an example of the platooning message type (PlatooningMessageType) information. The platooning message type information of Table 38 may have the same structure/format as the platooning message type information of FIG. 9.

TABLE 38

| Descriptive Name | PlatooningMessageType |
|---|---|
| Identifier | DataType_xxx |
| ASN.1 representation | PlatooningMessageType ::= INTEGER(0..100) |
| Definition | This DE (Data Element) indicates the type of message about platooning. "1" means "request to join the platooning group", "2" means "response to a request to join the platooning group", "3" means "notify leaving from the platooning group", "4" means "confirm the notification of leaving from the platooning group", "5" means "notify dissolving the platooning group", "6" means "confirm the notification of dissolving of the platooning group", "7" means "request to merge into the platooning group", "8" means |

TABLE 38-continued

| Descriptive Name | PlatooningMessageType |
|---|---|
| | "response to a request to merge into the platooning group", "9" means "notify the PG is merged into another PG", "10" means "request to concatenate the platooning groups" |
| Unit | N/A |

Referring to Table 38, the platooning message type information may indicate the type of message regarding platooning. That is, the platooning message type information may indicate the type of the message carried via the platooning message.

"1" means "requesting to join the PG." That is, where the value of the platooning message type information is "1," the platooning message type information may indicate that the platooning message carries the join request message.

"2" means "responding to the request for joining the PG." That is, where the value of the platooning message type information is "2," the platooning message type information may indicate that the platooning message carries the join response message.

"3" means "notifying of leaving the PG." That is, where the value of the platooning message type information is "3," the platooning message type information may indicate that the platooning message carries the leave notification message.

"4" means "confirming the notification of leaving the PG." That is, where the value of the platooning message type information is "4," the platooning message type information may indicate that the platooning message carries the leave response message.

"5" means "notifying of dissolving the PG." That is, where the value of the platooning message type information is "5," the platooning message type information may indicate that the platooning message carries the dissolving notification message.

"6" means "confirming the notification of dissolving the PG." That is, where the value of the platooning message type information is "6," the platooning message type information may indicate that the platooning message carries the dissolving response message.

"7" means "requesting to merge PGs." That is, where the value of the platooning message type information is "7," the platooning message type information may indicate that the platooning message carries the merge request message.

"8" means "responding to the request for merging PGs." That is, where the value of the platooning message type information is "8," the platooning message type information may indicate that the platooning message carries the merge response message.

"9" means "notifying that a PG is merged with another PG." That is, where the value of the platooning message type information is "9," the platooning message type information may indicate that the platooning message carries the merge notification message.

"10" means "requesting concatenation of the PG." That is, where the value of the platooning message type information is "10," the platooning message type information may indicate that the platooning message carries the concatenation request message.

Concatenation Request Message-Option #2

The concatenation request message of option #2 is described below with reference to Table 39. No duplicate description is given of those described above in connection with Tables 1 to 38.

Table 39 shows an example of the concatenation request message. To distinguish from the above-described concatenation request message of option #1, the concatenation request message of Table 39 may be denoted a platooning concatenation request message (PlatooningConcatenation-Request). That is, the concatenation request message of option #2 may be denoted a platooning concatenation request message. However, this is solely for distinguishing from the concatenation request message of option #1, and the concatenation request messages of option #1 and option #2, both, may be collectively referred to as concatenation request message.

TABLE 39

| Descriptive Name | PlatooningConcatenationRequest |
| --- | --- |
| Identifier | DataType_xxx |
| ASN.1 representation | PlatooningConcatenationRequest ::= SEQUENCE { MessageName MessageName optional, VehicleID VehicleID, PlatooningGroupID PlatooningGroupID, VehicleFunctions VehicleFunctions, CAM optional, PlatooningGroupInfo PlatooningGroupInfo, ... } |
| Definition | This DF (Data Frame) conveys a message requesting to concatenate its platooning group into another platooning group |
| Unit | N/A |

Referring to Table 39, the platooning concatenation request message, as a DF, may carry the message requesting to concatenate the PG to another PG. According to an embodiment, the platooning concatenation request message may include message name information, vehicle ID information, platooning group ID information, vehicle function information, and/or CAM information. Here, for each piece of information, no duplicate information is given of those described above.

In the embodiment of Table 39, the platooning message may further include platooning group information (PlatooningGroupInfo). The platooning group information may provide information for the PG which the message sender transmitting the concatenation request message follows.

In the embodiment of Table 39, the vehicle ID information indicates the ID of the message sender transmitting the platooning concatenation request message, and the platooning group ID information indicates the ID of the PG which the message sender transmitting the platooning concatenation request message desires to concatenate with.

Concatenation Response Message

Where PGs are concatenated, the PL, which receives the concatenation request message, may transmit its confirmation as a response. Concatenation response message means a response message for the concatenation request message. That is, the concatenation response message corresponds to a message responsive to the concatenation request between PGs.

The concatenation response message may be transmitted only when the concatenation request is approved. Or, the concatenation request message may be transmitted both when the join request is approved and when the merge request is rejected. In this case, whether the concatenation request is approved/rejected may be indicated via an additional field of the concatenation response message.

According to an embodiment, the concatenation response message may be carried via a platooning message (PlatooningMessage) that conveys various types of messages regarding platooning (option #1). In another embodiment, the concatenation response message may be carried via a message with an independent structure/format (option #2).

Concatenation Response Message-Option #1

The concatenation response message of option #1 is described below with reference to Tables 40 and 41. No duplicate description is given of those described above in connection with Tables 1 to 39.

Table 40 shows an example of the platooning message (PlatooningMessage). The platooning message of Table 40 may have the same structure/format as the platooning message of FIG. 8.

TABLE 40

| Descriptive Name | PlatooningMessage |
| --- | --- |
| Identifier | DataType_xxx |
| ASN.1 representation | PlatooningMessage ::= SEQUENCE { VehicleID VehicleID, PlatooningGroupID PlatooningGroupID, PlatooningMessageType PlatooningMessageType, VehicleFunctions VehicleFunctions optional, CAM optional, ... } |
| Definition | This DF (Data Frame) conveys various messages about platooning. |
| Unit | N/A |

Referring to Table 40, the platooning message, as a DF, may carry various types of messages regarding platooning. According to an embodiment, the platooning message may include vehicle ID information, platooning group ID information, platooning message type information, and/or vehicle function information. Further, optionally, the platooning message may further include CAM information for transferring the basic information of the vehicle transmitting the message. Here, for each piece of information, no duplicate information is given of those described above.

In the embodiment of Table 40, the platooning message may further include platooning group information (PlatooningGroupInfo). The platooning group information may provide information for the PG which the message sender transmitting the concatenation request message follows.

In the embodiment of Table 40, the vehicle ID information indicates the ID of the message sender transmitting the concatenation request message, and the platooning group ID information indicates the ID of the PG which the message sender transmitting the concatenation request message desires to concatenate with. Meanwhile, where the platooning message carries the concatenation response message, the vehicle function information may not be included in the platooning message.

Table 41 shows an example of the platooning message type (PlatooningMessageType) information. The platooning message type information of Table 41 may have the same structure/format as the platooning message type information of FIG. 9.

TABLE 41

| Descriptive Name | PlatooningMessageType |
| --- | --- |
| Identifier | DataType_xxx |
| ASN.1 representation | PlatooningMessageType ::= INTEGER(0..100) |
| Definition | This DE (Data Element) indicates the type of message about platooning. "1" means "request |

TABLE 41-continued

| Descriptive Name | PlatooningMessageType |
|---|---|
| | to join the platooning group", "2" means "response to a request to join the platooning group", "3" means "notify leaving from the platooning group", "4" means "confirm the notification of leaving from the platooning group", "5" means "notify dissolving the platooning group", "6" means "confirm the notification of dissolving the platooning group", "7" means "request to merge into the platooning group", "8" means "response to a request to merge into the platooning group", "9" means "notify the PG is merged into another PG", "10" means "request to concatenate the platooning groups", "11" means "response to a request of concatenation" |
| Unit | N/A |

Referring to Table 41, the platooning message type information may indicate the type of message regarding platooning. That is, the platooning message type information may indicate the type of the message carried via the platooning message.

"1" means "requesting to join the PG." That is, where the value of the platooning message type information is "1," the platooning message type information may indicate that the platooning message carries the join request message.

"2" means "responding to the request for joining the PG." That is, where the value of the platooning message type information is "2," the platooning message type information may indicate that the platooning message carries the join response message.

"3" means "notifying of leaving the PG." That is, where the value of the platooning message type information is "3," the platooning message type information may indicate that the platooning message carries the leave notification message.

"4" means "confirming the notification of leaving the PG." That is, where the value of the platooning message type information is "4," the platooning message type information may indicate that the platooning message carries the leave response message.

"5" means "notifying of dissolving the PG." That is, where the value of the platooning message type information is "5," the platooning message type information may indicate that the platooning message carries the dissolving notification message.

"6" means "confirming the notification of dissolving the PG." That is, where the value of the platooning message type information is "6," the platooning message type information may indicate that the platooning message carries the dissolving response message.

"7" means "requesting to merge PGs." That is, where the value of the platooning message type information is "7," the platooning message type information may indicate that the platooning message carries the merge request message.

"8" means "responding to the request for merging PGs." That is, where the value of the platooning message type information is "8," the platooning message type information may indicate that the platooning message carries the merge response message.

"9" means "notifying that a PG is merged with another PG." That is, where the value of the platooning message type information is "9," the platooning message type information may indicate that the platooning message carries the merge notification message.

"10" means "requesting concatenation of the PG." That is, where the value of the platooning message type information is "10," the platooning message type information may indicate that the platooning message carries the concatenation request message.

"11" means "responding to the request for concatenation of the PG." That is, where the value of the platooning message type information is "11," the platooning message type information may indicate that the platooning message carries the concatenation response message.

Concatenation Response Message-Option #2

The concatenation response message of option #2 is described below with reference to Table 42. No duplicate description is given of those described above in connection with Tables 1 to 41.

Table 42 shows an example of the concatenation response message. To distinguish from the above-described concatenation response message of option #1, the concatenation response message of Table 42 may be denoted a platooning concatenation response message (PlatooningConcatenationResponse). That is, the concatenation response message of option #2 may be denoted a platooning concatenation response message. However, this is solely for distinguishing from the concatenation response message of option #1, and the concatenation response messages of option #1 and option #2, both, may be collectively referred to as concatenation response message.

TABLE 42

| Descriptive Name | PlatooningConcatenationResponse |
|---|---|
| Identifier | DataType_xxx |
| ASN.1 representation | PlatooningConcatenationResponse ::= SEQUENCE { MessageName MessageName, VehicleID VehicleID, PlatooningGroupID PlatooningGroupID, } |
| Definition | This DF (Data Frame) conveys a message responding to a request to concatenation. |
| Unit | N/A |

Referring to Table 42, the platooning concatenation response message, as a DF, may carry the message responsive to the concatenation request from the PG. According to an embodiment, the platooning concatenation response message may include message name information, vehicle ID information, and/or platooning group ID information. Here, for the message name information, vehicle ID information, platooning group ID information, and vehicle function information, no duplicate description is given of those described above in connection with Tables 13 and 14.

In the embodiment of Table 42, the vehicle ID information indicates the ID of the message sender transmitting the platooning concatenation request message, and the platooning group ID information indicates the ID of the PG which the message sender transmitting the platooning concatenation request message desires to concatenate with.

Platooning Information Message

Where the above-described platooning concatenation procedure is performed, the first PL plays two roles, as the PL of the first PG and as a PM of the second PG newly concatenated. At this time, the platooning information message of the first PL may be defined as follows.

Table 43 shows an example of the platooning information message. No duplicate description is given of those described above in connection with Tables 1 to 42. The platooning information message of Table 43 may have the same structure/format as the platooning information message of FIG. 1.

TABLE 43

| Descriptive Name | PlatooningGroupInfo |
|---|---|
| Identifier | DataType_xxx |
| ASN.1 representation | PlatooningGroupInfo ::= SEQUENCE {<br>PlatooningGroupID PlatooningGroupID,<br>VehicleID VehicleID<br>RoleInPlatooning RoleInPlatooning,<br>PlatooningMemberNumber PlatooningMemberNumber,<br>PlatooningDestination PlatooningDestination,<br>PlatooningRoute PlatooningRoute,<br>...<br>} |
| Definition | This DF (Data Frame) informs information about the PG associated with the message sender having the VehicleID. |
| Unit | N/A |

Referring to Table 43, the platooning information message may be a data frame (DF) indicating information about the PG associated with the message sender having the corresponding vehicle ID information. According to an embodiment, the platooning information message may include platooning group ID information, vehicle ID information, platooning role information, number-of-platooning members information, platooning destination information, and/or platooning route information. For each piece of information included in the platooning information, no duplicate description is given of those described above in connection with Tables 1 to 6.

Table 44 shows an example of the platooning role (RoleInPlatooning) information. No duplicate description is given of those described above in connection with Tables 1 to 43.

TABLE 44

| Descriptive | Name RoleInPlatooning |
|---|---|
| Identifier | DataType_xxx |
| ASN.1 representation | RoleInPlatooning::= BIT STRING {<br>PlatooningLeadVehicle (0),<br>PlatooningMemberVehicle (1),<br>...<br>} |
| Definition | This DE (Data Element) indicates the role of the message sender in its PG.<br>Each bit shall be set to 1 if the corresponding role is supported. |
| Unit | N/A |

Referring to Table 44, the platooning role information, as a DE, may indicate the role of the message sender in the PG. According to an embodiment, the platooning role information may be of a bit string type, and each bit may indicate whether the corresponding role is supported. For example, the platooning role information may include a bit (zeroth bit) indicating whether the platooning leader vehicle is supported and/or a bit (first bit) indicating whether the lane member vehicle is supported. In this case, if the corresponding role is supported, each bit may be set to 1 and, unless the corresponding role is supported, each bit may be set to 0. For example, in the case of concatenation, the value of platooning role information may be set to {1 1}.

An ITS message/packet structure used to provide a platooning service is described below with reference to FIGS. 19 to 21.

First described are a dedicated ITS message (platooning dedicated ITS message) newly defined for the platooning service-related message and a scheme for transmitting a platooning service-related message via the platooning dedicated message. Also described is a scheme for transmitting a platooning service-related message via an extension of a legacy ITS message (e.g., CAM message or DENM message). Here, the platooning service-related service includes the above-described platooning information message or other request/notification/response messages.

FIG. 19 illustrates a structure of an ITS message for a platooning service according to an embodiment of the disclosure. FIG. 19(*a*) illustrates a structure of a platooning dedicated ITS message according to an embodiment of the disclosure. FIG. 19(*b*) illustrates a structure of an extended CAM message for a platooning service according to an embodiment of the disclosure. FIG. 19(*c*) illustrates a structure of an extended DENM message for a platooning service according to an embodiment of the disclosure.

Referring to FIG. 19(*a*), the platooning dedicated ITS message may include an ITS PDU header, a platooning management container, a location container, and/or an application container. Each is described below.

ITS PDU header: A header filed common to all ITS message formats.

Platooning Management Container: includes information required for platooning management and platooning operation.

Location Container: describes the location of the vehicle transmitting this message. A container included conditionally.

Application container: includes application-specific information. A container included conditionally.

Referring to FIGS. 19(*b*) and 19(*c*), the extended CAM message and extended DENM message each may include an extension part including a platooning management container. The platooning management container of the extended CAM message and extended DENM message plays the same role as the platooning management container of the platooning dedicated ITS message.

As such, the platooning dedicated ITS message, extended CAM message, and extended DENM message contain a platooning management container and may carry a service-related message via the platooning management container. This is described below with reference to each drawing.

FIG. 20 illustrates a transmission scheme of a platooning information message using a platooning dedicated ITS message according to an embodiment of the disclosure. The platooning dedicated ITS message of FIG. 20 may have the same structure as the platooning information message of FIG. 19(*a*). In connection with FIG. 20, no duplicate description is given of those described above in connection with FIG. 19.

Referring to FIG. 20, the platooning dedicated ITS message may include a platooning management container. According to an embodiment, the platooning management container may include a platooning information message. The platooning information message may include platooning group ID information, vehicle ID information, vehicle role information, number-of-platooning members information, platooning destination information, and/or platooning route information. Each piece of information has been described above.

As such, the platooning information message required to be transmitted periodically may be transmitted via a newly defined platooning dedicated ITS message.

FIG. 21 illustrates a transmission scheme of a platooning information message using an extended CAM message according to an embodiment of the disclosure. The extended CAM message of FIG. 21 may have the same structure as the extended CAM message of FIG. 19(b). In connection with FIG. 21, no duplicate description is given of those described above in connection with FIG. 19.

Referring to FIG. 21, the extended CAM message may include a platooning management container. According to an embodiment, the platooning management container may include a platooning information message. The platooning information message may include platooning group ID information, vehicle ID information, vehicle role information, number-of-platooning members information, platooning destination information, and/or platooning route information. Each piece of information has been described above.

As such, the platooning information message required to be transmitted periodically may be transmitted via an extension of the legacy CAM message.

FIG. 22 illustrates a transmission scheme of a platooning negotiation message using a platooning dedicated ITS message according to an embodiment of the disclosure. The platooning dedicated ITS message of FIG. 22 may have the same structure as the platooning information message of FIG. 19(a). In connection with FIG. 22, no duplicate description is given of those described above in connection with FIG. 19.

Referring to FIG. 22(a), the platooning dedicated ITS message may include a platooning management container. According to an embodiment, the platooning management container may include a platooning negotiation message. Here, the platooning negotiation message is a message used during the course of a negotiation for a platooning service and may include, e.g., a message used for request/notification and a message responsive thereto. For example, the platooning negotiation message may be the above-described platooning message, platooning join request message and platooning join response message, platooning merge request message, platooning merge response message and platooning merge notification message, platooning leave notification message and platooning leave response message, platooning dissolving notification message and platooning dissolving response message or platooning concatenation request message and platooning concatenation response message.

Referring to FIG. 22(b), the platooning message may include platooning group ID information, vehicle ID information, platooning message type information, vehicle function information, and/or CAM information. Each piece of information has been described above.

Referring to 22(c), the platooning join request message and platooning merge request message may include message name information, platooning group ID information, vehicle ID information, vehicle function information, and/or CAM information. Each piece of information has been described above.

Referring to FIG. 22(d), the platooning join response message, platooning leave notification message, platooning leave response message, platooning dissolving notification message, platooning dissolving response message, platooning merge response message, and platooning concatenation response message may include message name information, platooning group ID information, and/or vehicle ID information. Each piece of information has been described above.

Referring to FIG. 22(e), the platooning merge notification message may include message name information, platooning group ID information, vehicle ID information, and/or new platooning group ID information. Each piece of information has been described above.

Referring to 22(f), the platooning concatenation request message may include message name information, platooning group ID information, vehicle ID information, vehicle function information, CAM information, and/or platooning group information. Each piece of information has been described above.

As such, the platooning negotiation message transmitted based on an occurrence of an event may be transmitted via a newly dedicated platooning dedicated ITS message. In this case, the platooning dedicated ITS message may be transmitted only when the corresponding event occurs.

FIG. 23 illustrates a transmission scheme of a platooning information message using an extended DENM message according to an embodiment of the disclosure. The extended DENM message of FIG. 23 may have the same structure as the extended CAM message of FIG. 19(c). In connection with FIG. 23, those described above with reference to FIGS. 19 and 22 are not described.

Referring to FIG. 23(a), the extended DENM message may include a platooning management container. According to an embodiment, the platooning management container may include a platooning negotiation message.

Referring to FIG. 23(b), the platooning message may include platooning group ID information, vehicle ID information, platooning message type information, vehicle function information, and/or CAM information. Each piece of information has been described above.

Referring to 23(c), the platooning join request message and platooning merge request message may include message name information, platooning group ID information, vehicle ID information, vehicle function information, and/or CAM information. Each piece of information has been described above.

Referring to FIG. 23(d), the platooning join response message, platooning leave notification message, platooning leave response message, platooning dissolving notification message, platooning dissolving response message, platooning merge response message, and platooning concatenation response message may include message name information, platooning group ID information, and/or vehicle ID information. Each piece of information has been described above.

Referring to FIG. 23(e), the platooning merge notification message may include message name information, platooning group ID information, vehicle ID information, and/or new platooning group ID information. Each piece of information has been described above.

Referring to 23(f), the platooning concatenation request message may include message name information, platooning group ID information, vehicle ID information, vehicle function information, CAM information, and/or platooning group information. Each piece of information has been described above.

As such, the platooning negotiation message transmitted based on an occurrence of an event may be transmitted via an extension of the legacy DENM message.

FIG. 24 illustrates a merging procedure among platooning groups according to an embodiment of the disclosure. In the embodiment of FIG. 24, it is assumed that PG1 is a merge-requesting PG, PL1 is a PL belonging to PG1, PG2 is a PG with which PG1 desires to merge, and PL2 is a PL belonging to PG2.

Referring to FIG. 24(a)-①, the PL and PMs belonging to each PG, as a PL and PMs, may transmitted information of the corresponding PG. For example, PL1 and PMs (PM #1 to PM #N) belonging to PG1, as a PL and PMs, may broadcast information for PG1 via a platooning information message. As another example, PL2 and PMs (PM #1 to PM #M) belonging to PG2, as a PL and PMs, may broadcast information for PG1 via a platooning information message.

Referring to FIG. 24(a)-②, the PL belonging to one PG may transmit a merge request message to other PG. For example, PL2 belonging to PG2 may transmit a merge request message to PG1. In this case, the merge request message may include information for PG2. Each piece of information included in the merge request message has been described above.

Referring to FIG. 24(a)-③, the PL belonging to the PG receiving the merge request message may transmit a merge response message to the PL which has transmitted the merge request message. For example, PL1 belonging to PG1 may transmit the merge response message to PL2. Each piece of information included in the merge response message has been described above.

Referring to FIG. 24(a)-④, upon receiving the merge response message, the PL may perform an operation for discovering a target vehicle. According to an embodiment, upon receiving the merge response message, the PL may determine the target vehicle based on the platooning information message of the PMs of the PG desired to be merged with. For example, upon receiving the merge response message, PL2 may determine that PM #N, which is positioned at the tail of PG1, is the target vehicle based on the platooning information messages of the PMs of PG1. In this case, PL2 may identify which PM is positioned at the tail using the information for the CAM message and/or the platooning information messages broadcast by the PMs of PG1 and determine that PM #N which is positioned at the tail is the target vehicle.

Referring to FIG. 24(b)-⑤, the PL which has determined the target vehicle may follow the target vehicle. For example, PL2 may follow PM #N. At this time, the PL may follow the target vehicle by the ACC or CACC function by the driver. In this case, the PL following the target vehicle may transmit the platooning merge notification message to the PMs of the PG which it belongs to. For example, PL2 may transmit the platooning merge notification message to the PMs of PG2.

Referring to FIG. 24(b)-⑥, a merge of PGs may be complete. For example, PG1 may be merged with PG2. In such a case, the PL which has transmitted the platooning merge notification message may play a role as a PM of the newly merged PG. For example, PL2 may play a role as the PM (PM #N+1) of PG1.

Meanwhile, in the PG, the PL needs more functions than the PM and more performance. Thus, where one PG is merged with another PG, the number of PLs in all the merged PGs reduces, and this saves resources (basic resources) for playing a role as a PL.

However, the resources (management resources) used for the PL to manage the PG increase as the number of PMs managed by the PL increases. Thus, a merge of PGs advantageously saves the basic resources according to the decrease in the number of PLs but, as compared with concatenation between PGs, has drawbacks in light of management resources due to an increase in the number of PMs managed by the PL.

Further, a merge of PGs has the advantage of being able to continuously maintain platooning when the PL may not play its role any longer (e.g., when it is broken) while performing platooning.

Meanwhile, according to an embodiment, unlike in the embodiment of FIG. 24, one PG may not be merged behind the last vehicle of another PG. In this case, a merge response message may be extended as follows.

Table 45 shows an example platooning message, and Table 46 shows an example platooning merge message. No duplicate description is given of those described above in connection with Tables 1 to 44.

TABLE 45

| Descriptive Name | PlatooningMessage |
|---|---|
| Identifier | DataType_xxx |
| ASN.1 representation | PlatooningMessage ::= SEQUENCE {<br>VehicleID VehicleID,<br>PlatooningGroupID PlatooningGroupID,<br>PlatooningMessageType PlatooningMessageType,<br>(value=8)<br>VehicleFunctions VehicleFunctions optional,<br>CAM optional,<br>AllowedMergePosition AllowedMergePosition,<br>...<br>} |
| Definition | This DF (Data Frame) conveys various messages about platooning. |
| Unit | N/A |

TABLE 46

| Descriptive Name | PlatooningMergeResponse |
|---|---|
| Identifier | DataType_xxx |
| ASN.1 representation | PlatooningMergeResponse ::= SEQUENCE {<br>MessageName MessageName,<br>VehicleID VehicleID,<br>PlatooningGroupID PlatooningGroupID,<br>AllowedMergePosition AllowedMergePosition,<br>} |
| Definition | This DF (Data Frame) conveys a message responding to a request to merge into the platooning group. |
| Unit | N/A |

Referring to Tables 45 and 46, the platooning message and platooning merge message may further include allowed merge position information (AllowedMergePosition). The allowed merge position information may provide an allowed merge position.

Table 47 shows an example of the allowed merge position information of Table 46.

TABLE 47

| Descriptive Name | AllowedMergePosition |
|---|---|
| Identifier | DataType_xxx |
| ASN.1 representation | AllowedMergePosition ::= SEQUENCE {SIZE(0..1000)} of MergePosition |
| Definition | This DF (Data Frame) indicates zero or more allowed MergePositions. |
| Unit | N/A |

Referring to Table 47, the allowed merge position information, as a sequence of merge position information, may indicate one or more allowed merge positions.

Table 48 shows an example of the merge position information of Table 47.

TABLE 48

| | |
|---|---|
| Descriptive Name | MergePosition |
| Identifier | DataType_xxx |
| ASN.1 representation | MergePosition ::= INTEGER(0..1000) |
| Definition | This DE (Data Element) indicates a merging position of the PG |
| Unit | N/A |

Referring to Table 48, the merge position information may indicate the merge position of PG. According to an embodiment, the merge position information may have a value ranging from 1 to 3, and each value has the following meaning.

"1": merge behind the last vehicle (the embodiment of FIG. 25)

"2": merge ahead of PL (the embodiment of FIG. 26)

"3": merge in the middle of PG (the embodiment of FIG. 27)

Upon receiving the merge request message, the PL may notify the sender (merge request sender) of the merge request message of the allowed merge position using the allowed merge position information. In this case, the merge request sender may select one position from among the merge positions included in the allowed merge position information, thereby performing merging.

A merge procedure using allowed merge position information is described below with reference to FIGS. 25 to 27.

FIG. 25 illustrates a merging procedure using allowed merging position information according to a first embodiment of the disclosure. In the embodiment of FIG. 25, it is assumed that the value of the allowed merge position information is "1." That is, the value of the allowed merge position information may be set to the value indicating to merge behind the last vehicle. In connection with FIG. 25, what has been described in connection with FIG. 24 is not repeatedly described.

Referring to FIG. 25(a), PL1 may transmit a merge response message to PL2. At this time, the merge response message may include the allowed merge position information, and the value of the allowed merge position information may be set to "1."

Referring to FIG. 25(b), upon receiving the merge response message, PL2 may perform operations for merging behind the last vehicle of PG1 based on the allowed merge position information included in the merge response message. Thereafter, PL2 may transmit a platooning merge notification message.

Referring to FIG. 25(c), merging may be done. Where merging is done, PL2 and PMs which used to belong to PG2, all, may play a role as a PM of PG1.

FIG. 26 illustrates a merging procedure using allowed merging position information according to a second embodiment of the disclosure. In the embodiment of FIG. 26, it is assumed that the value of the allowed merge position information is "2." That is, the value of the allowed merge position information may be set to the value indicating to merge ahead of the PL. In connection with FIG. 26, what has been described in connection with FIG. 24 is not repeatedly described.

Referring to FIG. 26(a), PL1 may transmit a merge response message to PL2. At this time, the merge response message may include the allowed merge position information, and the value of the allowed merge position information may be set to "2."

Referring to FIG. 26(b), upon receiving the merge response message, PL2 may perform operations for merging ahead of PL1 of PG1 based on the allowed merge position information included in the merge response message. Thereafter, PL2 may transmit a platooning merge notification message.

Referring to FIG. 26(c), merging may be done. Where merging is done, PL2 and PMs which used to belong to PG2, all, may play a role as a PM of PG1.

FIG. 27 illustrates a merging procedure using allowed merging position information according to a third embodiment of the disclosure. In the embodiment of FIG. 27, it is assumed that the value of the allowed merge position information is "3." That is, the value of the allowed merge position information may be set to the value indicating to merge in the middle of the PG. In connection with FIG. 27, what has been described in connection with FIG. 24 is not repeatedly described.

Referring to FIG. 27(a), PL1 may transmit a merge response message to PL2. At this time, the merge response message may include the allowed merge position information, and the value of the allowed merge position information may be set to "3."

Referring to FIG. 27(b), upon receiving the merge response message, PL2 may perform operations for merging in the middle of PG1 based on the allowed merge position information included in the merge response message. Thereafter, PL2 may transmit a platooning merge notification message.

Referring to FIG. 27(c), merging may be done. Where merging is done, PL2 and PMs which used to belong to PG2, all, may play a role as a PM of PG1.

Meanwhile, according to an embodiment, the merge position information may indicate the merge position more specifically. For example, the merge position information may have a value ranging from 0 to N, and each value has the following meaning.

"1": merge behind the first vehicle.

"2": merge behind the second vehicle.

. . .

"N": merge behind the Nth vehicle.

"0": merge ahead of the first vehicle.

For such a mechanism, the merge-requesting PL needs to be aware of the numeric positions of the PMs of the merge-requested PG. To that end, each PM of the merge-requested PG may include its numeric position in the platooning information message and broadcast the platooning information message, or the merge-requesting PL directly may identify the positions of the PMs of the merge-requested PG to obtain the numeric positions of the PMs.

FIG. 28 illustrates a linking procedure among platooning groups according to an embodiment of the disclosure. In the embodiment of FIG. 28, it is assumed that PG1 is a concatenation-requesting PG, PL1 is a PL belonging to PG1, PG2 is a PG with which PG1 desires to concatenate, and PL2 is a PL belonging to PG2.

Referring to FIG. 28(a)-①, the PL and PMs belonging to each PG, as a PL and PMs, may transmitted information of the corresponding PG. For example, PL1 and PMs (PM #1 to PM #N) belonging to PG1, as a PL and PMs, may broadcast information for PG1 via a platooning information message. As another example, PL2 and PMs (PM #1 to PM #M) belonging to PG2, as a PL and PMs, may broadcast information for PG1 via a platooning information message.

Referring to FIG. 28(a)-②, the PL belonging to one PG may transmit a concatenation request message to other PG.

For example, PL2 belonging to PG2 may transmit a concatenation request message to PG1. In this case, the concatenation request message may include information for PG2.

Referring to FIG. 28(a)-③, the PL belonging to the PG receiving the concatenation request message may transmit a concatenation response message to the PL which has transmitted the concatenation request message. For example, PL1 belonging to PG1 may transmit the concatenation response message to PL2.

Referring to FIG. 28(a)-④, upon receiving the concatenation response message, the PL may perform an operation for discovering a target vehicle. According to an embodiment, upon receiving the concatenation response message, the PL may determine the target vehicle based on the platooning information message of the PMs of the PG desired to be concatenated with. For example, upon receiving the concatenation response message, PL2 may determine that PM #N, which is positioned at the tail of PG1, is the target vehicle based on the platooning information messages of the PMs of PG1. In this case, PL2 may identify which PM is positioned at the tail using the information for the CAM message and/or the platooning information messages broadcast by the PMs of PG1 and determine that PM #N which is positioned at the tail is the target vehicle.

Referring to FIG. 28(b)-⑤, the PL which has determined the target vehicle may follow the target vehicle and, thereby, concatenation between the PGs may be done. For example, as PL2 follows PM #N, the concatenation between PG1 and PG2 may be done. At this time, the PL may follow the target vehicle by the ACC or CACC function by the driver. In this case, the PL following the target vehicle may play a role as the PL of the PG where it used to belong before concatenation and a PM of the newly concatenated PG. For example, PL2 may play a role as the PL of PG2 and the PM (PM #N+1) of PG1.

The resources (management resources) used to manage the PG increase as the number of PMs managed by the PL increases. Thus, where one PG concatenates with another PG, the management resources may advantageously be distributed to the respective PLs of the PGs.

However, in the PG, the PL needs more functions than the PM and more performance. Thus, concatenation between PGs advantageously saves the management resources according to the decrease in the number of PMs managed by one PL but, as compared with merge of PGs, has drawbacks in light of basic resources since the number of PLs in all the concatenated PGs is maintained.

Further, since the PG is required to be coordinated by the PL, all the PMs should be located within the physical communication range of the PL. In this case, the number of PMs is limited by the physical communication range of the PL. However, where concatenation between PLs is used, the communication range is increased by the concatenation and, thus, a broader range of platooning is rendered possible. That is, in the PL-to-PL merge, the load of the merge-requesting PL is fully transmitted to the merge-requested PL but, in the PL-to-PL concatenation, part (e.g., group management) of the load of the merge-requesting PL may remain as it is. For example, in such a case where the driver of the PL needs a rest while platooning and thus attempts to merge with other PG without stopping platooning, but a merge is impossible due to a too broad range of platooning, driving of the PL may be changed to ACC or CACC via concatenation. Thus, the driver of the PL may take a rest while keeping on platooning.

Meanwhile, according to an embodiment, unlike in the embodiment of FIG. 28, one PG may not be concatenated behind the last vehicle of another PG. In this case, a concatenation response message may be extended as follows.

Table 49 shows an example platooning message, and Table 50 shows an example platooning concatenation message. No duplicate description is given of those described above in connection with Tables 1 to 48.

TABLE 49

| Descriptive Name | PlatooningMessage |
|---|---|
| Identifier ASN.1 representation | DataType_xxx<br>PlatooningMessage ::= SEQUENCE {<br>VehicleID VehicleID,<br>PlatooningGroupID PlatooningGroupID,<br>PlatooningMessageType PlatooningMessageType, (value=8)<br>VehicleFunctions VehicleFunctions optional,<br>CAM optional,<br>AllowedConcatenationPosition AllowedMergePosition,<br>...<br>} |
| Definition | This DF (Data Frame) conveys various messages about platooning. |
| Unit | N/A |

TABLE 50

| Descriptive Name | PlatooningConcatenationResponse |
|---|---|
| Identifier ASN.1 representation | DataType_xxx<br>PlatooningMergeResponse ::= SEQUENCE {<br>MessageName MessageName,<br>VehicleID VehicleID,<br>PlatooningGroupID PlatooningGroupID,<br>AllowedConcatenationPosition AllowedMergePosition,<br>} |
| Definition | This DF (Data Frame) conveys a message responding to a request to concatenation. |
| Unit | N/A |

Referring to Tables 49 and 50, the platooning message and platooning concatenation message may further include allowed concatenation position information (AllowedConcatenationPosition). The allowed concatenation position information may provide an allowed concatenation position. That is, the concatenation position information may indicate the concatenation position of the PG.

According to an embodiment, the concatenation position information may have a value ranging from 1 to 3, and each value has the following meaning.

"1": concatenate behind the last vehicle
"2": concatenate ahead of the PL
"3": concatenate in the middle of the PG Upon receiving the concatenation request message, the PL may notify the sender (concatenation request sender) of the concatenation request message of the allowed concatenation position using the allowed concatenation position information. In this case, the concatenation request sender may select one position from among the concatenation positions included in the allowed concatenation position information, thereby performing concatenation.

Meanwhile, according to an embodiment, the concatenation position information may indicate the concatenation position more specifically. For example, the concatenation position information may have a value ranging from 0 to N, and each value has the following meaning.

"1": concatenate behind the first vehicle.
"2": concatenate behind the second vehicle.
...
"N": concatenate behind the Nth vehicle.
"0": concatenate ahead of the first vehicle.

For such a mechanism, the concatenation-requesting PL needs to be aware of the numeric positions of the PMs of the concatenation-requested PG. To that end, each PM of the concatenation-requested PG may include its numeric position in the platooning information message and broadcast the platooning information message, or the concatenation-requesting PL directly may identify the positions of the PMs of the concatenation-requested PG to obtain the numeric positions of the PMs.

FIG. 29 illustrates a procedure of switching from connection to merging according to an embodiment of the disclosure. In the embodiment of FIG. 29, it is assumed that PG1 is a PG requesting to switch from merge to concatenation, PL1 is a PL belonging to PG1, PG2 is a PG with which PG1 desires to merge, and PL2 is a PL belonging to PG2.

Referring to FIG. 29(a), the two PGs may be in the state of being concatenated together. For example, PG2 may be in the state of being concatenated to PG1. In this case, PL2 may play a role as the PL of PG2 and a PM of PG1.

Referring to FIG. 29(b), the PL following other PG may transmit a merge request message to the PG. For example, PL2 may transmit the merge request message to PG1. At this time, the merge request message may include information about PG2. Each piece of information included in the merge request message has been described above.

Further, the PL receiving the merge request message may transmit a merge response message. For example, PL1 may transmit the merge response message to PL2. Each piece of information included in the merge response message has been described above.

Referring to FIG. 29(c), as the PL receiving the merge response message follows the target vehicle in the PG which has transmitted the merge response message, merging may be complete. For example, as PL2 follows the last vehicle in PG1, merging may be done.

As such, concatenation may switch into a merge according to contexts. For example, such an occasion may arise where although one PG desires to merge with another PG, concatenation, rather than a merge, may be selected due to the communication coverage of the PL of the merge-desiring PG. In this case, if a merge is rendered possible as some PMs leave, the merging may be complete via the above-described operation procedure of switching from concatenation to merge.

FIG. 30 illustrates a separation procedure according to an embodiment of the disclosure. In the embodiment of FIG. 30, it is assumed that PG1 is a separation-requesting PG, PL1 is a PL belonging to PG1, PG2 is a PG from which PG1 desires to separate, and PL2 is a PL belonging to PG2.

Referring to FIG. 30(a), the two PGs may be in the state of being concatenated together. For example, PG2 may be in the state of being concatenated to PG1. In this case, PL2 may play a role as the PL of PG2 and a PM of PG1.

Referring to FIG. 30(b), the PL following other PG may transmit a leave notification message to the PL of the PG. For example, PL2 may transmit a leave notification message to PL1. At this time, each piece of information included in the leave notification message has been described above.

Referring to FIG. 30(c), as the PL transmitting the leave notification message stops following the target vehicle, separation may be complete. For example, as PL2 does not follow the last vehicle in PG1 any longer, separation may be done.

As such, separation of the PG may be needed according to contexts. For example, where the concatenated PGs have different final destinations, one PG need not follow another PG after arriving at its desired destination. In this case, separation between the PGs is required.

However, where the PGs are in the state of being merged together, further separation of each PG is impossible, and separation is very hard. In such a case, it is required that the PMs themselves leave and form a new PG. However, where the PGs are in the state of being concatenated together as in the embodiment of FIG. 30, as the PL of one PG leaves the other PG, the two PGs may simply be separated.

FIG. 31 illustrates a configuration of a V2X communication device according to an embodiment of the disclosure.

Referring to FIG. 31, a V2X communication device 31000 may include a communication unit 31010, a processor 31020, and a memory 31030.

The communication unit 31010 may be connected with the processor 31020 to transmit/receive wireless signals. The communication unit 31010 may up-convert data received from the processor 31020 into a transmission/reception band and transmit the signal or may down-convert the received signal. The communication unit 31010 may implement the operation of at least one of the physical layer or access layer.

The communication unit 31010 may also include a plurality of sub RF units to perform communication according to a plurality of communication protocols. According to an embodiment, the communication unit 31010 may perform data communication based on, e.g., dedicated short range communication (DSRC), IEEE 802.11 and/or 802.11p standard-based communication technology, IEEE 802.11 and/or 802.11p standard physical transmission technology-based ITS-G5 wireless communication technology, 2G/3G/4G (LTE)/5G wireless cellular communication technology including satellite/wideband wireless mobile communication, DVB-T/T2/ATSC or other wideband terrestrial digital broadcast technology, GPS technology, or IEEE 1609 WAVE technology. The communication unit 31010 may include a plurality of transceivers implementing each communication technology.

The communication unit 31010 may include a plurality of transceivers, with one transceiver communicating on the CCH, and the other on the SCH. The communication unit 31010 may perform multi-channel operation using the plurality of transceivers.

The processor 31020 may be connected with the RF unit 31030 to implement the operation of the layers according to the ITS system or WAVE system. The processor 31020 may be configured to perform operations according to various embodiments of the disclosure as described with reference to the drawings. Further, according to various embodiments of the disclosure, at least one of a module, data, program, or software for implementing the operation of the V2X communication device 31000 may be stored in the memory 31010 and be executed by the processor 31020.

The memory 31010 is connected with the processor 31020 to store various pieces of information for driving the processor 31020. The memory 31010 may be included in the processor 31020 or be installed outside the processor 31020 and connected with the processor 31020 via a known means.

The processor 31020 of the V2X communication device 31000 may perform V2X communication for a platooning service. The V2X communication method by the V2X communication device 31000 is described below.

FIG. 32 is a flowchart illustrating a V2X communication method by a V2X communication device according to an embodiment of the disclosure. In the embodiment of FIG. 32, the V2X communication device may be a V2X communication device of a vehicle. In the embodiment of FIG. 32, the V2X communication device may be referred to as a first V2X communication device, and the external V2X communication device may be referred to as a second V2X communication device. In this case, the platooning group where the vehicle with the first V2X communication device belongs may be denoted a first platooning group, and the platooning group where the vehicle with the second V2X communication device belongs may be denoted a second platooning group.

The V2X communication device may receive a platooning information message from the external V2X communication device (S32010). Here, the platooning information message may include information about the platooning group where the vehicle with the external V2X communication device belongs. According to an embodiment, the platooning information message may include at least one of ID information (vehicle ID information) for identifying a message transmitter transmitting the platooning information message, platooning group ID information for identifying a platooning group where the message transmitter belongs, platooning role information indicating a role of the message transmitter, platooning member count information indicating a number of members of the platooning group, platooning destination information indicating a geographical location of a destination of the platooning group, or platooning route information indicating a geographical location of at least one route of the platooning group.

The V2X communication device may determine whether to form a concatenation with the platooning group based on information included in the platooning information message (S32020).

Where it is determined to form a concatenation, the V2X communication device may transmit a concatenation request message for requesting a concatenation to an external V2X device (S32030). The V2X communication device may receive a concatenation response message which is a response message for the concatenation request message from the external V2X device (S32040). According to an embodiment, the concatenation request message may include at least one of ID information (vehicle ID information) for identifying a message transmitter transmitting the concatenation request message, platooning group ID information for identifying a platooning group with which the message transmitter desires to concatenate, or function information (vehicle function information) indicating a function associated with the message transmitter. Further, the concatenation response message may include at least one of the ID information or the platooning group ID information.

The V2X communication device may form a concatenation with a platooning group (S32050).

According to an embodiment, the concatenation response message may further include concatenation location information indicating a location of concatenation of the platooning group. In this case, forming the concatenation with the platooning group may further include determining the location of concatenation with the platooning group based on the concatenation location information.

According to an embodiment, forming the concatenation may include configuring a vehicular role to allow the vehicle with the V2X communication device to play a role as a leading vehicle of an original platooning group and a role as a member vehicle of a newly concatenated platooning group.

In an alternative or additional embodiment, the V2X communication device may further perform transmitting a merge request message for requesting to merge with the platooning group to the external V2X device, receiving a merge response message responsive to the merge request message from the external V2X device, and merging with the platooning group. According to an embodiment, the merge request message may include at least one of ID information for identifying a message transmitter transmitting the merge request message, platooning group ID information for identifying a platooning group with which the message transmitter desires to merge, or function information indicating a function associated with the message transmitter. Further, the merge response message may include at least one of the ID information or the platooning group ID information.

According to an embodiment, merging with the platooning group may further include transmitting a merge notification message to member vehicles of an original platooning group and configuring a vehicular role to allow the vehicle with the V2X communication device to play a role as a member vehicle of a newly merged platooning group. In this case, the merge notification message may include platooning group ID information for identifying the original platooning group and new platooning group information for providing information for the newly merged platooning group.

In an alternative or additional embodiment, the V2X communication device may further perform separating the concatenation. In this case, separating the concatenation may include transmitting a leave notification message to the external V2X communication device. According to an embodiment, the leave notification message may include at least one of ID information for identifying a message transmitter transmitting the leave notification message or platooning group ID information for identifying a platooning group from which the message transmitter desires to leave.

The above-described embodiments regard predetermined combinations of the components and features of the disclosure. Each component or feature should be considered as optional unless explicitly mentioned otherwise. Each component or feature may be practiced in such a manner as not to be combined with other components or features. Further, some components and/or features may be combined together to configure an embodiment of the disclosure. The order of the operations described in connection with the embodiments of the disclosure may be varied. Some components or features in an embodiment may be included in another embodiment or may be replaced with corresponding components or features of the other embodiment. It is obvious that the claims may be combined to constitute an embodiment unless explicitly stated otherwise or such combinations may be added in new claims by an amendment after filing.

The embodiments of the disclosure may be implemented by various means, e.g., hardware, firmware, software, or a combination thereof. When implemented in hardware, an embodiment of the disclosure may be implemented with, e.g., one or more application specific integrated circuits (ASICs), digital signal processors (DSPs), digital signal processing devices (DSPDs), programmable logic devices (PLDs), field programmable gate arrays (FPGAs), processors, controllers, micro-controllers, or micro-processors.

When implemented in firmware or hardware, an embodiment of the disclosure may be implemented as a module, procedure, or function performing the above-described functions or operations. The software code may be stored in a memory and driven by a processor. The memory may be positioned inside or outside the processor to exchange data with the processor by various known means.

It is apparent to one of ordinary skill in the art that the disclosure may be embodied in other specific forms without departing from the essential features of the disclosure. Thus, the above description should be interpreted not as limiting in all aspects but as exemplary. The scope of the disclosure should be determined by reasonable interpretations of the appended claims and all equivalents of the disclosure belong to the scope of the disclosure.

Detailed Description of Exemplary Embodiments

It is appreciated by one of ordinary skill in the art that various changes and modifications may be made to the embodiments of the disclosure without departing from the scope or spirit of the disclosure. Thus, all such changes or modifications are intended to belong to the scope of the disclosure as defined by the appended claims or equivalents thereof.

The disclosure sets forth both devices and methods, and descriptions thereof may be complementarily applicable to each other.

Various embodiments have been described in the best mode for practicing the disclosure.

INDUSTRIAL AVAILABILITY

The disclosure is used in a series of vehicle communication fields. It is appreciated by one of ordinary skill in the art that various changes and modifications may be made to the embodiments of the disclosure without departing from the scope or spirit of the disclosure. Thus, all such changes or modifications are intended to belong to the scope of the disclosure as defined by the appended claims or equivalents thereof.

The invention claimed is:

1. A vehicle-to-everything (V2X) communication method performed by a V2X communication device, the V2X communication method comprising:
   receiving a platooning information message from an external V2X communication device, the platooning information message including information for a platooning group where a vehicle with the external V2X communication device belongs;
   determining whether to form a concatenation with the platooning group based on information included in the platooning information message;
   upon determining to form the concatenation, transmitting a concatenation request message for requesting the concatenation to the external V2X device;
   receiving a concatenation response message responsive to the concatenation request message from the external V2X device; and
   forming a concatenation with the platooning group,
   wherein the platooning information message further includes ID information for identifying a message transmitter transmitting the platooning information message, platooning group ID information for identifying a platooning group where the message transmitter belongs, platooning role information indicating a role of the message transmitter, platooning member count information indicating a number of members of the platooning group, platooning destination information indicating a geographical location of a destination of the platooning group, and platooning route information indicating locations of one or more intermediate points which the platooning group passes through before arriving at a final destination,
   wherein the concatenation request message includes ID information for identifying a message transmitter transmitting the concatenation request message, platooning group ID information for identifying a platooning group with which the message transmitter desires to concatenate, and function information indicating a function associated with the message transmitter, and
   wherein the function associated with the message transmitter includes at least one of a lane keeping function, a lane change assist function, a brake assist function, a collision avoid function, an adaptive cruise control function or a Cooperative Adaptive Cruise Control (CACC) function.

2. The V2X communication method of claim 1,
   wherein the concatenation response message includes at least one of
   the ID information or the platooning group ID information.

3. The V2X communication method of claim 2, wherein the concatenation response message further includes
   concatenation location information indicating a location of concatenation of the platooning group, and
   wherein forming the concatenation with the platooning group further includes
   determining the location of concatenation with the platooning group based on the concatenation location information.

4. The V2X communication method of claim 1, wherein forming the concatenation includes
   configuring a vehicular role to allow the vehicle with the V2X communication device to play a role as a leading vehicle of an original platooning group and a role as a member vehicle of a newly concatenated platooning group.

5. The V2X communication method of claim 1, further comprising:
   transmitting a merge request message for requesting to merge with the platooning group to the external V2X device;
   receiving a merge response message responsive to the merge request message from the external V2X device; and
   merging with the platooning group.

6. The V2X communication method of claim 5, wherein the merge request message includes at least one of
   ID information for identifying a message transmitter transmitting the merge request message, platooning group ID information for identifying a platooning group with which the message transmitter desires to merge, or function information indicating a function associated with the message transmitter, and
   wherein the merge response message includes at least one of
   the ID information or the platooning group ID information.

7. The V2X communication method of claim 5, wherein merging with the platooning group further includes
   transmitting a merge notification message to member vehicles of an original platooning group; and configuring a vehicular role to allow the vehicle with the V2X communication device to play a role as a member vehicle of a newly merged platooning group, and wherein the merge notification message includes platooning group ID information for identifying the original platooning group and new platooning group information for providing information for the newly merged platooning group.

8. The V2X communication method of claim 1, further comprising:

separating the concatenation, the separating including transmitting a leave notification message to the external V2X communication device, wherein the leave notification message includes at least one of ID information for identifying a message transmitter transmitting the leave notification message or platooning group ID information for identifying a platooning group from which the message transmitter desires to leave.

9. A vehicle-to-everything (V2X) communication device, comprising:

a memory configured to store data;
a communication unit configured to transmit and receive a wireless signal; and
a processor configured to control the communication unit, wherein
the processor is further configured to:
receive a platooning information message from an external V2X communication device, the platooning information message including information for a platooning group where a vehicle with the external V2X communication device belongs;
determine whether to form a concatenation with the platooning group based on information included in the platooning information message;
upon determining to form the concatenation, transmit a concatenation request message for requesting the concatenation to the external V2X device;
receive a concatenation response message responsive to the concatenation request message from the external V2X device;
form a concatenation with the platooning group;
transmit a merge request message for requesting to merge with the platooning group to the external V2X device;
receive a merge response message responsive to the merge request message from the external V2X device; and
merge with the platooning group,
wherein the platooning information message further includes platooning route information indicating locations of one or more intermediate points which the platooning group passes through before arriving at a final destination,
wherein the merge request message includes ID information for identifying a message transmitter transmitting the merge request message, platooning group ID information for identifying a platooning group with which the message transmitter desires to merge, and function information indicating a function associated with the message transmitter, and
wherein the function associated with the message transmitter includes at least one of a lane keeping function, a lane change assist function, a brake assist function, a collision avoid function, an adaptive cruise control function or a Cooperative Adaptive Cruise Control (CAAC) function.

10. The V2X communication device of claim 9, wherein the platooning information message further includes at least one of ID information for identifying a message transmitter transmitting the platooning information message, platooning group ID information for identifying a platooning group where the message transmitter belongs, platooning role information indicating a role of the message transmitter, platooning member count information indicating a number of members of the platooning group, or platooning destination information indicating a geographical location of a destination of the platooning group.

11. The V2X communication device of claim 9, wherein the concatenation request message includes at least one of ID information for identifying a message transmitter transmitting the concatenation request message, platooning group ID information for identifying a platooning group with which the message transmitter desires to concatenate, or function information indicating a function associated with the message transmitter, and wherein the concatenation response message includes at least one of the ID information or the platooning group ID information.

12. The V2X communication device of claim 11, wherein the concatenation response message further includes concatenation location information indicating a location of concatenation of the platooning group, and wherein forming the concatenation with the platooning group further includes determining the location of concatenation with the platooning group based on the concatenation location information.

13. The V2X communication device of claim 9, wherein the processor is further configured to form the concatenation by:

configuring a vehicular role to allow the vehicle with the V2X communication device to play a role as a leading vehicle of an original platooning group and a role as a member vehicle of a newly concatenated platooning group.

14. The V2X communication device of claim 9, wherein the merge response message includes at least one of the ID information or the platooning group ID information.

15. The V2X communication device of claim 9, wherein the processor is further configured to merge with the platooning group by:

transmitting a merge notification message to member vehicles of an original platooning group; and configuring a vehicular role to allow the vehicle with the V2X communication device to play a role as a member vehicle of a newly merged platooning group, and wherein the merge notification message includes platooning group ID information for identifying the original platooning group and new platooning group information for providing information for the newly merged platooning group.

16. The V2X communication device of claim 9, wherein the processor is further configured to:

separate the concatenation, the separating including transmitting a leave notification message to the external V2X communication device, wherein the leave notification message includes at least one of
ID information for identifying a message transmitter transmitting the leave notification message or platooning group ID information for identifying a platooning group from which the message transmitter desires to leave.

* * * * *